US012589597B2

(12) United States Patent
Maloney et al.

(10) Patent No.: US 12,589,597 B2
(45) Date of Patent: Mar. 31, 2026

(54) PRINTER MAINTENANCE CAROUSEL SYSTEM AND METHOD

(71) Applicant: Brady Worldwide, Inc., Milwaukee, WI (US)

(72) Inventors: Ryan Maloney, Milwaukee, WI (US); Gregg J. Haensgen, Menomonee Falls, WI (US); Gregory S. Retzlaff, Menomonee Falls, WI (US); Brent A. Bandholz, Hubertus, WI (US); Richard C. Sonntag, Swarthmore, PA (US); Jonathan M. Mantes, Franklin, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 66 days.

(21) Appl. No.: 18/602,327

(22) Filed: Mar. 12, 2024

(65) Prior Publication Data

US 2025/0289234 A1 Sep. 18, 2025

(51) Int. Cl.
*B41J 2/185* (2006.01)
*B41J 29/13* (2006.01)

(52) U.S. Cl.
CPC ............... *B41J 2/185* (2013.01); *B41J 29/13* (2013.01); *B41J 2002/1856* (2013.01)

(58) Field of Classification Search
CPC ..... B41J 2/185; B41J 29/13; B41J 2002/1856
See application file for complete search history.

(56) References Cited

U.S. PATENT DOCUMENTS

| | | | |
|---|---|---|---|
| 4,524,365 | A | 6/1985 | Kakeno et al. |
| 5,477,256 | A | 12/1995 | Loyd et al. |
| 5,500,659 | A | 3/1996 | Curran, Jr. et al. |
| 5,517,221 | A | 5/1996 | Nguyen |

(Continued)

FOREIGN PATENT DOCUMENTS

| | | | | |
|---|---|---|---|---|
| CA | 3071506 C | * | 9/2023 | ......... A47K 10/3836 |
| CN | 115742568 A | | 3/2023 | |

(Continued)

OTHER PUBLICATIONS

Extended European Search Report issued for European Appln. No. 25162941.6, dated Jul. 15, 2025, 10 pages.

*Primary Examiner* — Sharon Polk
(74) *Attorney, Agent, or Firm* — Husch Blackwell LLP

(57) ABSTRACT

A maintenance carousel for collecting waste ink ejected by one or more printheads of an inkjet printer is provided. In some instances, the maintenance carousel may include a tray and an actuator assembly retained within an enclosure. The actuator assembly may be configured to drive rotation (e.g., indexing) of the tray each time the printheads eject waste ink into the maintenance carousel. This rotation may cause ink to accumulate within a tray of the maintenance carousel in a circular pattern. In some instances, the maintenance carousel may include electrostatic plates configured to generate an electromagnetic field which may improve collection of small droplets or aerosolized particles of waste ink. In further instances, the maintenance carousel may include a fan assembly configured to generate an airflow through the maintenance carousel such that small droplets or aerosolized particles of waste ink may be collected by one or more filters.

20 Claims, 54 Drawing Sheets

(56) References Cited

U.S. PATENT DOCUMENTS

| | | | |
|---|---|---|---|
| 5,742,303 | A | 4/1998 | Taylor et al. |
| 5,774,141 | A | 6/1998 | Cooper et al. |
| 5,774,142 | A | 6/1998 | Nguyen et al. |
| 6,050,671 | A | 4/2000 | Rotering |
| 6,203,152 | B1 | 3/2001 | Boleda et al. |
| 6,209,983 | B1 | 4/2001 | Osborne et al. |
| 6,213,583 | B1 | 4/2001 | Therien |
| 6,247,783 | B1 | 6/2001 | Shibata et al. |
| 6,273,547 | B1 | 8/2001 | Aldrich |
| 6,318,838 | B1 | 11/2001 | Anderson et al. |
| 6,340,220 | B1 | 1/2002 | Gaylor et al. |
| 6,357,853 | B1 | 3/2002 | Askren et al. |
| 6,375,304 | B1 | 4/2002 | Aldrich et al. |
| 6,481,827 | B2 | 11/2002 | Yearout |
| 6,561,621 | B2 | 5/2003 | Webster et al. |
| 6,637,859 | B2 | 10/2003 | Williamson et al. |
| 6,644,779 | B2 | 11/2003 | Aldrich et al. |
| 6,659,587 | B2 | 12/2003 | Berg et al. |
| 6,695,431 | B2 | 2/2004 | Kumagai |
| 6,834,931 | B2 | 12/2004 | Ang et al. |
| 7,097,276 | B2 | 8/2006 | Itoh |
| 7,159,964 | B2 | 1/2007 | Funk et al. |
| 7,175,251 | B2 | 2/2007 | Gaston et al. |
| 7,357,479 | B2 | 4/2008 | Brugue et al. |
| 7,360,864 | B2 | 4/2008 | Kawai et al. |
| 7,731,329 | B2 | 6/2010 | Yearout et al. |
| 7,828,407 | B2 | 11/2010 | Gomez et al. |
| 7,905,571 | B2 | 3/2011 | Byun |
| 7,914,111 | B2 | 3/2011 | Kulpa |
| 7,934,791 | B2 | 5/2011 | Masuyama et al. |
| 8,186,805 | B2 | 5/2012 | Su |
| 8,246,142 | B2 | 8/2012 | Hibbard et al. |
| 8,567,902 | B2 | 10/2013 | Kobayashi |
| 8,573,734 | B2 | 11/2013 | Singh |
| 9,199,472 | B2 | 12/2015 | Ishida et al. |
| 9,381,746 | B2 | 7/2016 | Miyakoshi et al. |
| 10,252,530 | B2 | 4/2019 | Moya Rojo et al. |
| 10,717,294 | B2 | 7/2020 | Shimizu |
| 11,571,903 | B2 | 2/2023 | Kobayashi et al. |
| 11,633,958 | B2 | 4/2023 | Kemma et al. |
| 2002/0015070 | A1 | 2/2002 | Taylor et al. |
| 2003/0052940 | A1 * | 3/2003 | Aldrich .................. B41J 2/1721 347/36 |
| 2004/0085392 | A1 | 5/2004 | Walsh et al. |
| 2004/0100521 | A1 | 5/2004 | Rotering |
| 2008/0143781 | A1 | 6/2008 | Inoue et al. |
| 2008/0284817 | A1 | 11/2008 | Wu et al. |
| 2019/0358956 | A1 | 11/2019 | Ozawa et al. |
| 2020/0122468 | A1 | 4/2020 | Takahashi |
| 2022/0072860 | A1 | 3/2022 | Bonjoch Roma et al. |
| 2022/0370940 | A1 | 11/2022 | Llorach To et al. |
| 2023/0382118 | A1 | 11/2023 | Gerstner et al. |

FOREIGN PATENT DOCUMENTS

| | | | |
|---|---|---|---|
| EP | 568174 | A1 | 11/1993 |
| EP | 622243 | A2 | 11/1994 |
| EP | 1757451 | A1 | 2/2007 |
| EP | 1880855 | A1 | 1/2008 |
| EP | 1987957 | A1 | 11/2008 |
| EP | 3702161 | A1 | 9/2020 |
| EP | 3862091 | A1 | 8/2021 |
| JP | H08238784 | A | 9/1996 |
| JP | 2000085145 | A | 3/2000 |
| JP | 2000203058 | A | 7/2000 |
| JP | 2001171148 | A | 6/2001 |
| JP | 2006076023 | A | 3/2006 |
| JP | 2006137079 | A | 6/2006 |
| JP | 2006150872 | A | 6/2006 |
| JP | 6206244 | B2 | 10/2017 |
| WO | 2014010053 | A1 | 1/2014 |
| WO | 2014070140 | A1 | 5/2014 |
| WO | 2020050126 | A1 | 3/2020 |

* cited by examiner

PRINTER MAINTENANCE CAROUSEL SYSTEM AND METHOD

CROSS-REFERENCE TO RELATED APPLICATIONS

None.

BACKGROUND

Inkjet printers use printheads to spray fine droplets of ink onto paper to generate an image or text. During operation, the printhead (or printheads) of an inkjet printer commonly "spit" or eject small amounts of ink into a waste area. Ejecting waste ink keeps the nozzles of the printhead fresh and prevents the degradation of print quality over time. However, waste ink tends to build up in the waste area and, in some cases, can interfere with the operation of the printer. For example, the waste ink may accumulate into vertical structures, or "stalagmites," reaching upwardly and away from the waste area. If enough waste ink accumulates, these stalagmites can eventually grow tall enough to contact the printheads or other components of the printer. This may lead to print quality failures, create the potential for waste ink to seep back into the printheads, or lead to other undesirable outcomes.

Some printers utilize absorbent pads positioned in the waste area to collect waste ink. However, over time, the felt pads can become saturated with ink such that they no longer absorb the waste ink deposited by the printheads and the waste ink is able to accumulate on the pads. Thus, users must periodically replace saturated pads with a fresh one. This leads to inconvenience and increased cost for consumers who purchase and manually install the replacement felt pads. Moreover, stationary waste ink collection mechanisms like replaceable pads create the problem that waste ink is repeatedly deposited in the same location. Thus, waste ink may tend to accumulate into vertical structures (e.g., stalagmites). These vertical structures can, for example, grow so large that they impact the printheads and interrupt the operation of the printer.

Moreover, printheads often eject waste ink in the form of small droplets or aerosolized particles that are not easily collected. Aerosolized particles of waste ink may travel to other undesirable locations within the printer and, for example, accumulate on critical components of the printer. In this way, ineffective collection of waste ink can lead to damage to or malfunction of the printer.

Due at least to the aforementioned problems, there is a need for a waste ink collection mechanism that reduces the likelihood of waste ink accumulating into vertical formations capable of interfering with the operation of an inkjet printer. Further, it is desirable that a waste ink collection mechanism provide improved efficacy regarding the collection of small droplets of aerosolized particles of waste ink that may otherwise tend to accumulate in undesirable and potentially harmful areas within the printer. In this way, an improved waste ink collection mechanism may decrease costs for consumers and/or increase the potential lifespan of an inkjet printer.

SUMMARY

The present disclosure is directed to a maintenance carousel for use in a printer.

A maintenance carousel for collecting waste ink in a printer is disclosed. The maintenance carousel includes an enclosure provided in the form of a shroud and a shroud cover coupled to the shroud. The shroud cover includes an opening through which waste ink may be deposited in the maintenance carousel. The maintenance carousel includes a tray supported for rotation within the shroud. The maintenance carousel also includes an actuator assembly in communication with the tray. The actuator assembly includes a one way clutch configured to permit rotation only in a first direction, an actuator arranged to cause rotation of the one way clutch, and a gear unit configured to rotate in unison with the one way clutch. The gear unit is designed to engage the tray.

In some aspects, the printer is configured to engage the actuator assembly and drive rotation of the tray by impacting the actuator each time one or more printheads of the printer deposits waste ink into the maintenance carousel.

In further aspects, the maintenance carousel includes a spring extending between an anchor positioned on the shroud cover and a hooked portion of the actuator.

In some aspects, the spring applies a return force to the actuator in response to the printer engaging the actuator.

In other aspects, the shroud includes a stopper positioned to limit the rotation of the actuator in response to the return force.

In some aspects, the direction of rotation of the actuator in response to being engaged by the printer corresponds to the first direction of rotation, and the one way clutch prevents the actuator assembly from driving rotation of the tray when the actuator rotates in response to the return force.

In some aspects, the actuator assembly is configured to drive rotation of the tray, and the shroud includes one or more flex tabs arranged to apply friction to the tray when the actuator assembly drives rotation of the tray.

In some aspects, an absorbent pad is positioned within the tray and configured to absorb the waste ink dispensed from the printer, the absorbent pad being provided in the form of felt.

In some aspects, the actuator assembly causes indexing of the tray.

In some aspects, waste ink accumulates within the tray in a circular pattern.

A maintenance carousel including electrostatic plates for collecting waste ink in a printer is disclosed. The maintenance carousel includes a shroud and a shroud cover associated with the shroud. The shroud cover includes one or more electrostatic plate housings. One or more electrostatic plates are disposed at least partially within the one or more electrostatic plate housings and are configured to generate an electromagnetic field. The maintenance carousel also includes a tray supported for rotation within the shroud and an actuator assembly configured to drive rotation of the tray. The actuator assembly includes an actuator and a clutch.

In some aspects, the one or more electrostatic plates are provided in the form of two electrostatic metallic plates having a rectilinear panel with one or more contacts.

In further aspects, the two electrostatic plates are in communication with a transformer. The transformer is configured to apply a voltage to the electrostatic plates.

In some aspects, the electromagnetic field attracts droplets or aerosolized particles of waste ink toward the electrostatic plates.

A maintenance carousel including a fan assembly for collecting waste ink in a printer is disclosed. The maintenance carousel includes an enclosure including one or more openings designed to receive waste ink from the printer, a tray disposed within the enclosure, and an actuator assembly in communication with the tray. The actuator assembly includes an actuator, a clutch, and a gear unit configured to rotate with the clutch. The maintenance carousel also includes a fan assembly in communication with the enclosure and the tray. The fan assembly is configured to generate an airflow through the maintenance carousel. An internal component of the printer is configured to engage the actuator assembly and drive rotation of the tray by impacting the actuator each time one or more printheads of the printer deposits waste ink into the maintenance carousel.

In some aspects, at least one window is formed in the tray. The at least one window permits air to flow from the tray to an exterior of the enclosure.

In some aspects, the fan assembly is configured to draw air into the maintenance carousel via the one or more openings and eject air from the maintenance carousel via an output region associated with a fan tunnel.

In some aspects, one or more filters are positioned in the fan tunnel between the fan assembly and the tray.

In some aspects, the fan tunnel includes one or more dividers configured to hold the fan assembly in place and one or more studs configured to hold the one or more filters in place.

In some aspects, the one or more filters are provided in the form of a reticulated polyurethane foam.

Figure 1:
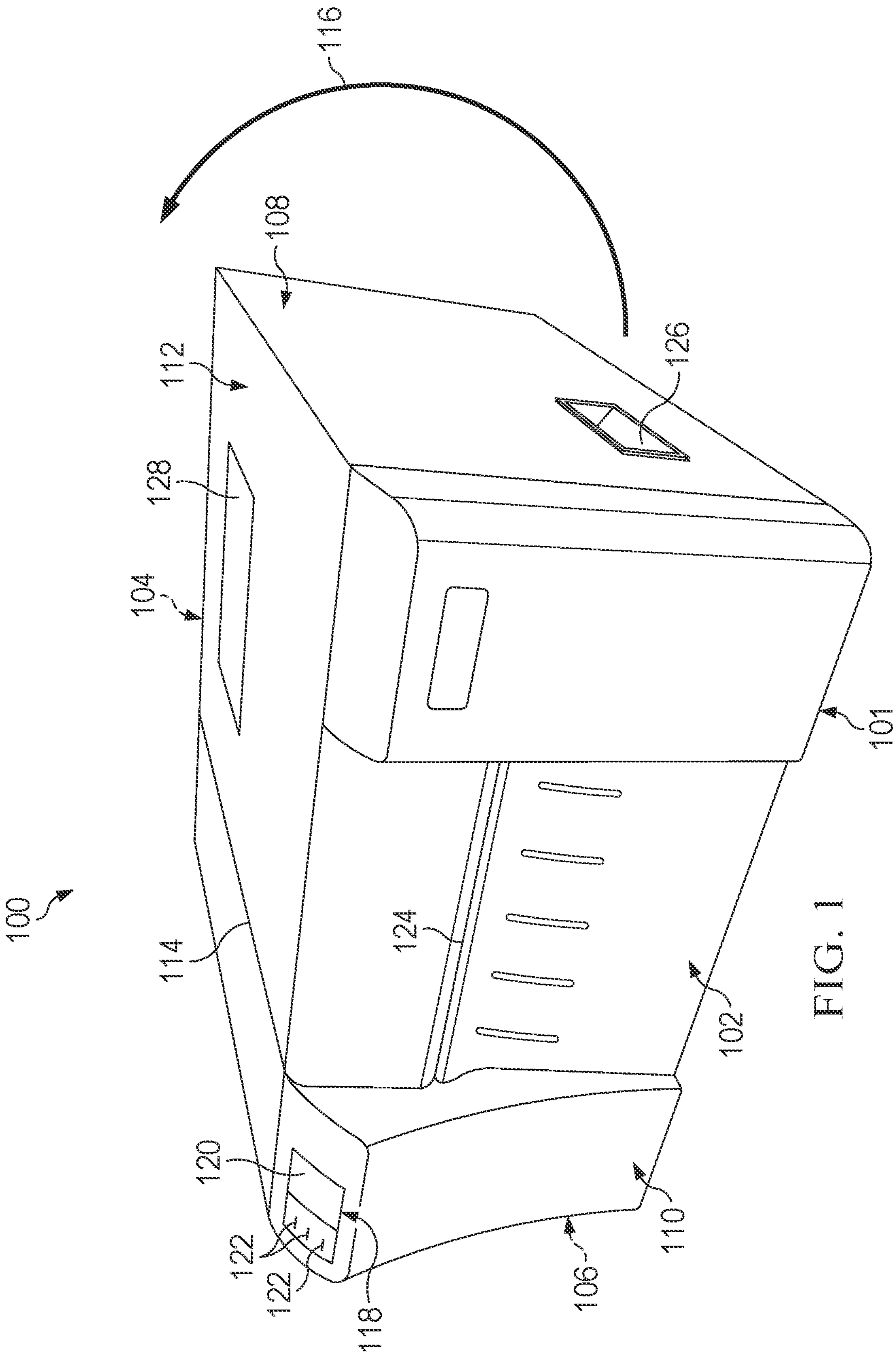
FIG. 1 illustrates a front isometric view of a first exemplary printer.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION

Before any embodiments are described in detail, it is to be understood that the disclosure is not limited in its application to the details of construction and the arrangement of components set forth in the following description or illustrated in the following drawings, which is limited only by the claims that follow the present disclosure. The disclosure is capable of other embodiments, and of being practiced, or of being carried out, in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following description is presented to enable a person skilled in the art to make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the disclosure.

Additionally, while the following discussion may describe features associated with specific devices or embodiments, it is understood that additional devices and/or features can be used with the described systems and methods, and that the discussed devices and features are used to provide examples of possible embodiments, without being limited.

Figure 2:
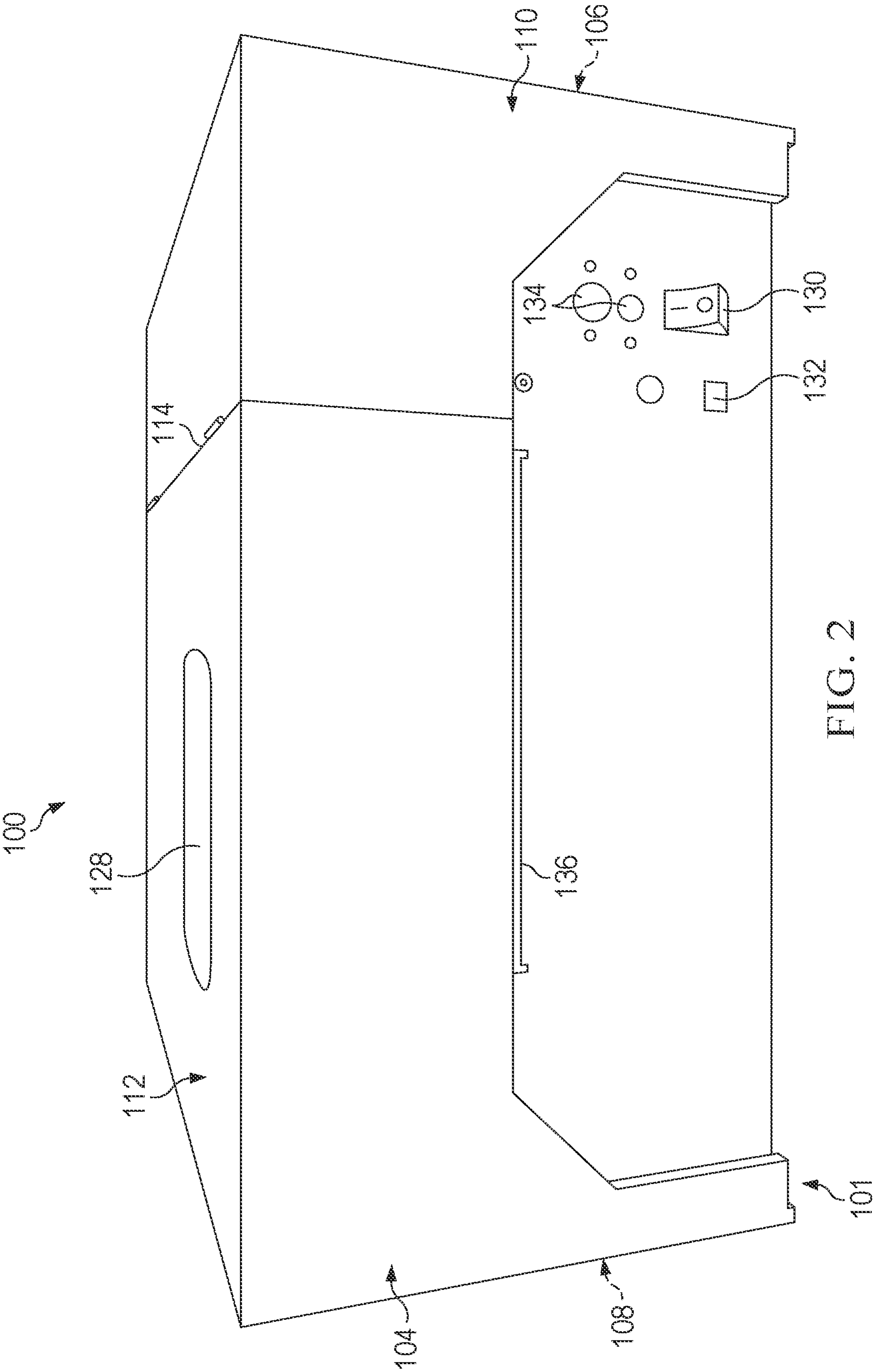
FIG. 2 illustrates a rear isometric view of the printer of FIG. 1.
Figure 3:
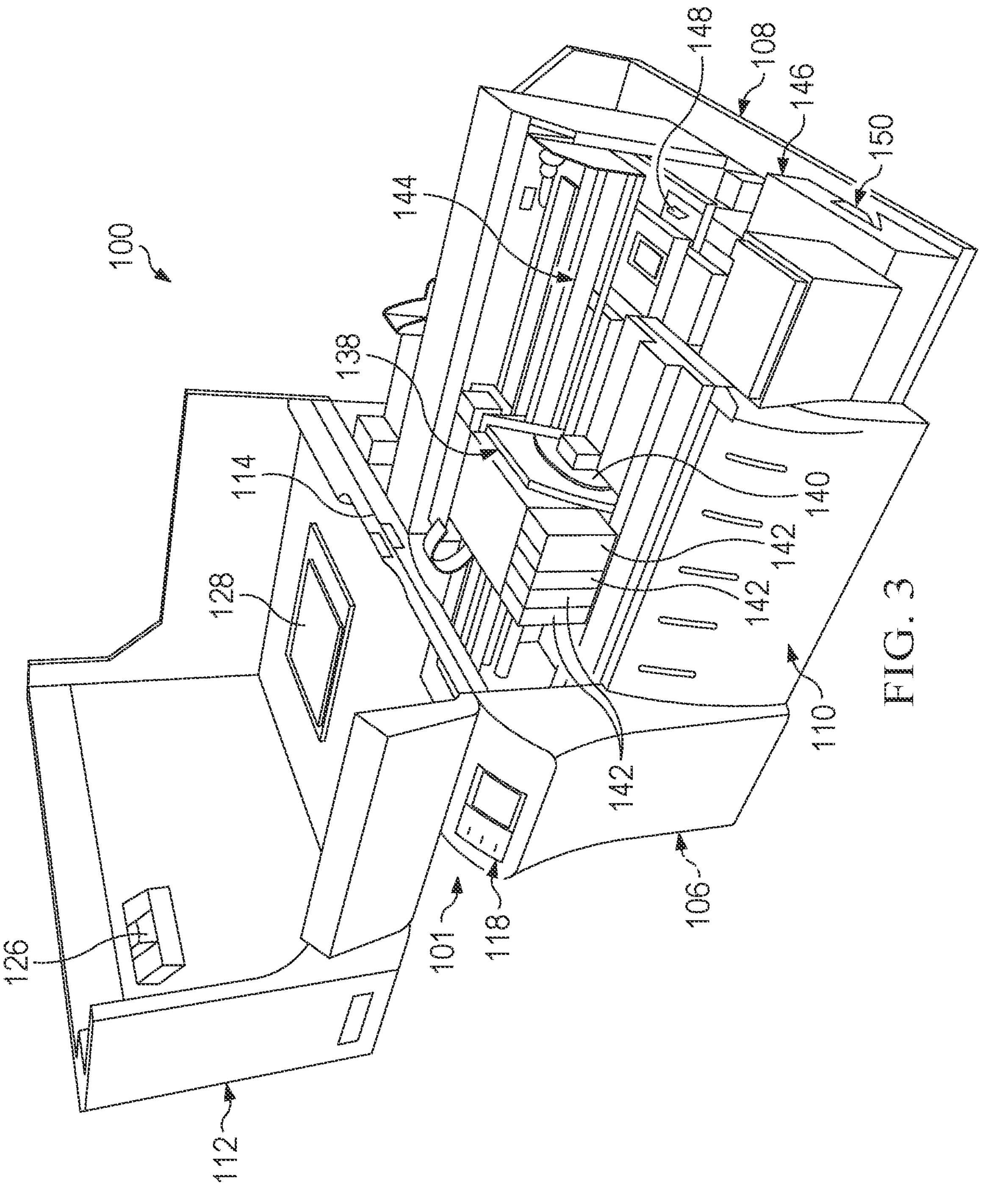
FIG. 3 illustrates an isometric view of the printer of FIG. 1 in an open configuration.

Referring first to FIGS. 1-3, an exemplary inkjet printer 100 may have a housing 101 defining a front side 102, back side 104, left side 106, and right side 108. The housing 101 is provided in the form of a base portion 110 and an enclosure cover 112. The base portion 110 and the enclosure cover 112 may be removably opened and/or attached to allow access to the internal components of the printer 100 and to allow for installation or maintenance of the internal parts. The enclosure cover 112 may be hingedly coupled to the base portion 110 via a hinge 114 positioned proximate to the left side 106 of the printer 100. For example, to convert the printer 100 from a closed configuration (see FIG. 1) to an open configuration (see FIG. 3), the enclosure cover 112 may be rotatable about the hinge 114 with respect to the base portion 110 in the direction indicated by the arrow 116 of FIG. 1.

The base portion 110 may include a control panel 118 positioned on the front side 102 of the printer 100. The control panel 118 may include a display 120 and one or more buttons 122. Together, the display 120 and one or more buttons 122 may provide an interface via which a user may observe, control, or initiate one or more settings or operations of the printer 100. The base portion 110 may also include an exit slot 124 positioned on the front side 102 of the printer 100, where paper or other printed media may be ejected from the printer 100 and be retrieved by a user.

The enclosure cover 112 may include a cover handle 126 which may bias the printer 100 toward the closed configuration. The cover handle 126 may be positioned on the right side 108 of the printer 100. A user may release the enclosure cover 112 for rotation relative to the base portion 110 by, for example, applying an upward pressure on the cover handle 126. Additionally, a viewing window 128 may be disposed on the enclosure cover 112 and may be arranged to provide visibility of one or more internal components of the printer 100 to a user.

As best shown in FIG. 2, the back side 104 of the printer 100 may include a power switch 130 configured to power the printer 100 on or off, a power port 132 which may facilitate a connection between the printer 100 and an external power source (not shown), and one or more ports 134. The one or more ports 134 may include, for example, an ethernet port, a USB port, and/or any other suitable port configured for connecting the printer 100 with external networks or devices. The back side 104 may also include an input slot 136 configured to receive and feed into the printer 100 an external source of paper (e.g., fanfold) or other printable media (not shown).

As best shown in FIG. 3, converting the printer 100 to the open configuration may expose one or more internal components of the printer 100. The printer 100 may include a carriage 138 supporting a printhead 140 and one or more ink cartridges 142. The printhead 140 may be configured to discharge ink from the one or more ink cartridges 142 onto a desired media. The carriage 138 may be slidably coupled to a gantry 144 extending between the left and right sides 106, 108 of the printer 100. For example, the carriage 138 may be arranged for linear or translational movement along the gantry 144. Thus, when the printer 100 is in use, the carriage 138 may carry the printhead 140 back and forth along the gantry 144 while the printhead 140 applies ink from the one or more ink cartridges 142 to paper or another suitable media (not shown).

The base portion 110 may support a maintenance station 146 positioned proximate to the right side 108 of the printer 100. The maintenance station 146 may be disposed generally below the printhead 140 and gantry 144 and may include one or more components configured to facilitate maintenance on or upkeep of the printhead 140 and/or other components of the printer 100. For example, the maintenance station 146 may include an optional maintenance brush 148 configured to clean (e.g., remove dried ink from) the printhead 140 and a waste ink reservoir 150 arranged to collect waste ink ejected by the printhead 140 during operation of the printer 100. As discussed hereinbelow, the waste ink reservoir 150 can be provided in the form of a maintenance carousel discussed in connection with FIGS. 4-54.

Although a specific exemplary inkjet printer 100 is described with reference to FIGS. 1-3, it should be appreciated that the inkjet printer 100 for use with the maintenance carousel disclosed herein may include or omit additional components as known in the art.

Figure 4:
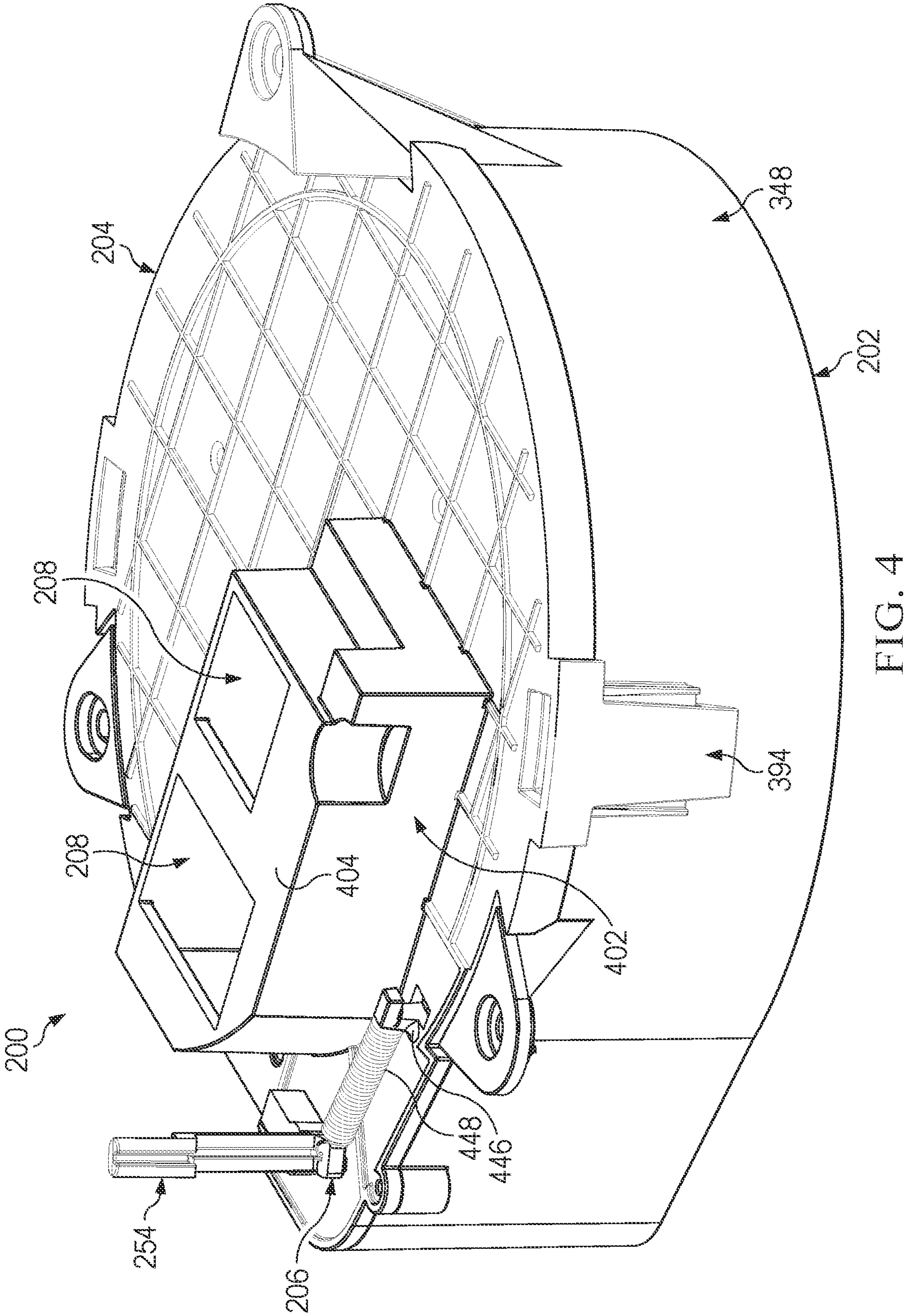
FIG. 4 illustrates an isometric view of a first exemplary maintenance carousel for use with the printer of FIGS. 1-3 constructed according to the teachings of the present disclosure.

Now turning to FIG. 4, a maintenance carousel 200 may be provided for use with the printer 100 or with any other suitable printing device. The maintenance carousel 200 may be installed within or otherwise configured for use with the printer 100 or another inkjet printer in manners known in the art. In particular, the maintenance carousel 200 may be installed in an inkjet printer 100 adjacent to or in proximity of the area in which ink is ejected from the printhead 140.

The maintenance carousel 200 may include a shroud 202 and a shroud cover 204 disposed above and detachably coupled to the shroud 202. Together, the shroud 202 and shroud cover 204 may form an enclosure which may retain one or more internal components of the maintenance carousel 200. An actuator assembly 206 may be partially disposed within the enclosure such that at least a portion of the actuator assembly 206 may emerge above the shroud cover 204 as seen in FIG. 4. The enclosure formed by the shroud 202 and the shroud cover 204 may be configured to collect waste ink (e.g., deposited by the printhead 140). Thus, the shroud cover 204 may include one or more openings 208 to allow waste ink to be deposited into the maintenance carousel 200.

Figure 5:
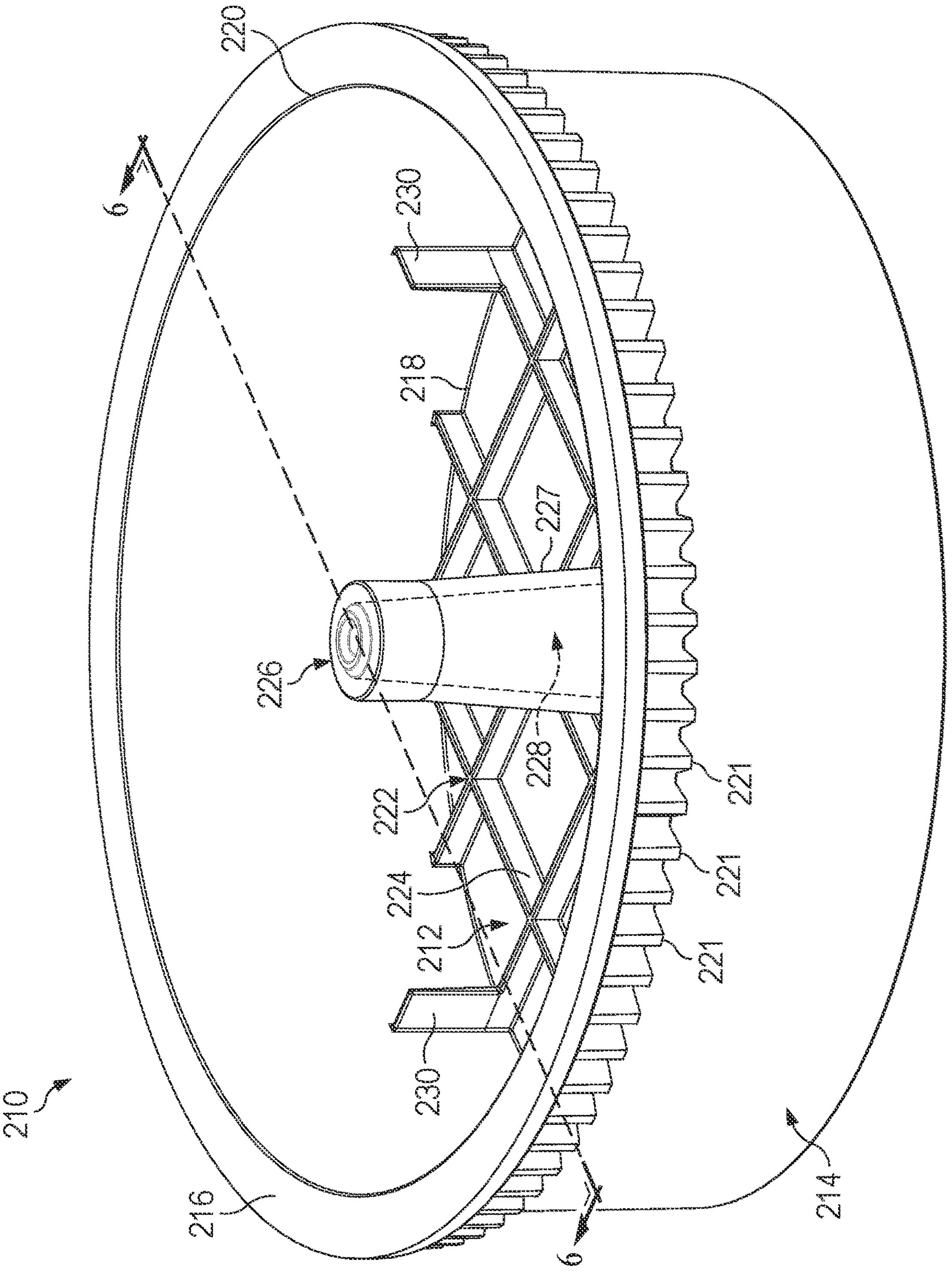
FIG. 5 illustrates a top isometric view of a tray of the maintenance carousel of FIG. 4.

Turning to FIG. 5, a tray 210 configured to collect waste ink may be disposed within the enclosure formed by the shroud 202 and the shroud cover 204. The tray 210 is provided in the form of a base 212, a sidewall 214, and a lip 216. The base 212 may be substantially flat and circular in shape. The sidewall 214 extends upwardly from the base 212 and terminates at the lip 216. The lip 216 may be substantially annular in shape and may extend outwardly away from the sidewall 214. In some instances, the base 212, sidewall 214, and lip 216 may be formed integrally with one another. In other instances, the base 212 may be coupled to and encircled by a lower perimeter 218 of the sidewall 214 and the lip 216 may be coupled to and extend outwardly from an upper perimeter 220 of the sidewall 214.

Figure 10:
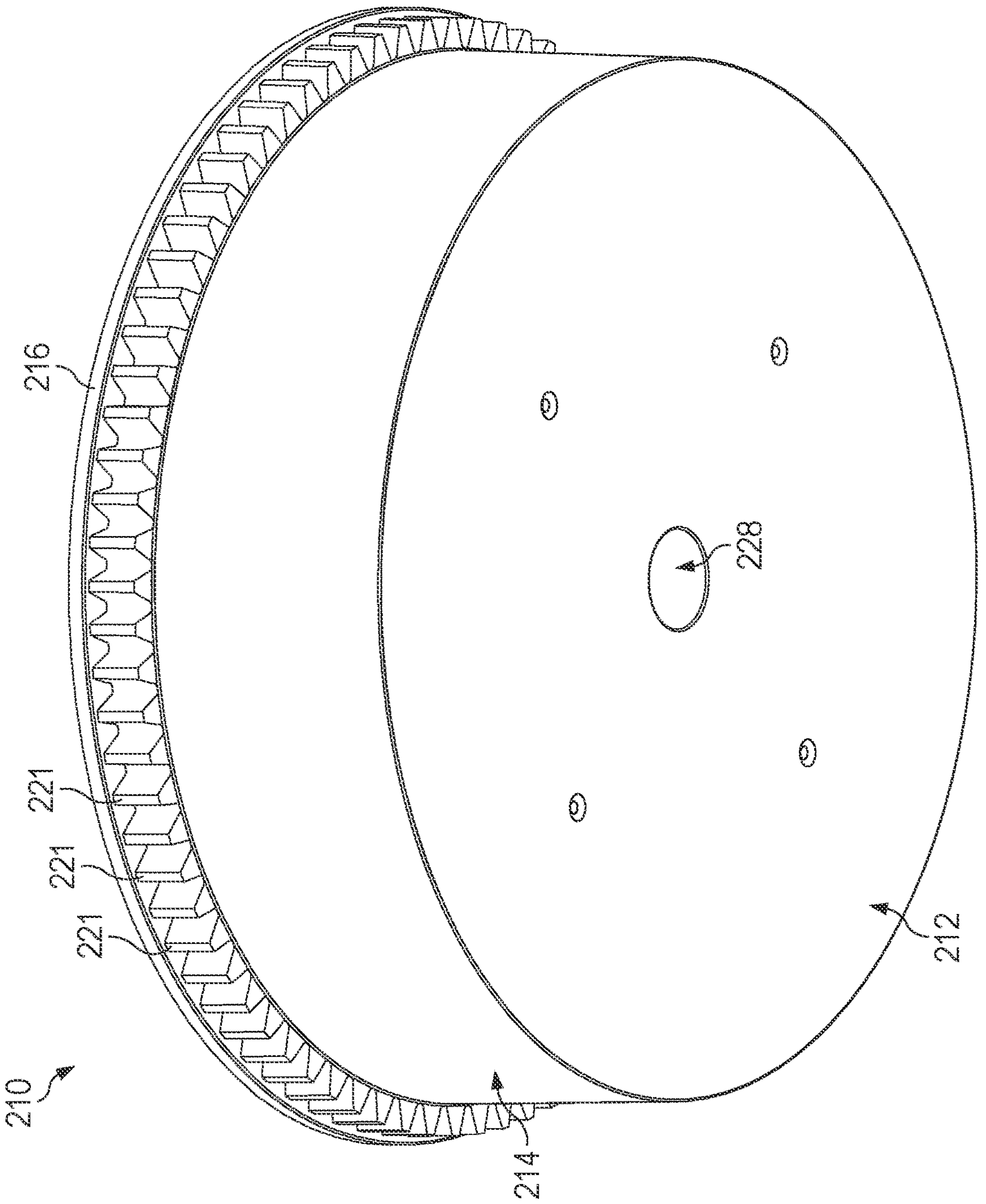
FIG. 10 illustrates a bottom isometric view of the tray of FIG. 5.

As can be seen in FIGS. 5 and 10, a first plurality of teeth 221 may circumscribe the upper perimeter 220 of the sidewall 214 (e.g., positioned adjacent to and beneath the lip 216). The first plurality of teeth 221 may circumscribe the upper perimeter 220 of the sidewall 214 and may be evenly radially spaced apart from one another. Each of the first plurality of teeth 221 may be substantially the same size and may be substantially triangular or substantially trapezoidal in shape. Alternatively, each of the first plurality of teeth 221 may be imparted with any suitable shape or size.

The tray 210 may be formed from a non-absorbent material. In some instances, the tray 210 may be formed from polypropylene, polycarbonate/acrylonitrile butadiene styrene (PC-ABS), polyoxymethylene (POM), combinations thereof, or other similar materials. In other instances, the tray 210 may be formed from metals, ceramic materials, or any other suitable material. The tray 210 may be formed from a suitable material in that the material may be selected so that the tray 210 is not corroded by the ink collected therein. The tray 210 may collect aqueous ink, therefore a tray 210 formed from a material that absorbs ambient humidity (e.g., nylon) may have difficulty keeping its shape when the maintenance carousel 200 is in use and may be undesirable.

In some instances, the base 212 of the tray 210 may include a tray support structure 222 to impart stability and/or structural rigidity to the tray 210 or to the maintenance carousel 200 as a whole. As shown in FIG. 5, the tray support structure 222 is provided in the form of a plurality of wall members 224 arranged in a grid pattern across at least a portion of the base 212. In other instances, the tray support structure 222 may be provided in any other suitable form or may be omitted.

Figure 6:
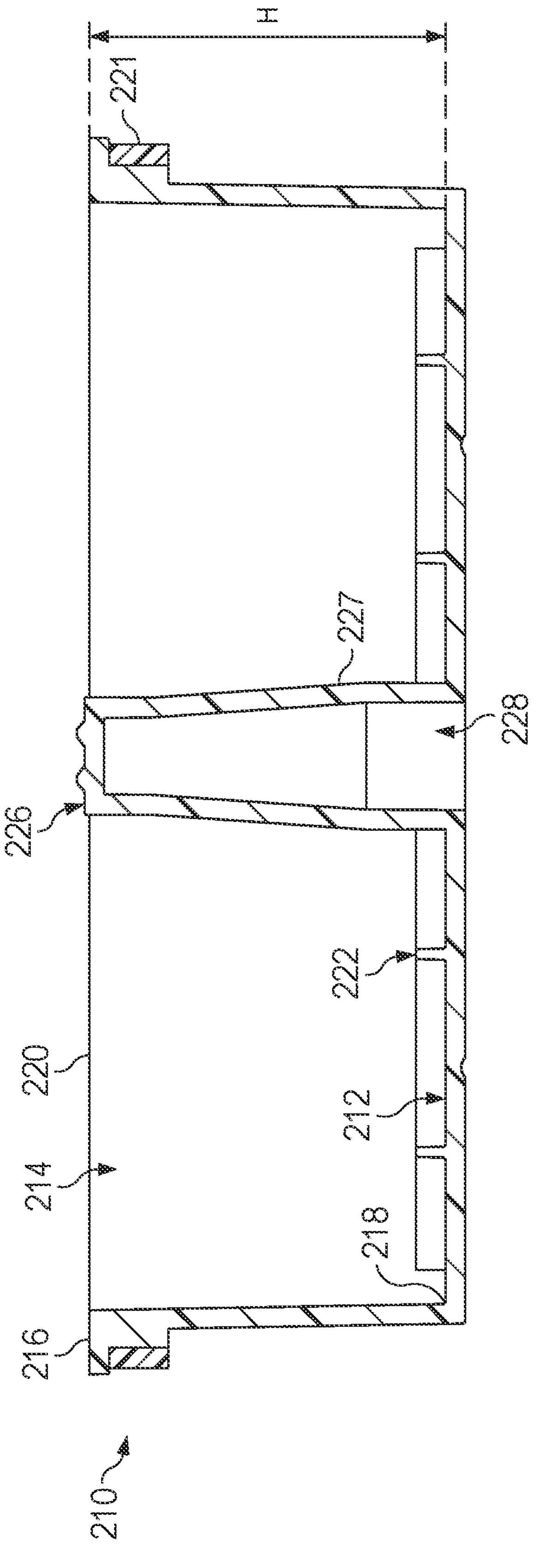
FIG. 6 illustrates a cross sectional view of the tray of FIG. 5 taken along the line 6-6 of FIG. 5.

As best shown in FIG. 6, a height H of the tray 210 may be defined by the distance between the base 212 and the upper perimeter 220 of the sidewall 214 measured in a direction substantially perpendicular to the base 212. The height H may be imparted with a value of about 5 millimeters (mm) to about 100 mm, or 5 mm to 100 mm. For example, the height H may be imparted with a value of at least about 10 mm (or 10 mm), or at least about 20 mm (or 20 mm), or at least about 30 mm (or 30 mm), or at least about 40 mm (or 40 mm), or at least about 50 mm (or 50 mm), or at least about 60 mm (or 60 mm), or at least about 70 mm (or 70 mm), or at least about 80 mm (or 80 mm), or at least about 90 mm (or 90 mm). In some instances, the height H may be imparted with a value of about 35 mm (or 35 mm). The value with which the height H is imparted may be selected at least in part depending on the allowable aerosol level and/or available aerosol mitigation techniques. Further, the height H may be adjusted based on the specific dimensions of the printer 100 to accommodate the maintenance carousel 200.

Figure 7:
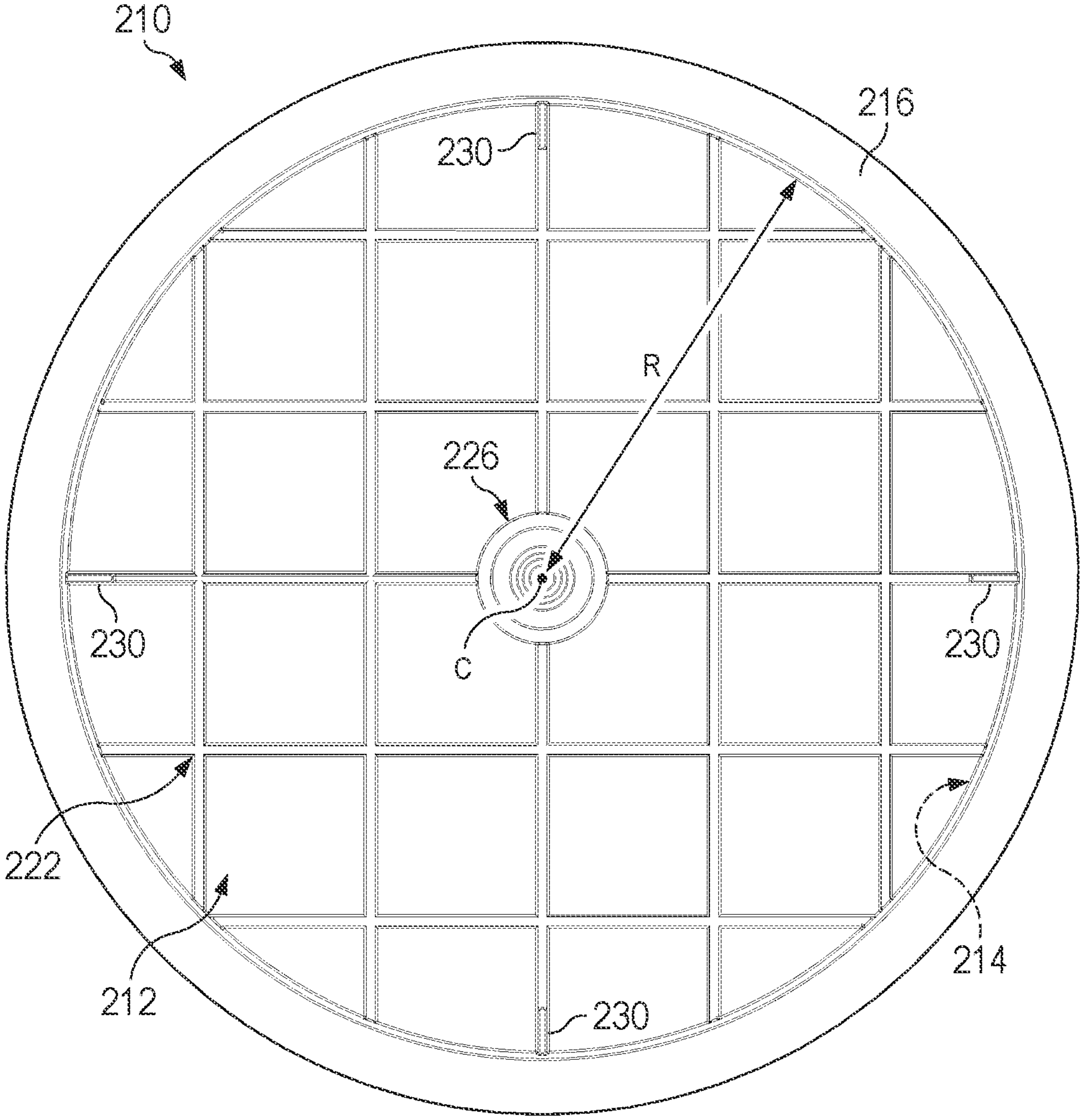
FIG. 7 illustrates a top plan view of the tray of FIG. 5.

A hollow receiving post 226 may be formed integrally with the base 212 or may be coupled to the base 212 and extend upwardly therefrom. The receiving post 226 may be substantially cylindrical or substantially frustoconical in shape. A cavity 228 may be defined by the sidewall 227 of the receiving post 226 and extend at least partially therethrough (see FIG. 6). The receiving post 226 may be positioned centrally with respect to the base 212. As best shown in FIG. 7, the receiving post 226 may be positioned on the base 212 such that it is substantially equidistant from each point along the sidewall 214. The receiving post 226 may be formed integrally with the base 212 or the receiving post 226 may be coupled to the base 212 and extend upwardly therefrom.

As best shown in FIG. 7, a radius R of the tray 210 may be defined by the radial distance between a center C of the receiving post 226 and the sidewall 214. The radius R may be imparted with a value of about 15 mm to about 200 mm (or 15 mm to 200 mm). For example, the radius R may be imparted with a value of at least about 20 mm (or 20 mm), or at least about 30 mm (or 30 mm), or at least about 40 mm (or 40 mm), or at least about 50 mm (or 50 mm), or at least about 60 mm (or 60 mm), or at least about 70 mm (or 70 mm), or at least about 80 mm (or 80 mm), or at least about 90 mm (or 90 mm), or at least about 100 mm (or 100 mm), or at least about 110 mm (or 110 mm), or at least about 120 mm (or 120 mm), or at least about 130 mm (or 130 mm), or at least about 140 mm (or 140 mm), or at least about 150 mm (or 150 mm), or at least about 160 mm (or 160 mm), or at least about 170 mm (or 170 mm), or at least about 180 mm (or 180 mm), or at least about 190 mm (or 190 mm). In some instances, the radius R may be imparted with a value of about 50 mm (or 50 mm). The value with which the radius R is imparted may be selected at least in part depending on the layout of the printheads and the available space within the printer.

Turning again to FIG. 5, the tray 210 may include one or more fins 230 configured to prevent rotation of an absorbent pad 234 within the tray 210 positioned along the sidewall 214 and extending inwardly therefrom (e.g., in the direction of the receiving post 226). The fins 230 may be formed integrally with the sidewall 214 and extend inwardly therefrom. Additionally, or alternatively, the fins 230 may be formed integrally with the base 212 and extend upwardly therefrom. In instances where the base 212 includes a tray support structure 222, the fins 230 may also be formed integrally with the tray support structure 222 or may be coupled to the tray support structure 222 and extend upwardly therefrom. In some instances, each fin 230 may be connected to each of the sidewall 214 and the tray support structure 222. The fins 230 may generally circumscribe the base 212 and may be spaced radially about the lower perimeter 218 of the sidewall 214. As best shown in FIGS. 5 and 7, the tray 210 may include four fins 230 disposed about the lower perimeter 218 in regular ninety-degree increments. In other instances, however, the tray 210 may include any number of fins 230 configured in any suitable arrangement.

Figure 8:
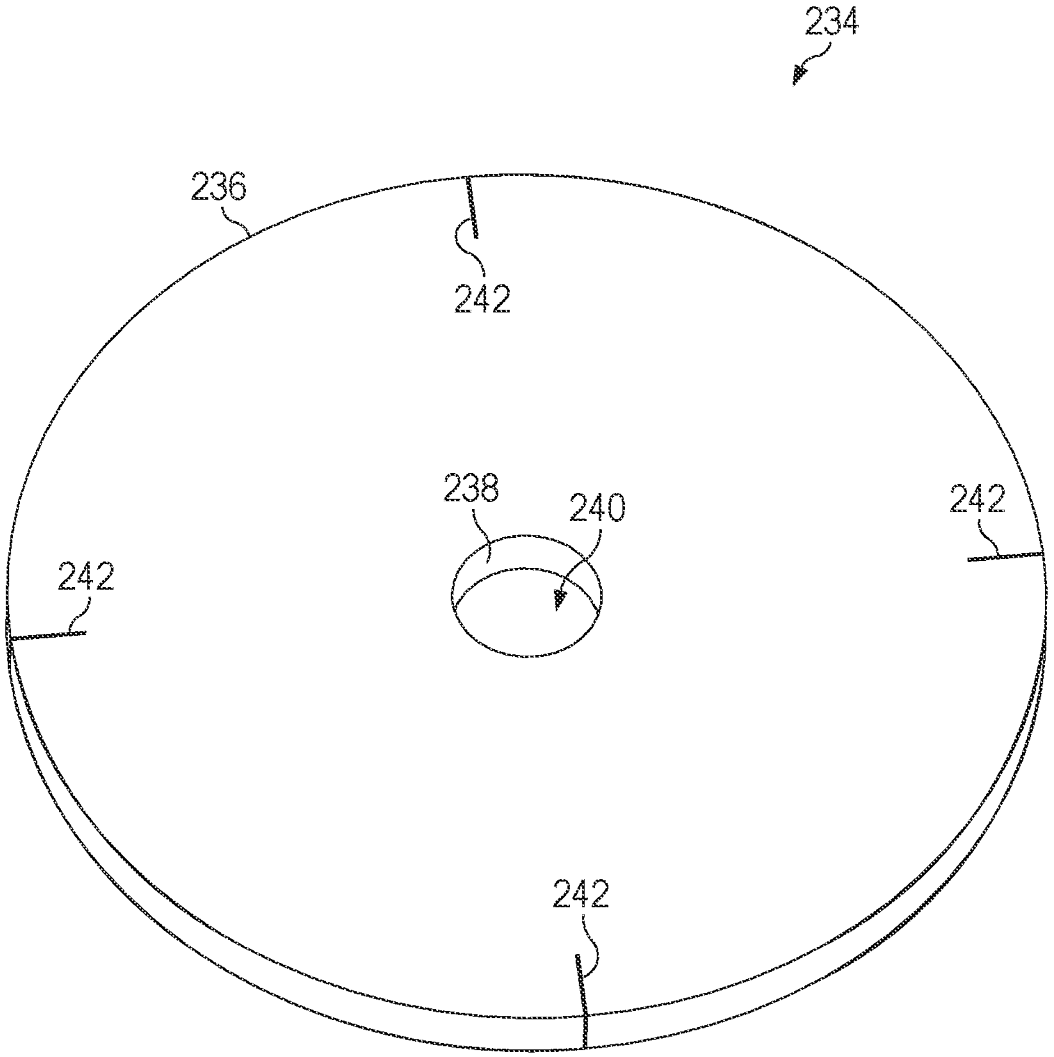
FIG. 8 illustrates an isometric view of an absorbent pad of the maintenance carousel of FIG. 4.
Figure 9:
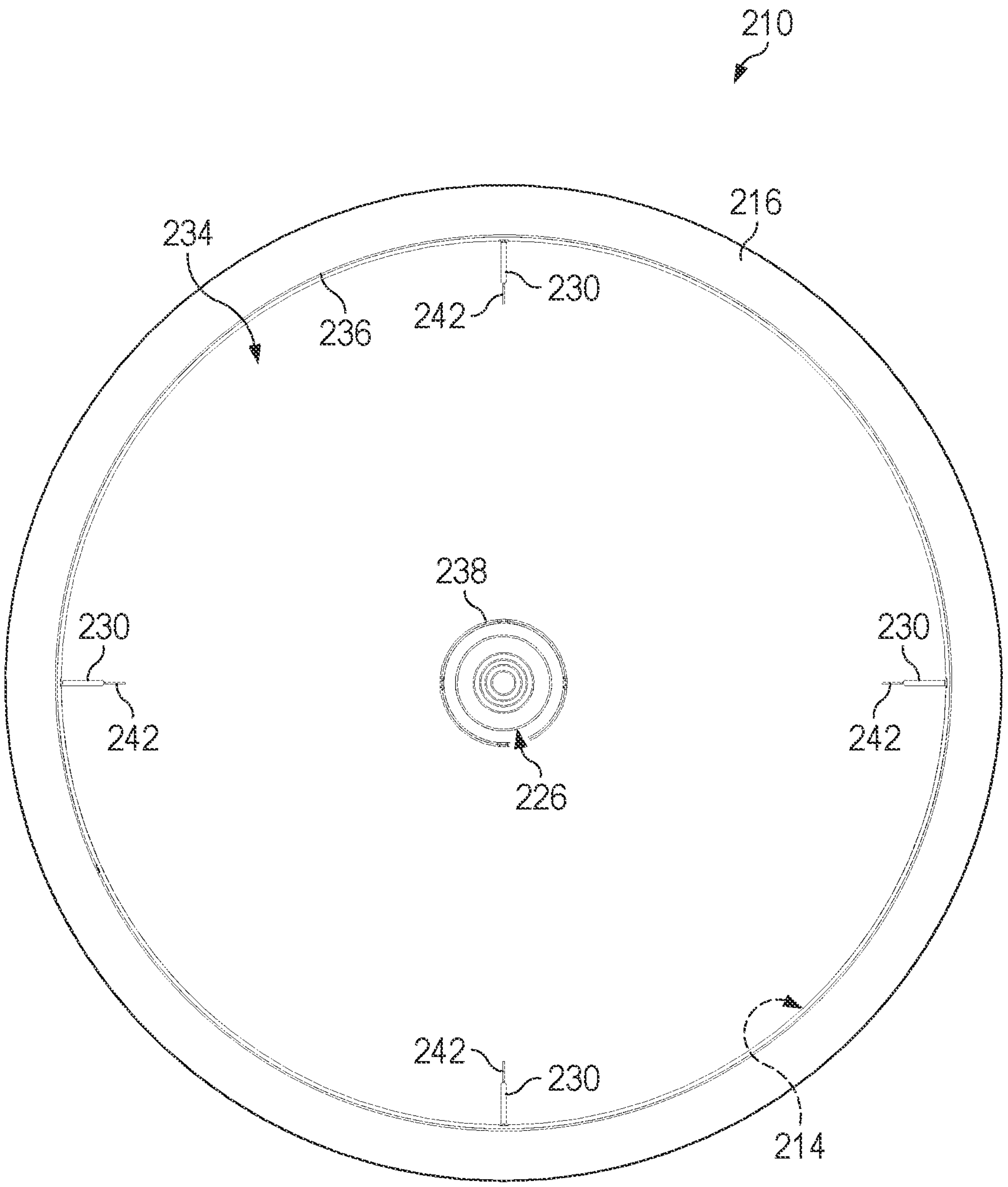
FIG. 9 illustrates a top plan view of the absorbent pad of FIG. 8 disposed within the tray of FIG. 5.

Turning to FIGS. 8 and 9, the absorbent pad 234 may be designed to be positioned within the tray 210. In some forms, the absorbent pad 234 may be substantially annular in shape and defined by an outer diameter 236 and an inner diameter 238. The outer diameter 236 may correspond to and be imparted with substantially the same dimensions as the lower perimeter 218 of the sidewall 214. The inner diameter 238 may define a central opening 240. The opening 240 may correspond to and be configured to receive the receiving post 226 when the absorbent pad 234 is positioned within the tray 210. One or more slots 242 corresponding to the one or more fins 230 of the tray 210 may be disposed about the outer diameter 236 of the absorbent pad 234 and extend entirely therethrough. As shown in FIG. 9, the absorbent pad 234 may include four slots 242 evenly radially spaced apart from one another about the outer diameter 236 (e.g., mirroring the arrangement of the fins 230). Thus, when the absorbent pad 234 is positioned within the tray 210, each slot 242 may receive one fin 230. In this way, the fins 230 and slots 242 may prevent rotation or movement of the absorbent pad 234 with respect to the tray 210 while the maintenance carousel 200 is in use. In other instances, the absorbent pad 234 may include any number of slots 242. However, the number of slots 242 of the absorbent pad 234 may be equal to the number of fins 230 of the tray 210, and the slots 242 and fins 230 may be arranged about the outer diameter 236 and the lower perimeter 218, respectively, in a complementary manner.

Thus, the absorbent pad 234 may rest on the tray support structure 222 when placed in the tray 210. In instances where the tray support structure 222 is omitted, the absorbent pad 234 may instead rest directly on the base 212. In either case, the position and/or orientation of the absorbent pad 234 with respect to the tray 210 may be fixed by the engagement between the fins 230 and the slots 242. In some instances, the absorbent pad 234 may be provided in the form of a felt pad. In other instances, the absorbent pad 234 may be provided in the form of a foam sponge, a fibrous mat, a superabsorbent polymer, combinations thereof, or any other similarly absorbent material. Thus, the absorbent pad 234 may absorb waste ink deposited in the maintenance carousel 200 while the waste ink is wet. As the waste ink dries and/or the absorbent pad 234 becomes increasingly saturated, waste ink may begin to accumulate on the absorbent pad 234. Due to indexing performed by the maintenance carousel 200 (described below with reference to FIG. 37) ink build up on the absorbent pad 234 may be imparted with a substantially circular geometry. In this way, the maintenance carousel 200 may prevent or hinder the development of ink build up into vertical formations (e.g., stalagmites) that can hinder the operation of one or more components of the printer.

Figure 11:
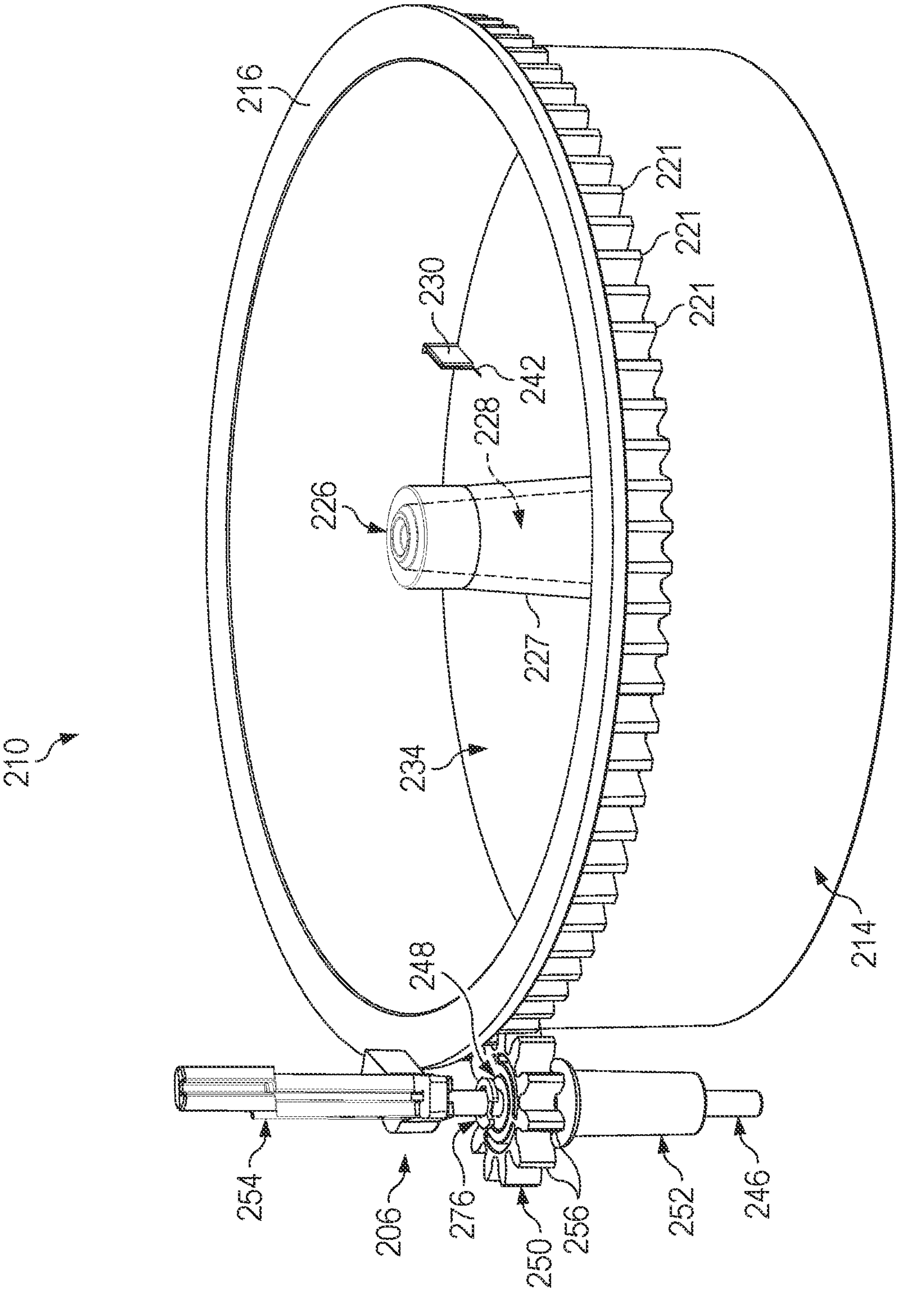
FIG. 11 illustrates an isometric view of an actuator assembly of the maintenance carousel of FIG. 4 positioned adjacent to the tray of FIG. 5.

Turning to FIG. 11, the actuator assembly 206 may be positioned adjacent to and may engage the tray 210. The actuator assembly 206 is provided in the form of a post 246, a one way clutch 248 positioned along the post 246, a gear 250 encircling the one way clutch 248 and supported by a gear support 252, and an actuator 254 positioned at an end of the post 246. The gear 250 may include a second plurality of teeth 256 protruding outwardly therefrom, which may be imparted with a complementary geometry relative to the first plurality of teeth 221 of the tray 210. Thus, the gear 250 may be configured to engage the first plurality of teeth 221 and drive rotation of the tray 210. In some instances, the gear 250 may be provided in the form of a polyoxymethylene (POM) material to provide a desirable level of friction during engagement between the first and second pluralities of teeth 221, 256. In other instances, the gear 250 may be formed from any suitable material.

Figure 12:
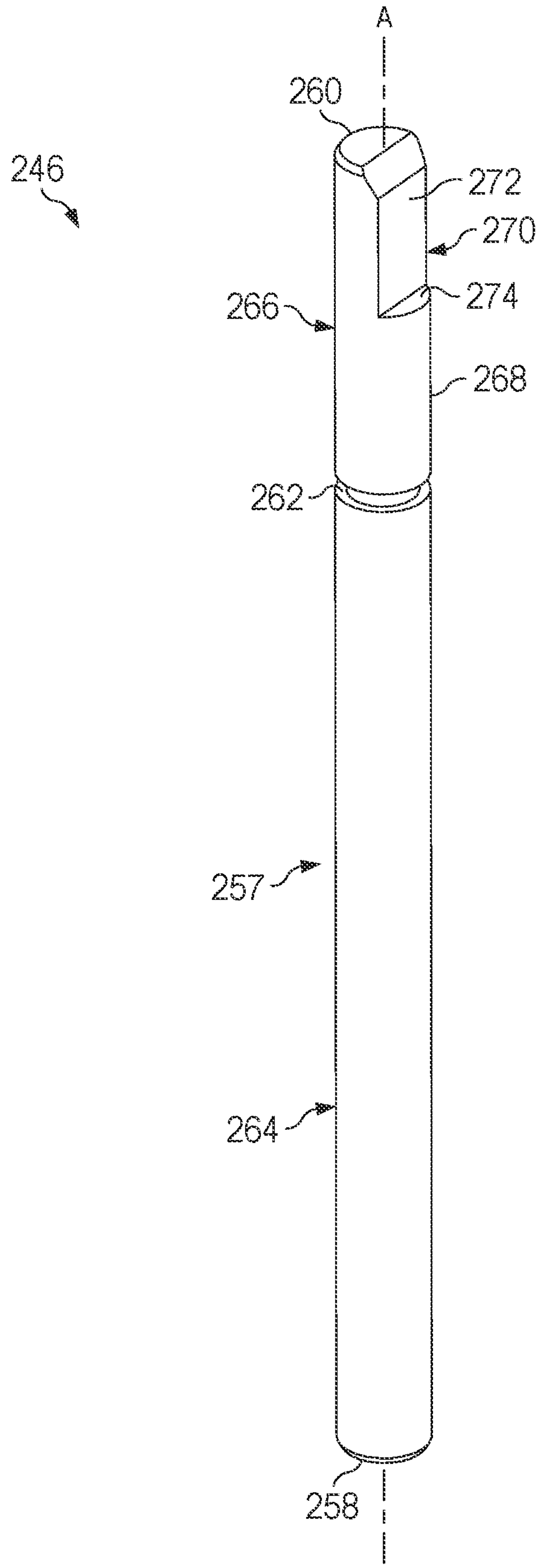
FIG. 12 illustrates an isometric view of a post of the actuator assembly of FIG. 11.

As best seen in FIG. 12, the post 246 is provided in the form of a body 257 having a first end 258 and a second end 260 opposing the first end 258. A groove 262 may be positioned along the post 246 between the first and second ends 258, 260 and may be disposed closer to the second end 260 than it is to the first end 258. However, in other instances, the groove 262 may be positioned in any suitable location on the body 257.

The body 257 of the post 246 is defined by a first lower segment 264 positioned between the groove 262 and the first end 258 and a second upper segment 266 positioned between the groove 262 and the second end 260. The first segment 264 may be substantially cylindrical in shape. The second segment 266 may include a cylindrical portion 268 proximate to the groove 262 and a stepped notched portion 270 proximate to the second end 260. The cylindrical portion 268 may be substantially cylindrical in shape and may be imparted with substantially the same characteristics as the first segment 264. The notched portion 270 may also be imparted with substantially the same cylindrical structure as the first segment 264 and cylindrical portion 268, except that the notched portion 270 may have a portion of the cylindrical structure "carved out." The notched portion 270 may include a vertical wall 272 provided in the form of a substantially smooth and/or flat surface extending in a direction substantially parallel to a central longitudinal axis A of the post 246. The notched portion 270 may also include a ridge 274 adjoining the vertical wall 272. The ridge 274 may be provided in the form of a substantially flat or smooth surface extending in a direction substantially perpendicular to the axis A. In other instances, however, the notched portion 270 may be imparted with any suitable shape or structure.

Figure 13:
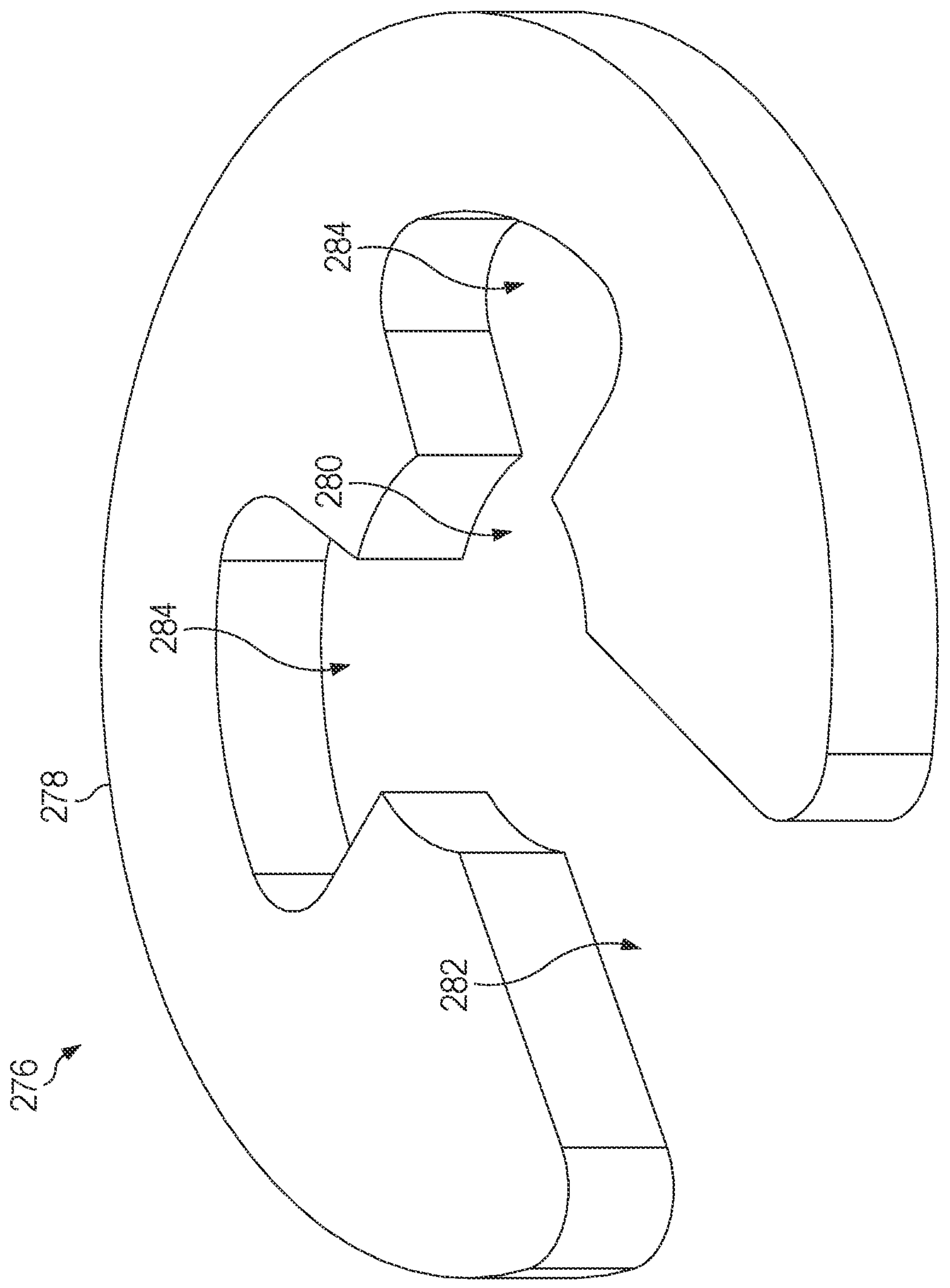
FIG. 13 illustrates an isometric view of a washer of the actuator assembly of FIG. 11.

Now turning to FIG. 13, a washer 276 designed to reduce stress on or more evenly distribute forces applied to the actuator assembly 206 while the maintenance carousel 200 is in use may be installed on the post 246 at the groove 262. The washer 276 may be substantially annular in shape with a substantially circular outer edge 278 and a substantially circular central opening 280. The washer 276 may include an entrance slot 282 forming an opening from the central opening 280 to the outer edge 278. In some instances, one or more cutouts 284 may be formed in the washer 276 adjacent to the central opening 280. In some instances, the washer 276 includes two cutouts 284. In other instances, the washer 276 may include any number of cutouts 284 or the cutouts 284 may be omitted.

Figure 14:
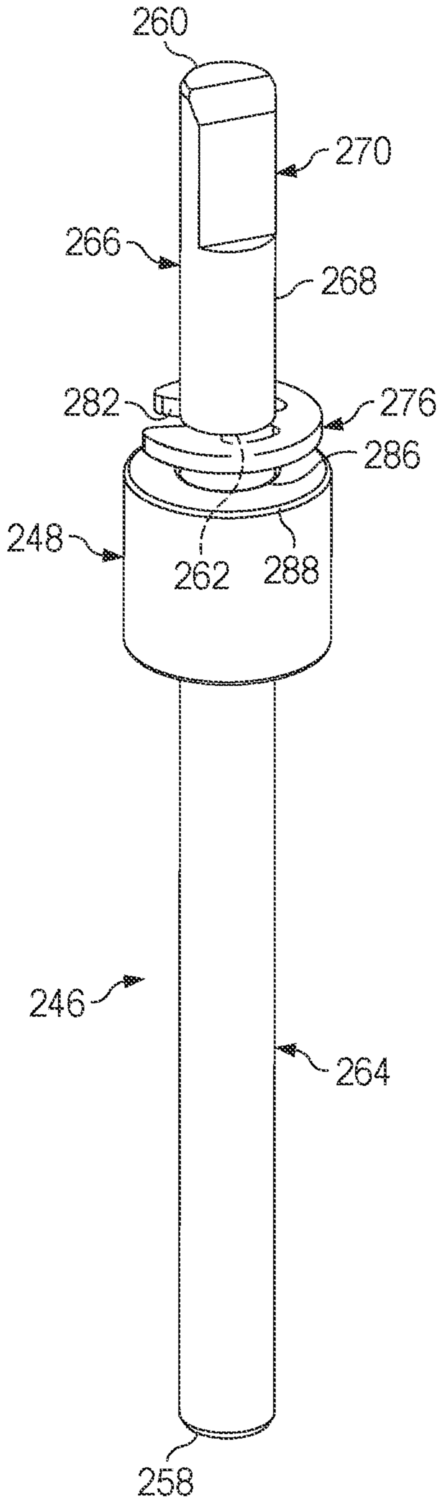
FIG. 14 illustrates an isometric view of the post of FIG. 12 with the washer of FIG. 13 and a one way clutch of the actuator assembly of FIG. 11 disposed thereon.

As shown in FIG. 14, the washer 276 may be installed or positioned along the post 246 at the groove 262. The washer 276 may be pressed into the groove such that the entrance slot 282 receives the post 246. The washer 276 may thus be coupled to the post 246 by, e.g., a press fit. The one way clutch 248 may be positioned along the first segment 264 of the post 246 and may be located proximate to the washer 276 and the groove 262. The one way clutch 248 may be provided in the form of an annular cylinder. The one way clutch 248 may include an inner diameter 286 and an outer diameter 288. The inner diameter 286 may be imparted with substantially the same structure and/or dimensions as the first segment 264 such that post 246 may be inserted therethrough. The one way clutch 248 may be configured to permit rotation in one direction and to prevent rotation in an opposite direction. The one way clutch 248 may permit rotation in a clockwise direction and prevent rotation in a counter-clockwise direction, or vice versa.

Figure 15:
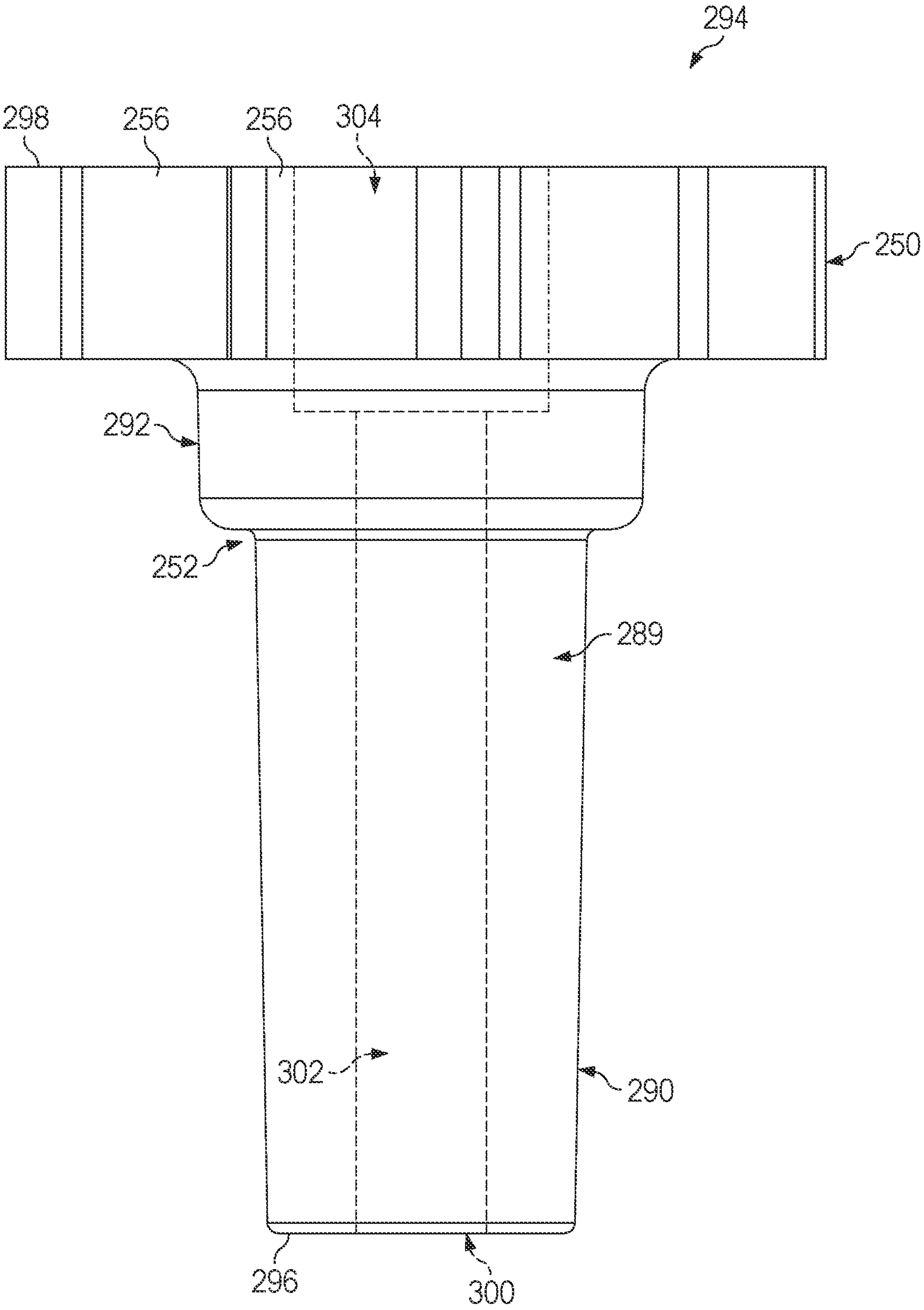
FIG. 15 illustrates a side elevational view of a gear unit of the actuator assembly of FIG. 11.

Turning to FIG. 15, the gear 250 may be positioned atop the gear support 252. The gear 250 and the gear support 252 may be formed integrally with one another or the gear 250 may be coupled to the gear support 252. The gear support 252 is provided in the form of a member 289 having a body portion 290 and a neck portion 292. The gear 250, body portion 290, and neck portion 292 may each be substantially annular in shape and may be provided in the form of coaxial structures (e.g., when the actuator assembly 206 is assembled, the gear 250 and gear support 252 may each be formed around the axis A of the post 246, see FIG. 17). Together, the gear 250 and the gear support 252 may constitute a gear unit 294.

Figure 16:
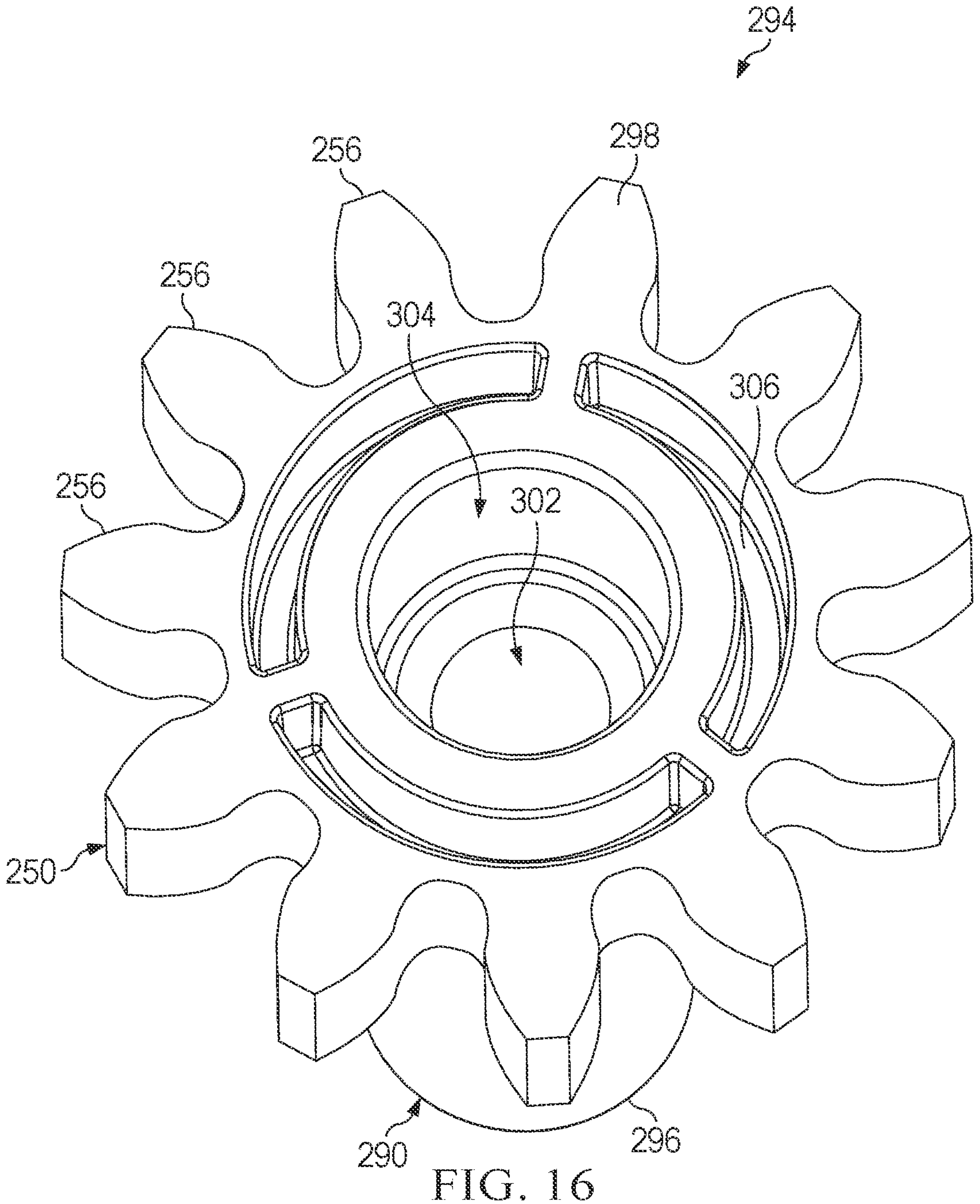
FIG. 16 illustrates a top isometric view of the gear unit of FIG. 15.

The gear unit 294 may include a first end 296, a second end 298, and a channel 300 extending therebetween. The channel 300 may include a lower channel 302 and an upper channel 304. The lower channel 302 may extend from the first end 296 of the gear unit 294 through the entirety of the body portion 290 and through at least a portion of the neck portion 292. The lower channel 302 may be provided in the form of a substantially cylindrical conduit configured to receive the post 246. The upper channel 304 may extend from the second end 298 of the gear unit 294 through the entirety of the gear 250 and through at least a portion of the neck portion 292 until the upper channel 304 and lower channel 302 meet. The upper channel 304 may also be provided in the form of a substantially cylindrical conduit. However, the upper channel 304 may be configured to receive the one way clutch 248. An internal diameter of the upper channel 304 may correspond to or may be substantially equal to the outer diameter 288 of the one way clutch 248. In some instances, the gear 250 may include one or more recesses 306 positioned at the second end 298 of the gear unit 294. As best seen in FIG. 16, the gear 250 may include three annular recesses 306 disposed radially about the upper channel 304. However, in other instances, the gear 250 may include any number of recesses 306 which may be arranged in any suitable configuration. Alternatively, in some instances, the recesses 306 may be omitted.

Figure 17:
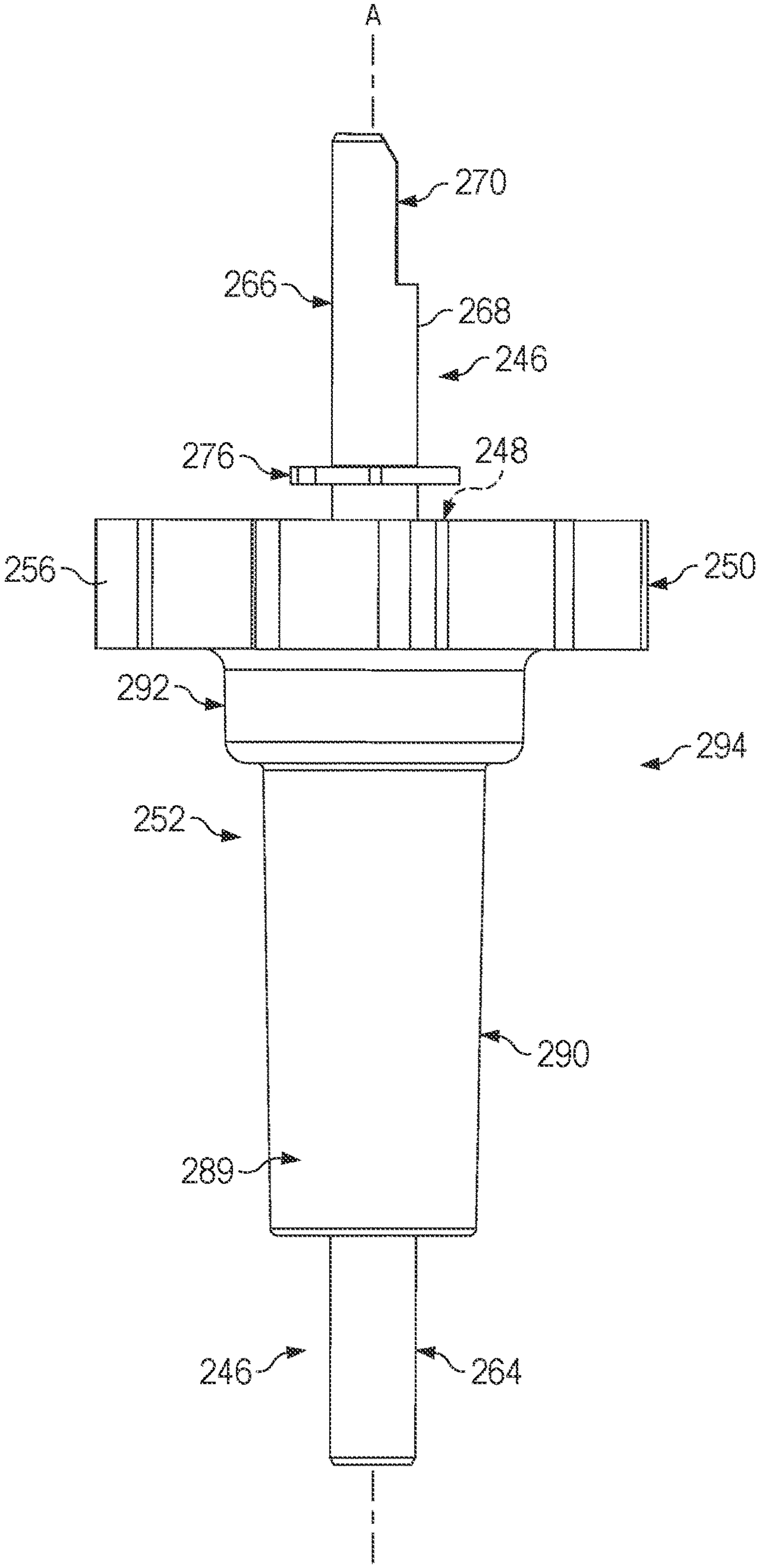
FIG. 17 illustrates a side isometric view of a portion of the actuator assembly of FIG. 11.
Figure 18:
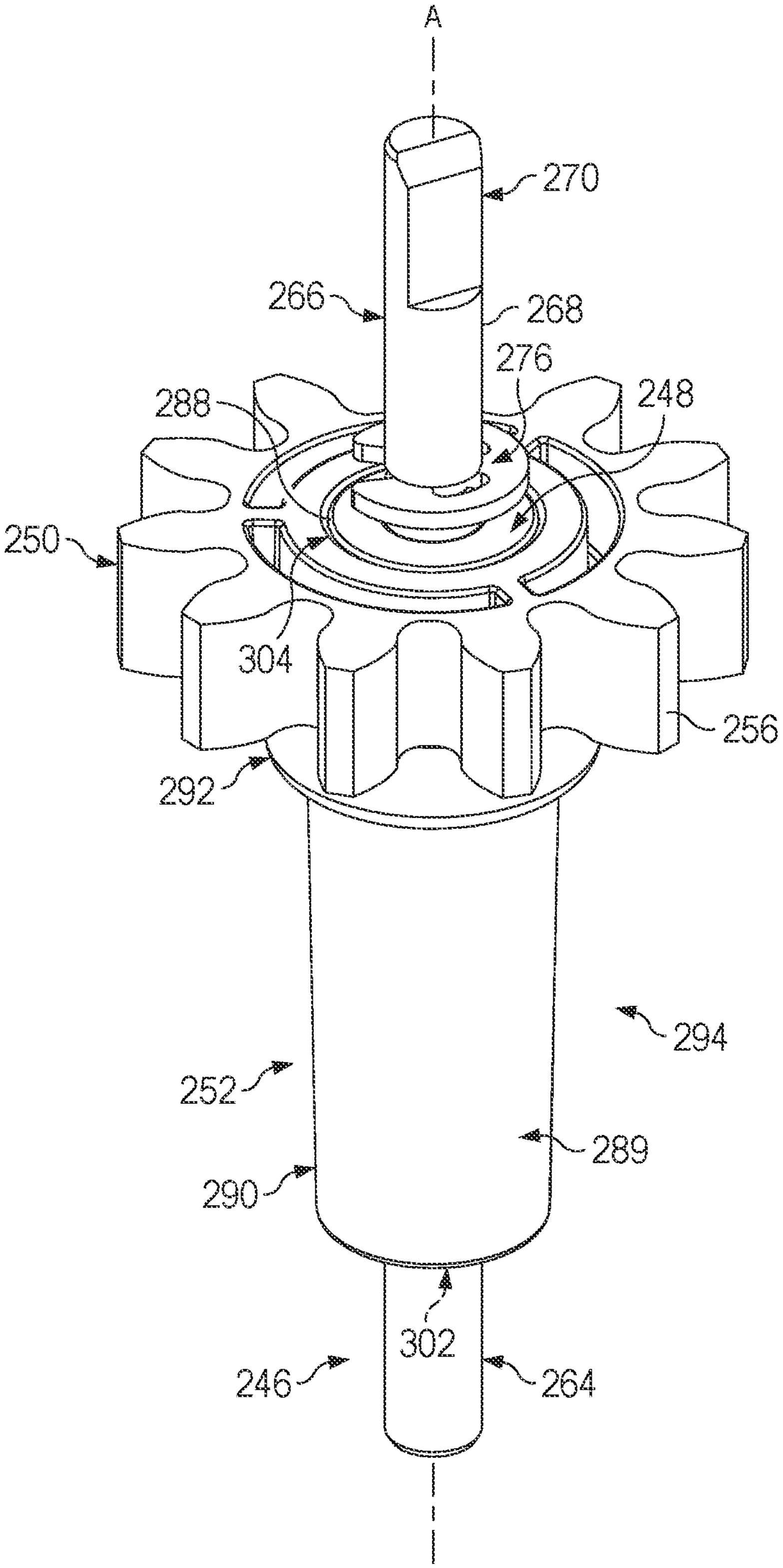
FIG. 18 illustrates a top isometric view of the portion of the actuator assembly of FIG. 11 shown in FIG. 17.

Turning now to FIGS. 17 and 18, the channel 300 may receive the post 246 and the one way clutch 248. The gear unit 294, post 246, and one way clutch 248 may be arranged such that the lower channel 302 receives a portion of the first segment 264 of the post 246 and the upper channel 304 receives the one way clutch 248 (in addition to the portion of the first segment 264 encased by the one way clutch 248). Thus, the one way clutch 248 and the gear unit 294 may be configured such that a movement or rotation of the one way clutch 248 may translate to a responsive movement or rotation of the gear unit 294. The one way clutch 248 may be pressed into the upper channel 304 (e.g., the one way clutch 248 may be pressed into the gear 250 and a portion of the neck portion 292) such that a press fit is created between the one way clutch 248 and the gear unit 294. The press fit may permit the one way clutch 248 and the gear unit 294 to move or rotate as a unitary whole. In instances where the one way clutch 248 prohibits rotation in the counter-clockwise direction, the gear unit 294 may similarly be prevented from rotating in the counter-clockwise direction.

Figure 19:
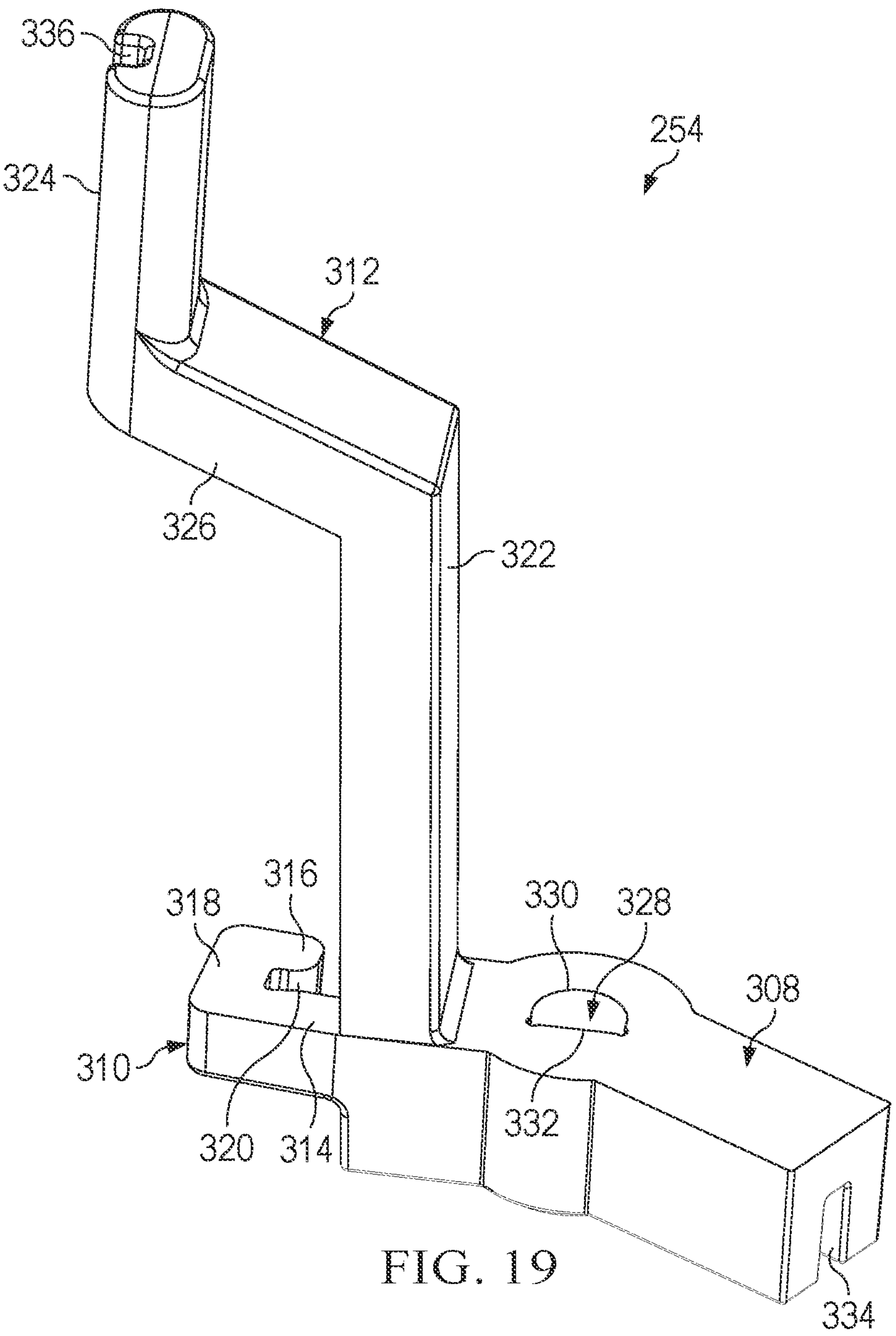
FIG. 19 illustrates an isometric view of an actuator of the actuator assembly of FIG. 11.

Turning to FIG. 19, the actuator 254 may be provided in the form of a base member 308, a hook 310, and an arm 312. The hook 310 may be formed integrally with the base member 308 or the hook 310 may be coupled to the base member 308 and extend outwardly therefrom. The hook 310 may include a shank 314 connected to the base member 308, a point 316, and a bend 318 extending between the shank 314 and the point 316. The bend 318 may be oriented substantially perpendicular to each of the shank 314 and the point 316, and the point 316 may extend from the bend 318 back in the direction of the base member 308 (e.g., the point 316 may be substantially parallel with the shank 314). Thus, a gap 320 may be formed as an opening between the shank 314 and the point 316. The gap 320 may be configured to capture, for example, a hooked object or a piece of material.

The arm 312 may be formed integrally with the base member 308 or the arm 312 may be coupled to the base member and extend upwardly therefrom. The base member 308 and the hook 310 may be substantially coplanar. The arm 312 may include an extension piece 322 extending upward from the base member 308 in a direction substantially perpendicular to the plane occupied by the base member 308 and the hook 310. The arm 312 may include a trigger 324 arranged to be engaged by one or more components of the printer 100 (e.g., the carriage 138). The trigger 324 may be formed integrally with the extension piece 322 or the trigger 324 may be coupled to the extension piece 322 and extend upwardly therefrom. In some instances, the arm 312 may include a connector 326 positioned between and connecting the extension piece 322 and the trigger 324. As shown in FIG. 19, the connector 326 is provided in the form of a rectilinear piece extending angularly between the extension piece 322 and the trigger 324. In other instances, the connector 326 may be omitted and the trigger 324 may be directly connected to the extension piece 322. In still other instances, the arm 312 may be provided as a single component the upper end of which may perform the function of the trigger 324 or the actuator 254 may be provided in any other suitable form. The dimensioning and height of the actuator

254 may be adjusted based on the size of the printer 100 and the exact location of the engagement point between the actuator 254 and the printer 100.

Figure 20:
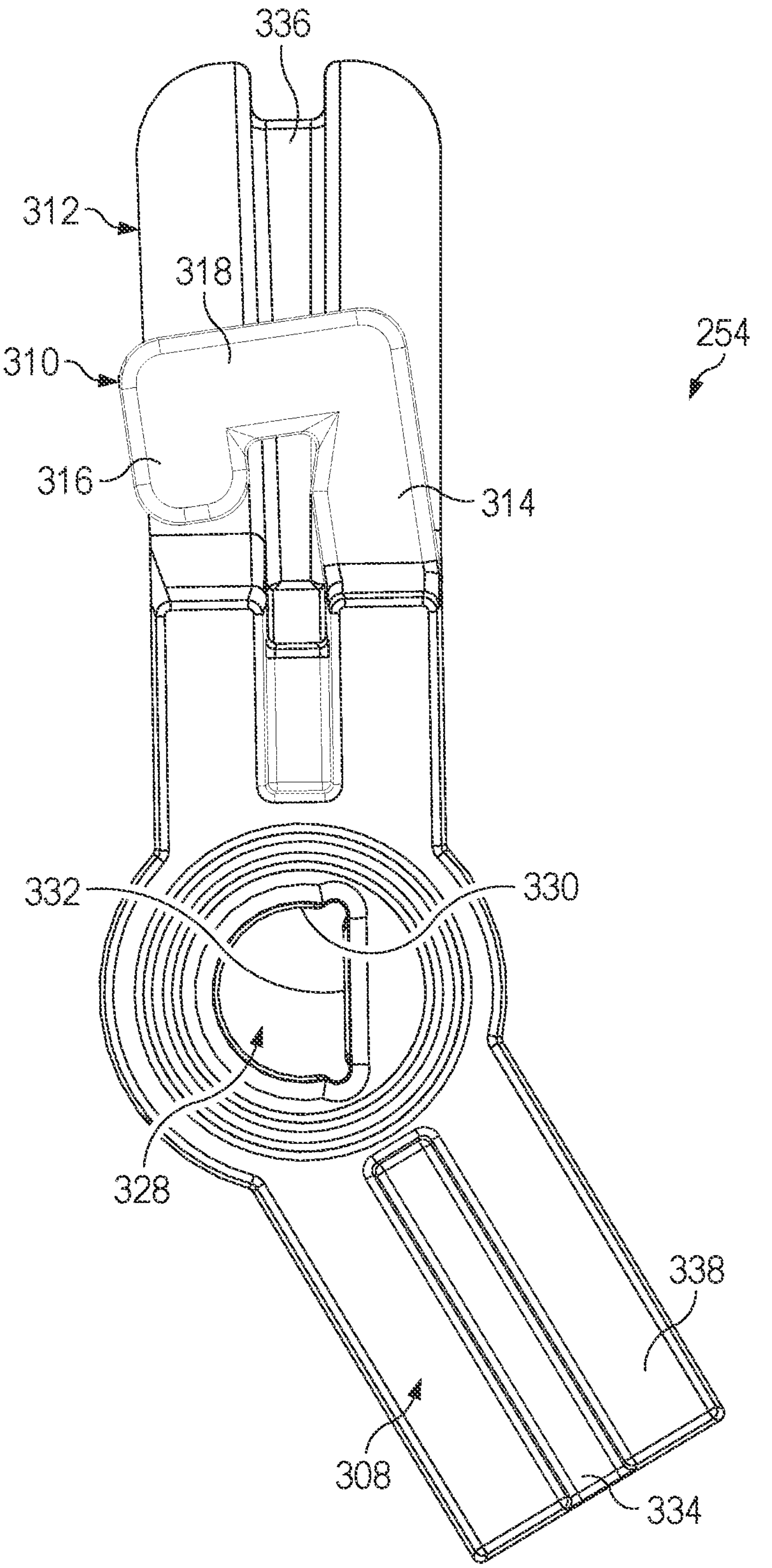
FIG. 20 illustrates a bottom plan view of the actuator of FIG. 19.

As best shown in FIG. 20, a socket 328 may define an opening of the base member 308 and may be configured to receive the notched portion 270 of the post 246. In some instances, the socket 328 may define a passageway extending through the base member 308 in a direction substantially perpendicular to the plane occupied by the base member 308 and the hook 310. The socket 328 may be imparted with a geometry that substantially mirrors the geometry of the notched portion 270 of the post 246. As shown in FIG. 19, the socket may be imparted with a substantially D-shaped geometry. A curved portion 330 of the socket 328 may correspond to the generally cylindrical shape of the cylindrical portion 268 of the second segment 266, and a straight portion 332 of the socket 328 may correspond to the area of the notched portion 270 that has been "carved out" as compared to the cylindrical portion 268. However, in other instances, the socket 328 may be imparted with any suitable shape or structure provided that the socket 328 is configured to receive the notched portion 270 of the post 246. Thus, the notched portion 270 may be inserted into the socket 328 (e.g., creating a press fit between the actuator 254 and the post 246) such that the actuator 254 may be restrained or otherwise restricted from rotational movement with respect to the post 246. In other words, this engagement between the socket 328 and the notched portion 270 may cause the post 246 to rotate in response to any rotation of the actuator 254. In other instances, engagement between the post 246 and the actuator 254 may be achieved via any other means known in the art (e.g., by imparting each of the post 246 and the actuator 254 with complementary keyed features, by fastening the post 246 and the actuator 254 together, and the like).

The actuator 254 may be provided in the form of a rigid material capable of handling a press fit. In some instances, the actuator 254 may be provided in the form of polyetherimide (PEI). In other instances, the actuator 254 may be provided in the form of polycarbonate/acrylonitrile butadiene styrene (PC-ABS) or any other suitable material.

Figure 21:
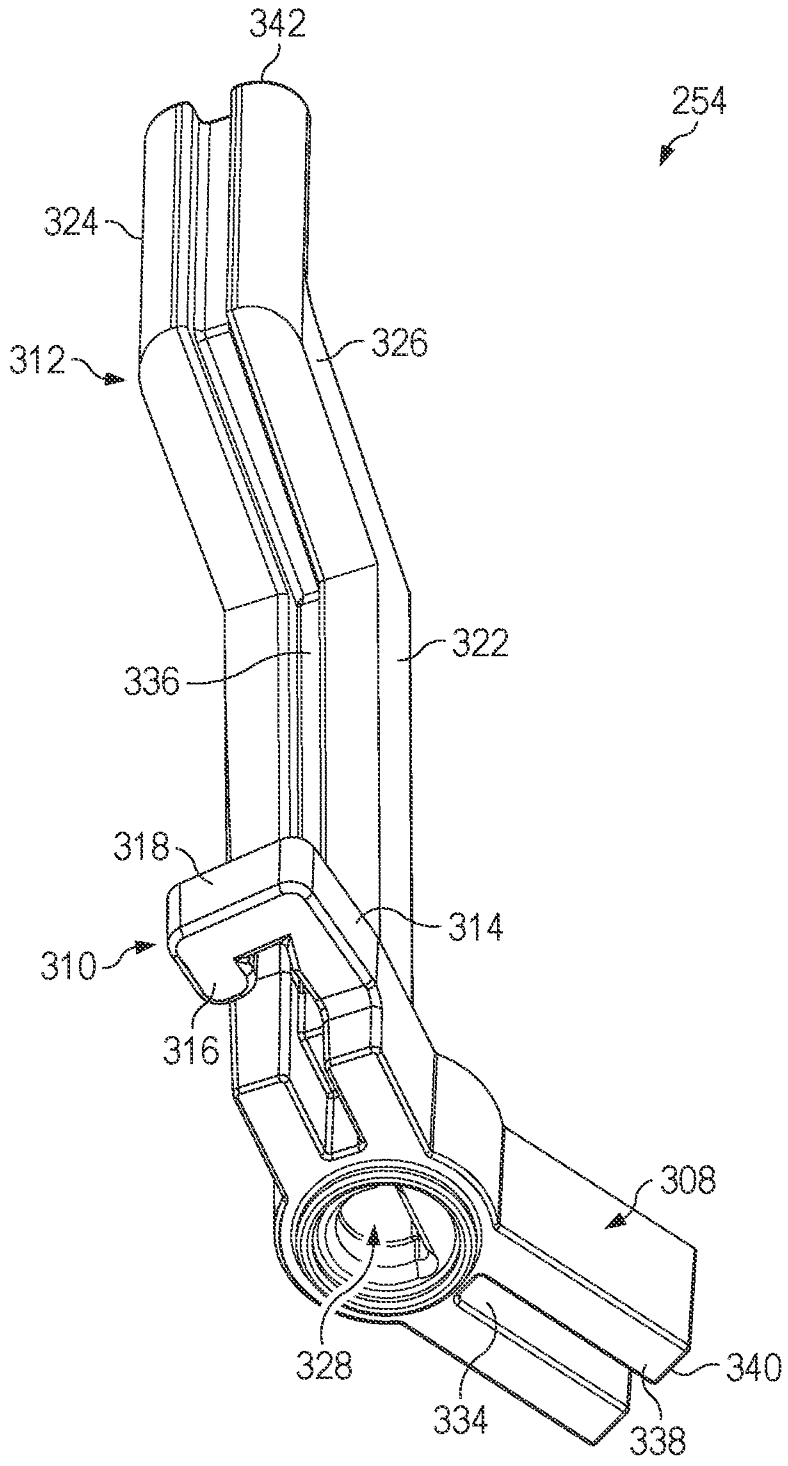
FIG. 21 illustrates a bottom isometric view of the actuator of FIG. 19.

As best shown in FIG. 21, in some instances, the base member 308 may include a first rut 334 and the arm 312 may include a second rut 336. The first rut 334 may be positioned on an underbelly 338 of the base member 308. The first rut may extend at least partially between the socket 328 and a distal end 340 of the base member 308. The second rut may extend between the underbelly 338 of the base member 308 and an apex 342 of the arm 312. The second rut may extend linearly along each of the extension piece 322, the connector 326, and the trigger 324. In other instances, the first and second ruts 334, 336 may be provided in any other suitable arrangement or the first and second ruts 334, 336 may be omitted.

Figure 22:
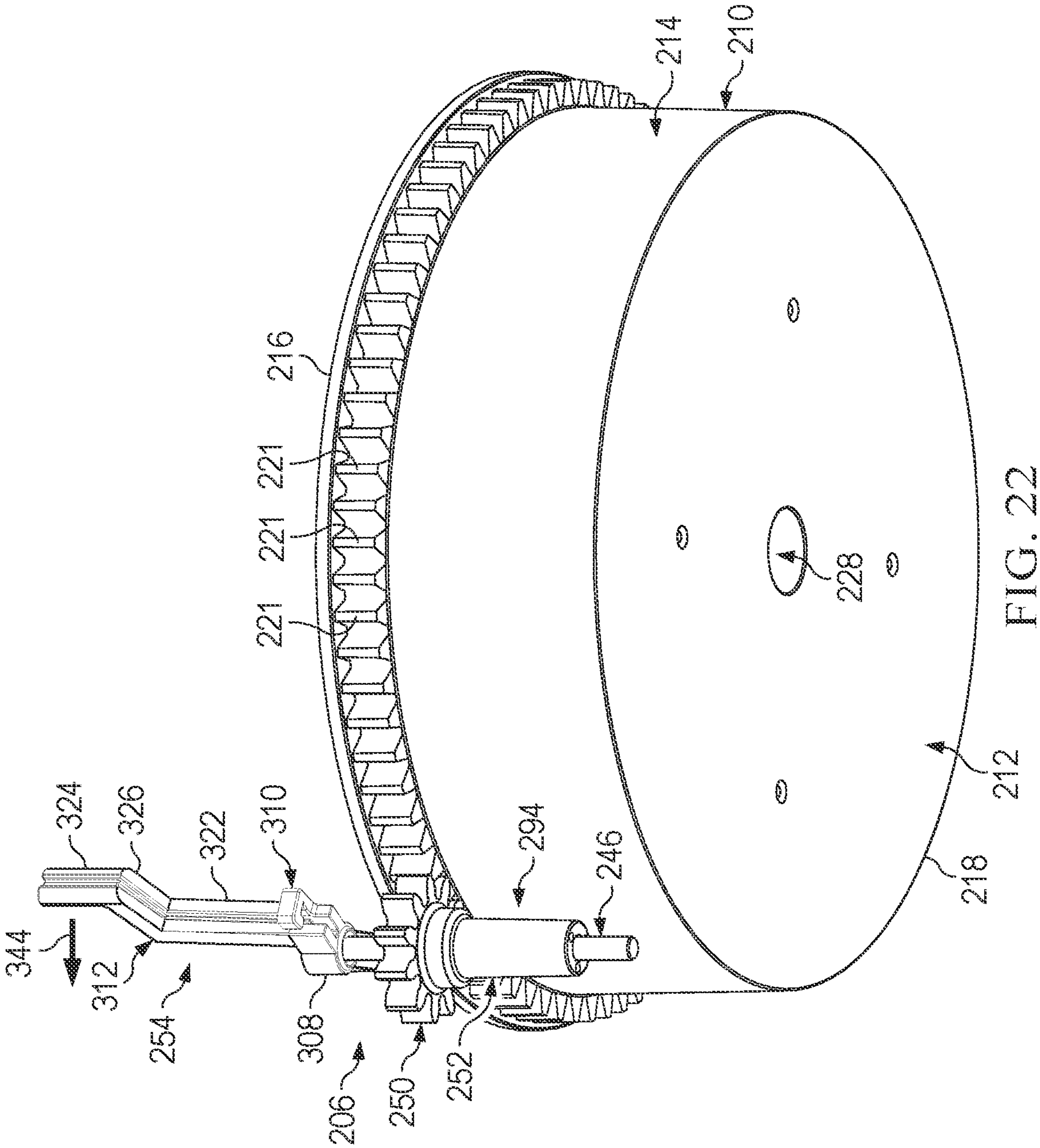
FIG. 22 illustrates a bottom isometric view of the actuator assembly of FIG. 11 disposed adjacent to the tray of FIG. 5.

Turning to FIG. 22, the actuator assembly 206 may be positioned adjacent to the tray 210 such that the gear 250 may align with and engage the first plurality of teeth 221. Therefore, rotation of the gear 250 translates to rotation of the tray 210. As described above, rotation of the gear 250 may be tied to (e.g., caused by) rotation of the post 246 due to the press fit between the one way clutch 248 and the upper channel 304 of the gear unit 294. Additionally, the rotation of the post 246 may be tied to (e.g., caused by) the rotation of the actuator 254 due to the engagement between the socket 328 and the notched portion 270 of the post 246. Thus, the actuator assembly 206 may be configured such that rotation of the actuator 254 may ultimately drive rotation of the tray 210. In other instances, the maintenance carousel 200 may drive rotation of the tray via other means known in the art (e.g., via a moving belt, friction wheels, a motor, and the like).

When the maintenance carousel 200 is installed in a printer (e.g., the printer 100 of FIGS. 1-3 or any other suitable printing device), the maintenance carousel 200 may be disposed substantially below the operative components of the printer (e.g., the carriage 138, printhead 140, and gantry 144). However, the maintenance carousel 200 may be positioned and configured such that at least the trigger 324 of the actuator 254 may extend upward such that it interrupts a path of motion of one or more components of the printer. In this way, the actuator 254 may be arranged to be impacted by one or more components of the printer during use (e.g., the actuator 254 may be impacted by the carriage 138 at a far end of its path of motion along the gantry 144). Such an impact may apply a force to the actuator 254 that may tend to cause the actuator 254 to move in the direction of the arrow 344 of FIG. 22. However, the actuator 254 may be prevented from undergoing translational movement due to its connection to the remainder of the actuator assembly 206 and/or its position within the maintenance carousel 200. Thus, the force applied to the actuator 254 may cause rotation rather than translational movement, thereby driving rotation of the post 246, the gear unit 294, and ultimately the tray 210.

Figure 23:
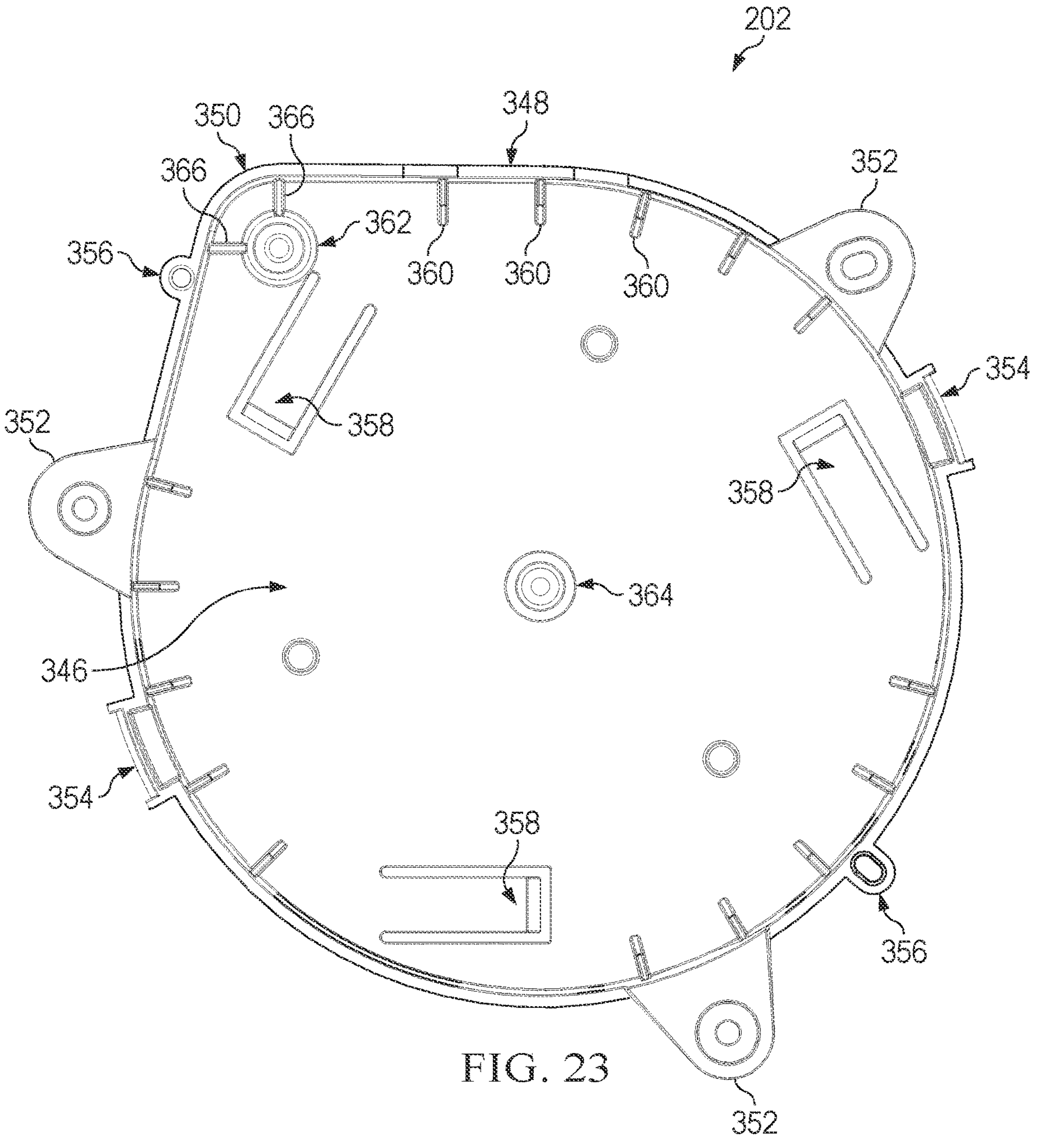
FIG. 23 illustrates a top plan view of a shroud of the maintenance carousel of FIG. 4.
Figure 24:
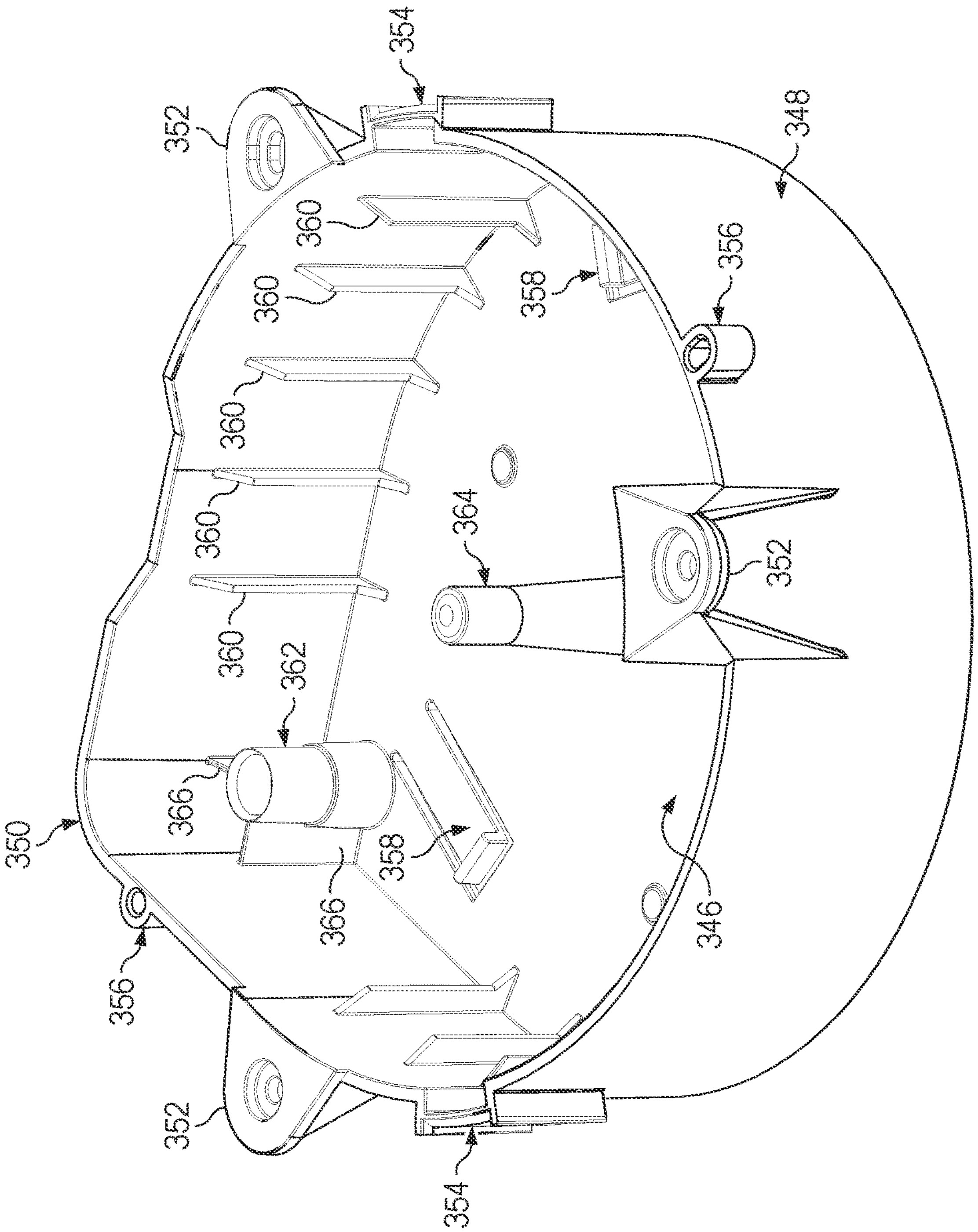
FIG. 24 illustrates an isometric view of the shroud of FIG. 23.

Turning to FIGS. 23 and 24, the shroud 202 may include a platform 346 configured to receive and support each of the actuator assembly 206 and the tray 210. The platform 346 may be substantially circular or teardrop in shape and include an upwardly extending outer wall 348. The outer wall 348 may be imparted with a geometry that substantially mirrors the geometry of the sidewall 214 of the tray 210. The shroud 202 may include a protruding region 350 which may interrupt or distort the generally circular shape of the platform 346 and the outer wall 348 in the area proximate to the protruding region 350. In some instances, the protruding region 350 may be positioned and constructed to accommodate the actuator assembly 206 when the maintenance carousel 200 is fully assembled.

The shroud 202 may include one or more installation tabs 352 circumscribing the outer wall 348 and extending outwardly therefrom. The installation tabs 352 include through holes that are designed to accommodate a screw or other fastening mechanism. The installation tabs 352 may be configured to facilitate a connection or coupling between the maintenance carousel 200 and a printer (e.g., the printer 100 or any other suitable printing device). As shown in FIG. 23, the shroud 202 may include three installation tabs 352 disposed radially about the outer wall 348. However, in other instances, the shroud 202 may include any number of installation tabs 352 arranged in any suitable configuration.

The shroud 202 may include one or more connection tabs 354 positioned along the outer wall 348 and protruding outwardly therefrom. The connection tabs 354 may be configured to facilitate a connection or coupling between the shroud 202 and the shroud cover 204 when the maintenance carousel 200 is fully assembled. In some aspects, the shroud 202 may include two connection tabs 354 positioned opposite one another along the outer wall 348. However, in other instances, the shroud 202 may include any number of installation tabs 352 arranged in any suitable configuration.

The shroud 202 may further include one or more receiving members 356 positioned along the outer wall 348 and protruding outwardly therefrom. Like the connection tabs 354, the receiving members 356 may be configured to facilitate a connection or coupling between the shroud 202 and the shroud cover 204 when the maintenance carousel 200 is fully assembled. Additionally, the receiving members 356 may help to ensure that the shroud 202 and shroud cover 204 are oriented properly with respect to one another when they are joined. In some instances, the shroud 202 may include two receiving members 356 positioned opposite one another along the outer wall 348. However, in other instances, the shroud 202 may include any number of receiving members 356 arranged in any suitable configuration.

Still referring to FIGS. 23 and 24, the shroud 202 may include one or more flex tabs 358 formed in the platform 346. The flex tabs 358 may be configured to apply friction to the tray 210 (e.g., to slow or partially hinder the rotation of the tray 210 with respect to the shroud 202). In some instances, the shroud 202 may include three flex tabs 358 positioned proximate to the outer wall 348, oriented in a similar manner with respect to each other, and spaced radially apart from one another. However, in other instances, the shroud 202 may include any number of flex tabs 358 arranged in any suitable configuration. The shroud 202 and tray 210 may be constructed such that the coefficient of friction between the shroud 202 and the tray 210 is between about 0.2 to about 0.5 when the maintenance carousel 200 is in use.

The shroud 202 may also include one or more elongate fins 360 positioned along the outer wall 348 and protruding inwardly therefrom. The fins 360 may be configured to provide support to or prevent unintended movement of the tray 210 when the maintenance carousel 200 is in use. The fins 360 may circumscribe and may come into contact with the sidewall 214 of the tray 210 when the tray 210 and the shroud 202 are engaged with each other. The fins 360 may be formed integrally with the outer wall 348 or the fins 360 may be coupled to the outer wall 348 and extend inwardly therefrom. Additionally, or alternatively, the fins 360 may be formed integrally with the platform 346 or the fins 360 may be coupled to the platform 346 and extend upwardly therefrom. As shown in FIG. 23, the shroud 202 may include a total of fifteen fins 360 including three groupings of five fins 360 each positioned between two adjacent flex tabs 358. However, in other instances, the shroud 202 may include any number of fins 360 arranged in any suitable configuration.

The platform 346 may support an actuator assembly well 362 and a central pillar 364. When the maintenance carousel 200 is assembled, the actuator assembly well 362 may be configured to support the actuator assembly 206 and the central pillar 364 may be configured to support the tray 210 (e.g., the central pillar 364 may be arranged to align with and be received by the receiving post 226). The actuator assembly well 362 may be disposed in the protruding region 350 and may be positioned proximate to the outer wall 348. In some instances, one or more connector walls 366 may extend between the actuator assembly well 362 and the outer wall 348, thereby coupling the actuator assembly well 362 and the outer wall 348 and imparting additional structural stability to the actuator assembly well 362. The shroud 202 may include two connector walls 366 extending between the actuator assembly well 362 and the outer wall 348. In other instances, the shroud 202 may include any number of connector walls 366 or the connector walls 366 may be omitted. In instances where the connector walls 366 are omitted, the actuator assembly well 362 may be formed integrally with the platform 346 or the actuator assembly well 362 may be coupled with the platform 346 and extend upwardly therefrom.

The central pillar 364 may be disposed on the platform 346 in a central location and may be positioned substantially equidistant from each point along the outer wall 348. However, the central pillar 364 may be positioned at a greater distance from points along the portion of the outer wall 348 in the protruding region 350 as compared to the distance between the central pillar 364 and points along the remainder of the outer wall 348. The central pillar 364 may be configured such that, when it is received by the receiving post 226 of the tray 210, the tray 210 is supported for rotation within the shroud 202 about the central pillar 364.

Figure 25:
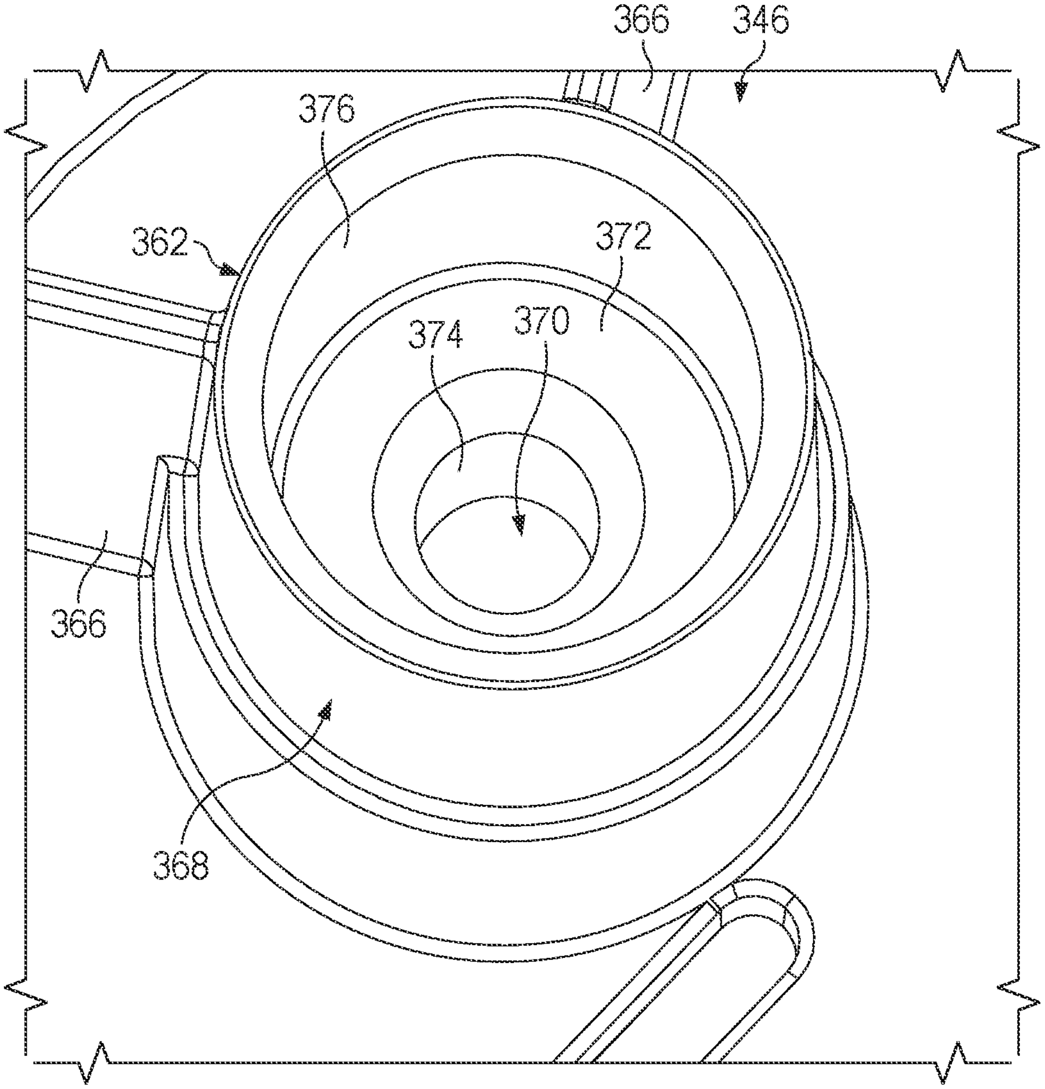
FIG. 25 illustrates an enlarged view of a portion of the shroud of FIG. 23 including an actuator assembly well.

As best shown in FIG. 25, the actuator assembly well 362 may include a shaft 368 defining a passageway 370 therethrough. The shaft 368 may be substantially cylindrical or substantially frustoconical in shape. The actuator assembly well 362 may include a ledge 372 that may divide the passageway 370 into a lower chamber 374 and an upper chamber 376. The lower chamber 374 may be configured to receive the post 246 of the actuator assembly 206 and the upper chamber 376 may be configured to receive at least a portion of the body portion 290 of the gear unit 294. The lower chamber 374 may be smaller than the upper chamber 376. The lower chamber 374 may be provided in the form of a cylindrical opening which may be imparted with dimensions that mirror or are substantially equal to the dimensions of the post 246. The upper chamber 376 may be provided in the form of a cylindrical opening which may be imparted with dimensions that mirror or are substantially equal to the dimensions of the body portion 290. In other instances, the shaft 368, lower chamber 374, and upper chamber 376 may be provided with any suitable shape or structure provided that the lower chamber 374 and upper chamber 376 are configured to receive the post 246 and the body portion 290, respectively.

Figure 26:
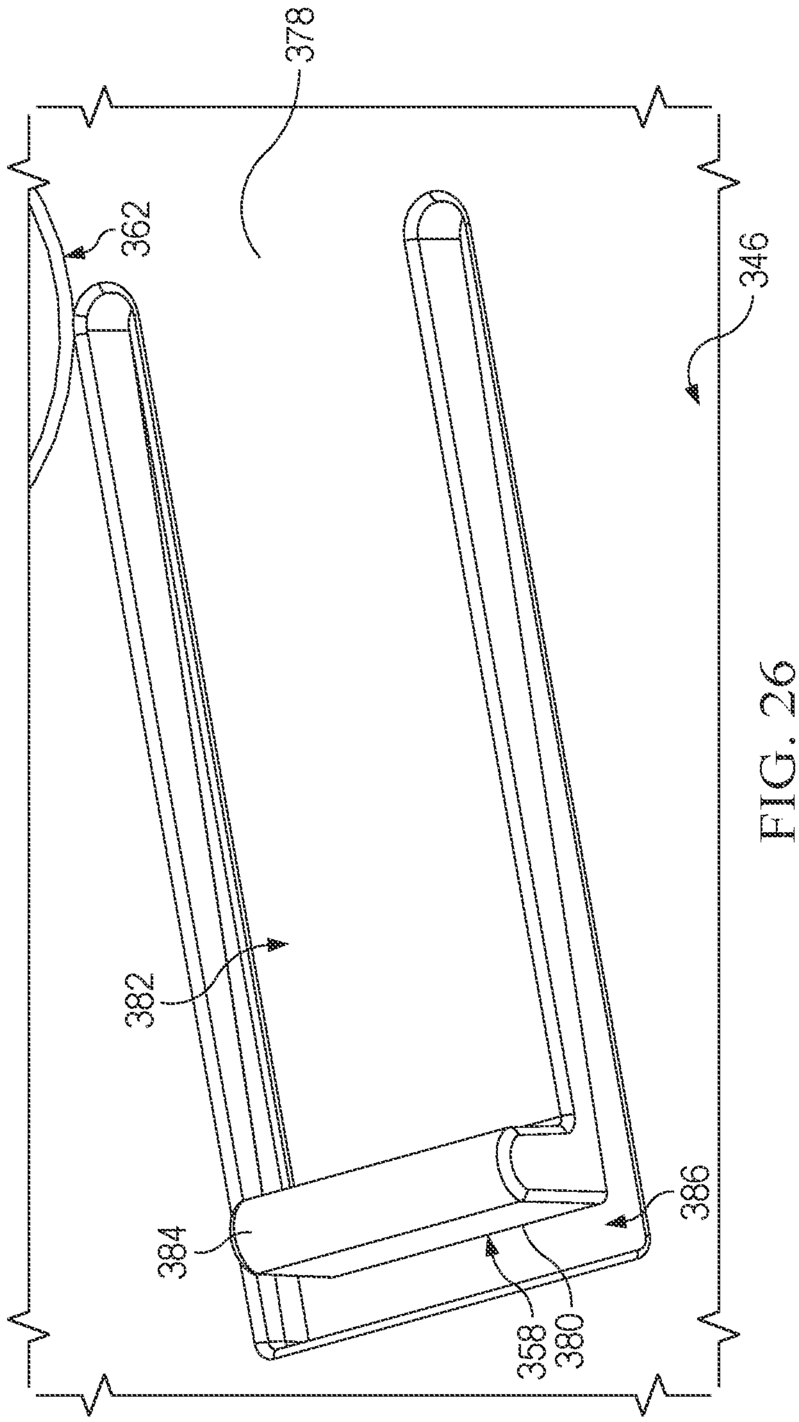
FIG. 26 illustrates an enlarged view of a portion of the shroud of FIG. 23 including a flex tab.

As best shown in FIG. 26, each flex tab 358 may be substantially rectilinear in shape and may include a first integral end 378 and a second detached end 380. Each flex tab 358 may include a plank 382 extending outwardly from the first integral end 378 and terminating at the second detached end 380. The plank 382 further includes a ridge 384 positioned on the plank 382 at the second detached end 380 and extending upwardly therefrom. The ridge 384 may be formed integrally with the plank 382 or the ridge 384 may be coupled with the plank 382 and extend upwardly therefrom. The flex tab 358 may also include a moat 386 at least partially surrounding the plank 382. The moat 386 may be provided in the form of a rectilinear channel surrounding at least a portion of the plank 382. A shown in FIG. 26, the moat 386 may surround the plank 382 on three sides but may not extend along the first end 378. The moat 386 may permit the plank 382 to flex either upwardly or downwardly with respect to the platform 346 of the shroud 202. The ridge 384 may be configured to contact the base 212 of the tray 210 when the tray 210 is positioned within the shroud 202 (see FIG. 27). In this way, the flex tab 358 may apply friction to the base 212 via the ridge 384 when the tray 210 rotates with respect to the shroud 202.

Figure 27:
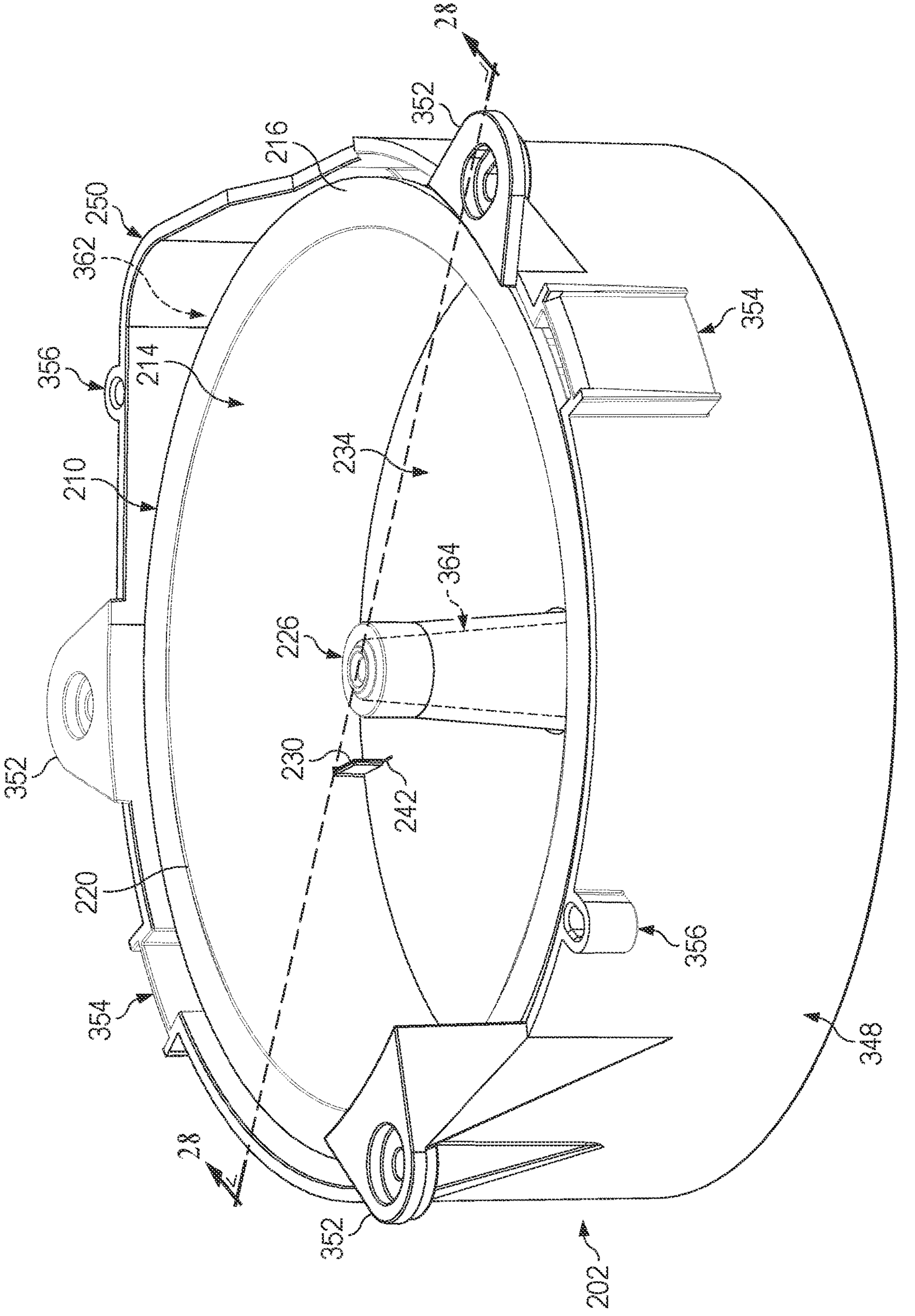
FIG. 27 illustrates an isometric view of the tray of FIG. 5 disposed within the shroud of FIG. 23.
Figure 28:
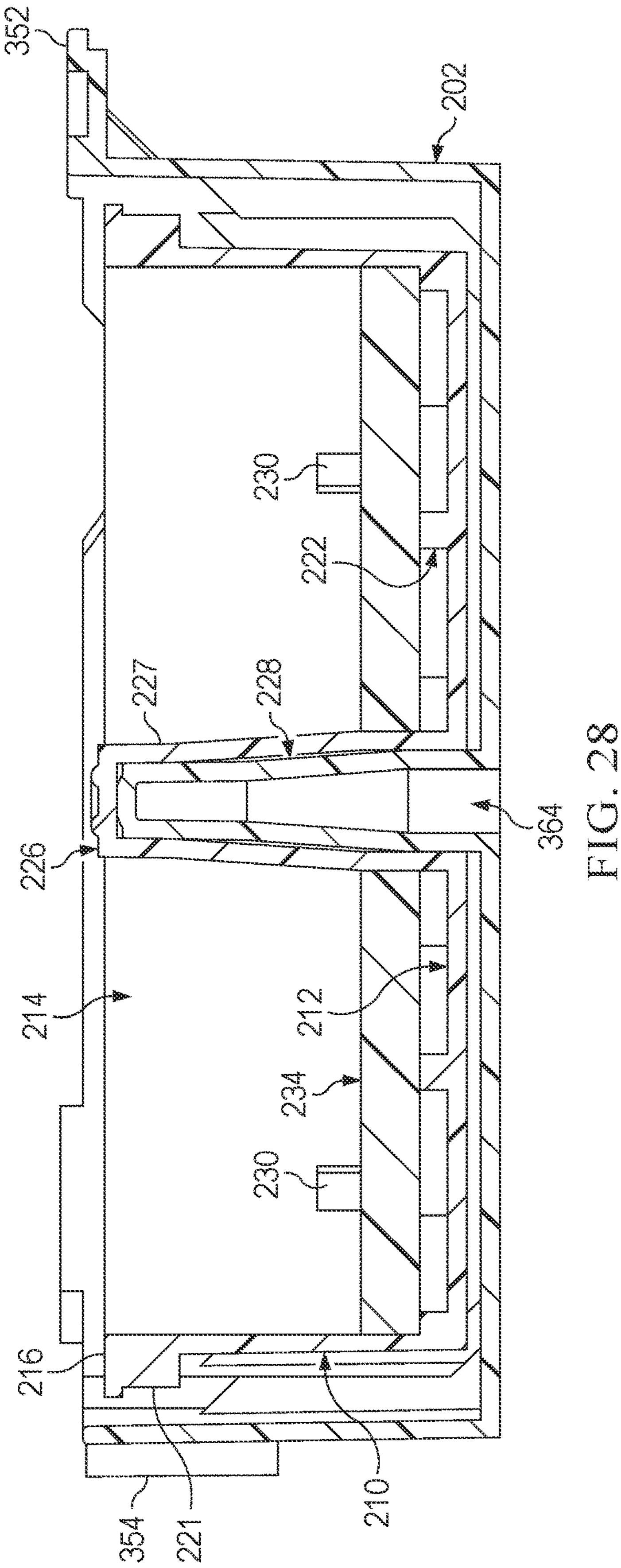
FIG. 28 illustrates a cross sectional view of the tray of FIG. 5 disposed within the shroud of FIG. 23 taken along the line 28-28 of FIG. 27.

As best shown in FIGS. 27 and 28, the central pillar 364 may be enclosed within the receiving post 226 when the tray 210 is disposed within the shroud 202. Each of the central pillar 364 and the receiving post 226 may be substantially cylindrical, conical, or frustoconical in shape. In other instances, however, the central pillar 364 and the receiving post 226 may be provided with any suitable shape or structure, provided that receiving post 226 is configured to receive the central pillar 364. The absorbent pad 234 may rest atop the tray support structure 222 such that the tray support structure 222 is disposed between the base 212 of the tray 210 and the absorbent pad 234.

Figure 29:
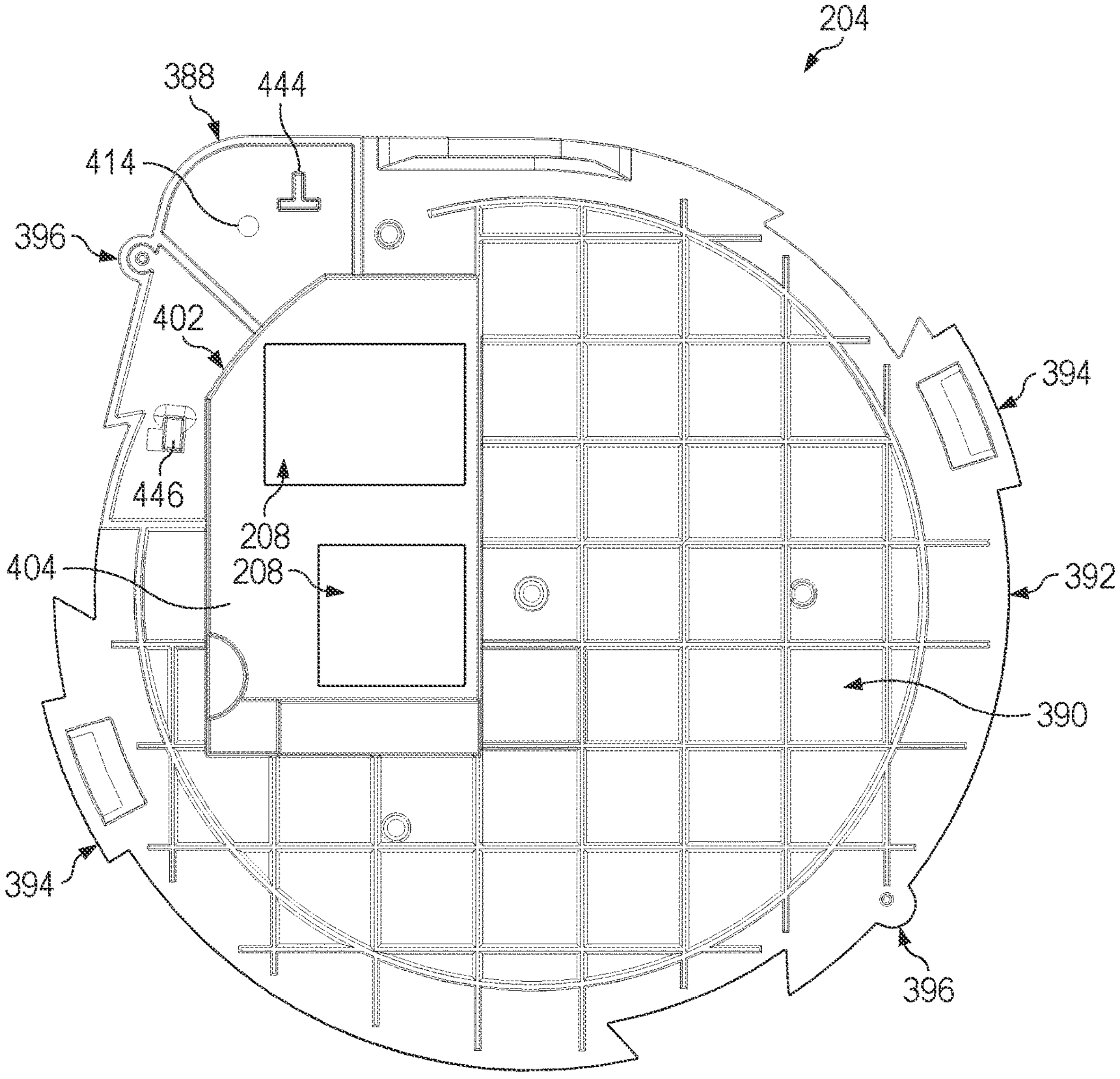
FIG. 29 illustrates a top plan view of a shroud cover of the maintenance carousel of FIG. 4.

Turning to FIG. 29, the shroud cover 204 may be imparted with a geometry that mirrors or is substantially the same as the geometry of the shroud 202. For example, the shroud cover 204 may be substantially circular in shape, except that the shroud cover 204 may include a protruding region 388 corresponding to the protruding region 350 of the shroud 202. The shroud cover 204 may include a body 390 and a peripheral edge 392 surrounding the body 390. One or more latches 394 and one or more pin members 396 may be positioned about the peripheral edge 392. As shown in FIG. 29, the shroud cover 204 may include two latches 394 positioned in opposing locations along the peripheral edge 392 and two pin members 396 positioned in opposing locations along the peripheral edge 392. The position of the latches 394 and pin members 396 along the peripheral edge 392 may correspond to and align with the position of the connection tabs 354 and receiving members 356, respectively, along the outer wall 348 of the shroud 202. Thus, the latches 394 and pin members 396 may facilitate a releasable attachment between the shroud 202 and the shroud cover 204. In other instances, the shroud cover 204 may include any number of latches 394 and pin members 396 and the latches 394 and pin members 396 may be configured in any suitable arrangement, provided that the connection tabs 354 and the receiving members 356 are positioned to receive the latches 394 and pin members 396, respectively.

Figure 30:
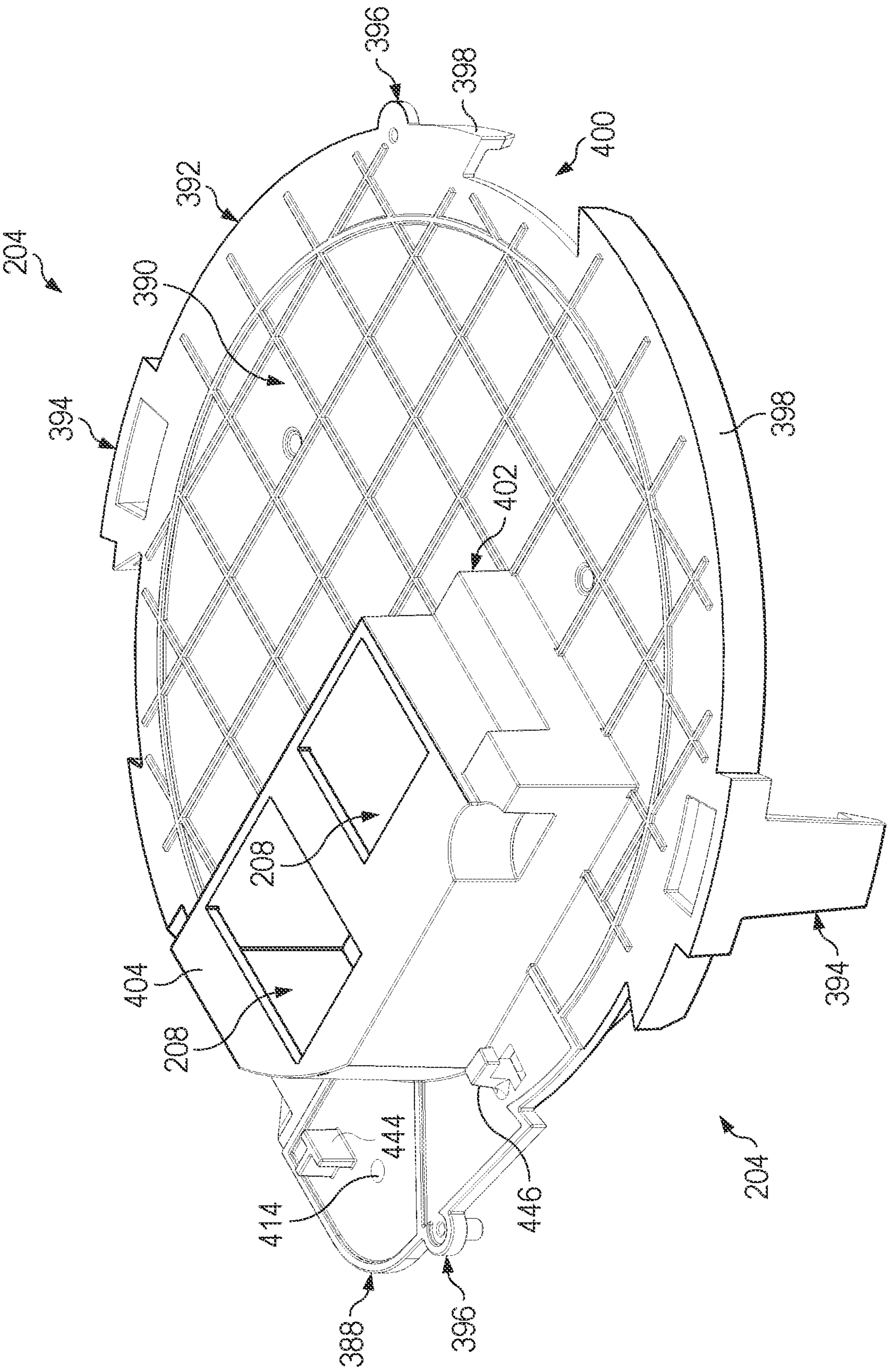
FIG. 30 illustrates a top isometric view of the shroud cover of FIG. 29.

As best shown in FIG. 30, the shroud cover 204 may include a rim 398 positioned along the peripheral edge 392. The rim 398 may be formed integrally with the body 390 of the shroud cover 204 or the rim 398 may be coupled to the body 390 along the peripheral edge 392 and extend downwardly therefrom. In some instances, the rim 398 may only partially circumscribe the body 390 such that the rim 398 may be discontinuous in that one or more gaps 400 may be disposed along the peripheral edge 392 and may interrupt the rim 398.

The body 390 of the shroud cover 204 further includes a housing 402 having a ceiling 404 with one or more openings 208 extending therethrough. As shown in FIG. 30, two rectilinear openings 208 may extend entirely through the ceiling 404. The openings 208 may provide one or more windows through which waste ink may enter the maintenance carousel 200. The maintenance carousel 200 may be arranged within an inkjet printer (e.g., the printer 100) such that the openings 208 align with a maintenance position of a printhead (e.g., the printhead 160) located at a far end of the path of motion of the printhead (e.g., along the gantry 144). Thus, when the printhead reaches the maintenance position, the printhead may eject waste ink through the openings 208 such that the waste ink may be collected by the maintenance carousel 200 (e.g., within the tray 210).

Figure 31:
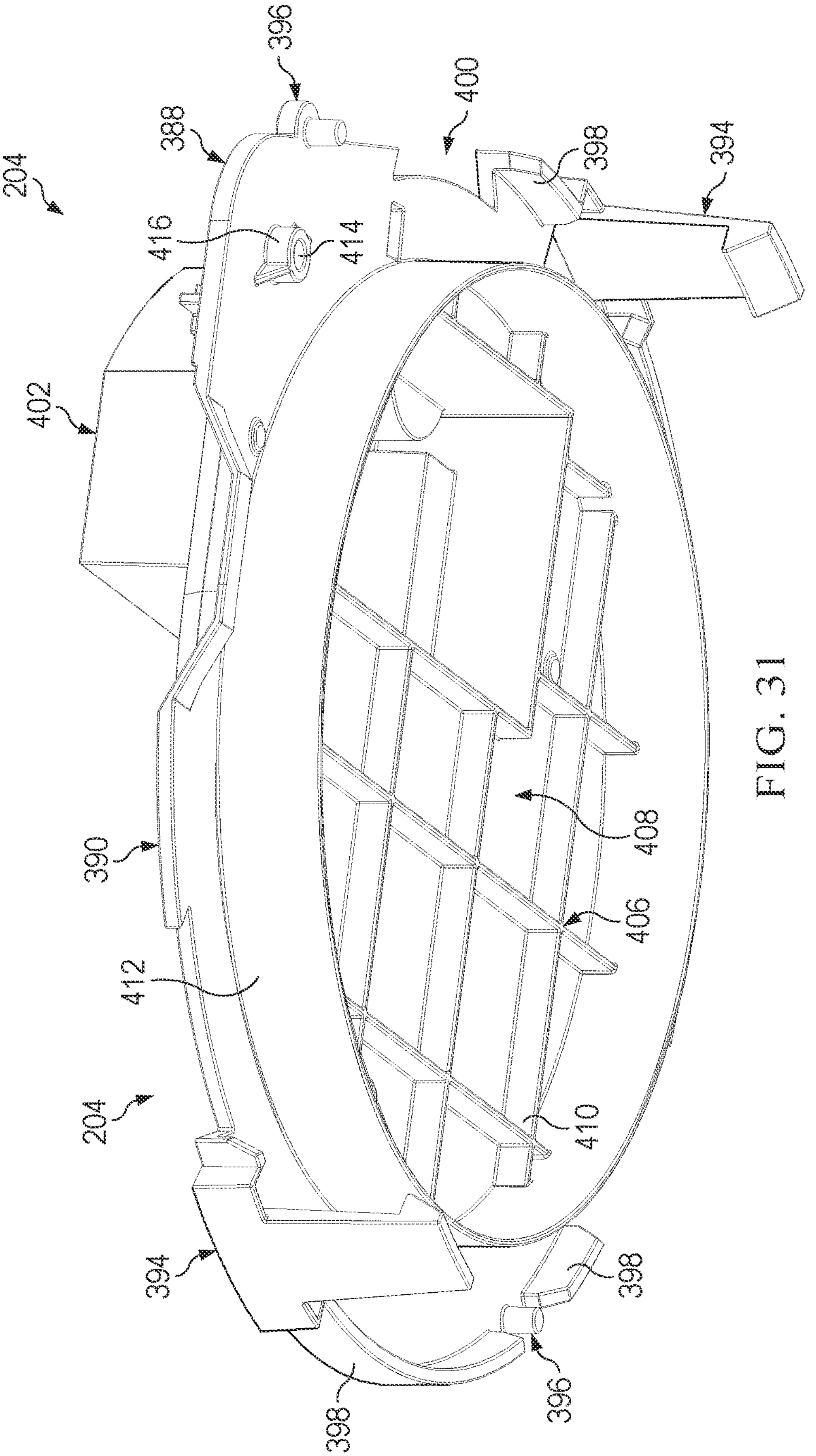
FIG. 31 illustrates a bottom isometric view of the shroud cover of FIG. 29.

As can be seen in FIG. 31, the shroud cover 204 may further include a shroud support structure 406 disposed on an underside 408 thereof. The shroud support structure 406 may add stability and/or structural rigidity to the shroud cover 204 and/or the maintenance carousel 200 as a whole. The shroud support structure 406 may be provided in substantially the same form as the tray support structure 222. The shroud support structure 406 may be provided in the form of a plurality of wall members 410 arranged in a grid pattern across at least a portion of the underside 408 of the body 390. A circular sidewall 412 extends downwardly from an underside 408 of the body 390. The sidewall 412 may provide further stability and/or structural rigidity to the shroud cover 204.

An aperture 414 may be formed in the body 390 proximate to the protruding region 388. The aperture 414 may extend linearly through a substantially cylindrical collar 416 connected to the underside 408 of the body 390 and extending downwardly therefrom. The aperture 414 may be configured to permit at least a portion of the actuator assembly 206 to emerge above the shroud cover 204 when the maintenance carousel is assembled. In some aspects, the aperture 414 and collar 416 may be arranged to align with the actuator assembly well 362 and may be configured to receive the cylindrical portion 268 of the second segment 266 of the post 246. Thus, the notched portion 270 of the second segment 266, which may be encased within the socket 328 (e.g., engaged with the base member 308 of the actuator 254 via a press fit), and the actuator 254 may be positioned above the body 390 of the shroud cover 204 when the maintenance carousel 200 is assembled (see FIG. 35).

The shroud 202 and the shroud cover 204 may each be formed from plastic materials including polypropylene, nylon, polycarbonate/acrylonitrile butadiene styrene (PC-ABS), polyoxymethylene (POM), combinations thereof, or any other suitable material. In some instances, the shroud 202 and shroud cover 204 may be formed from a metal or ceramic material. The material of the shroud 202 may be selected such that the flex tabs 358 may create the desired drag force on (e.g., apply a desired level of friction to) the tray 210. Additionally, the shroud 202 may be configured such that the central pillar 364 may apply a moderate or a low amount of friction to the tray 210 via the receiving post 226.

While attachment between the shroud 202 and shroud cover 204 may be facilitated by the connection tabs 354, receiving members 356, latches 394, and pin members 396, it will be appreciated by those in the art that the shroud cover 204 may be attached to the shroud 202 via any other suitable mechanism or mechanisms when the maintenance carousel 200 is assembled.

Figure 32:
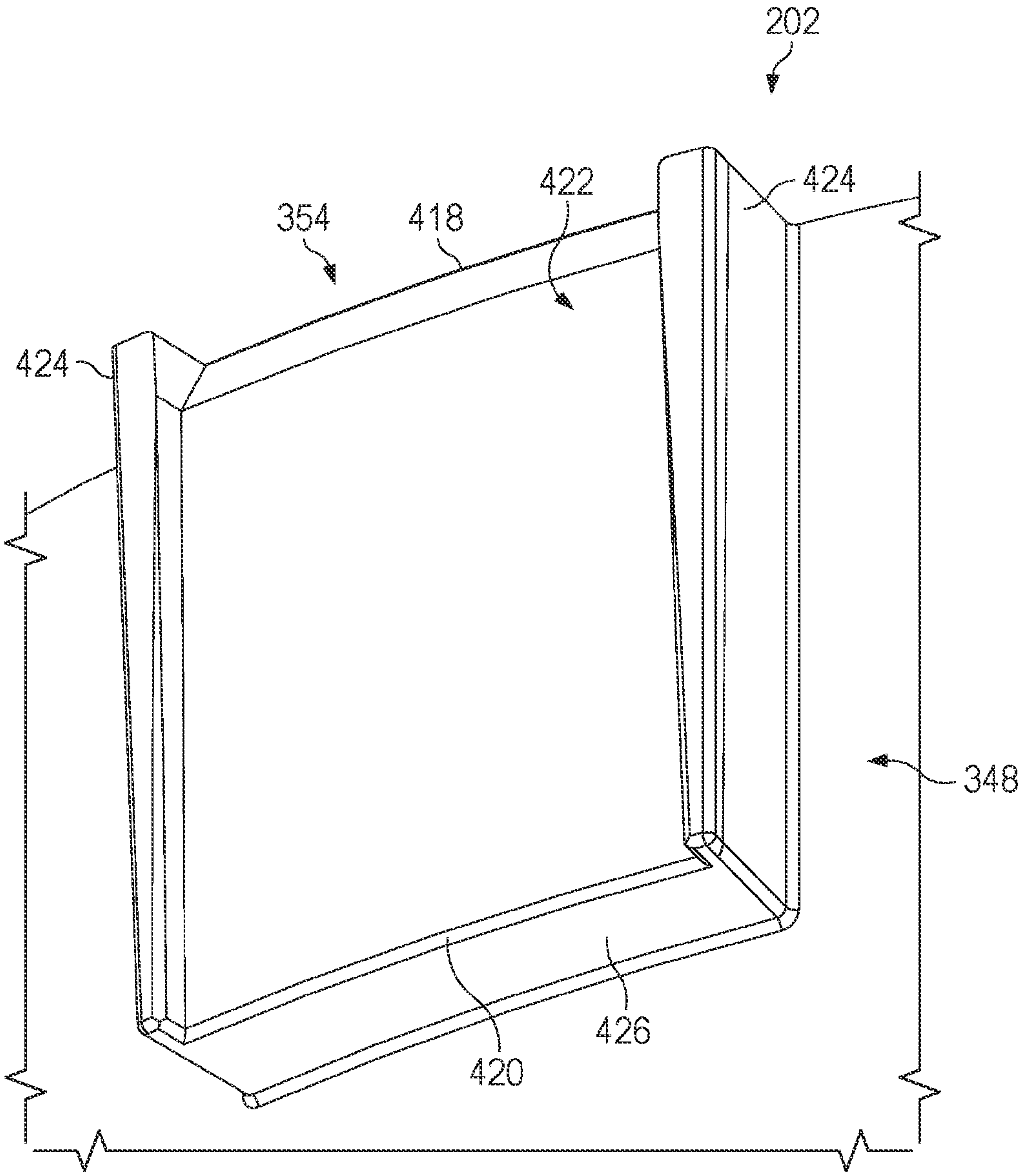
FIG. 32 illustrates an enlarged view of a portion of the shroud cover of FIG. 29 including a connection tab.

As best shown in FIG. 32, each connection tab 354 extending outwardly from the shroud 202 may include a first end 418, a second end 420, and a substantially vertical face 422 extending therebetween. The face 422 may be flanked on either side by two retaining walls 424. The retaining walls 424 may be oriented substantially perpendicular to the face 422 and may protrude outwardly from the outer wall 348 such that they protrude beyond the face 422. A shelf 426 may be disposed below the face 422 at the second end 420 of the connection tab 354. The shelf 426 may be oriented substantially perpendicular to the face 422 and may extend between the face 422 and the outer wall 348.

Figure 33:
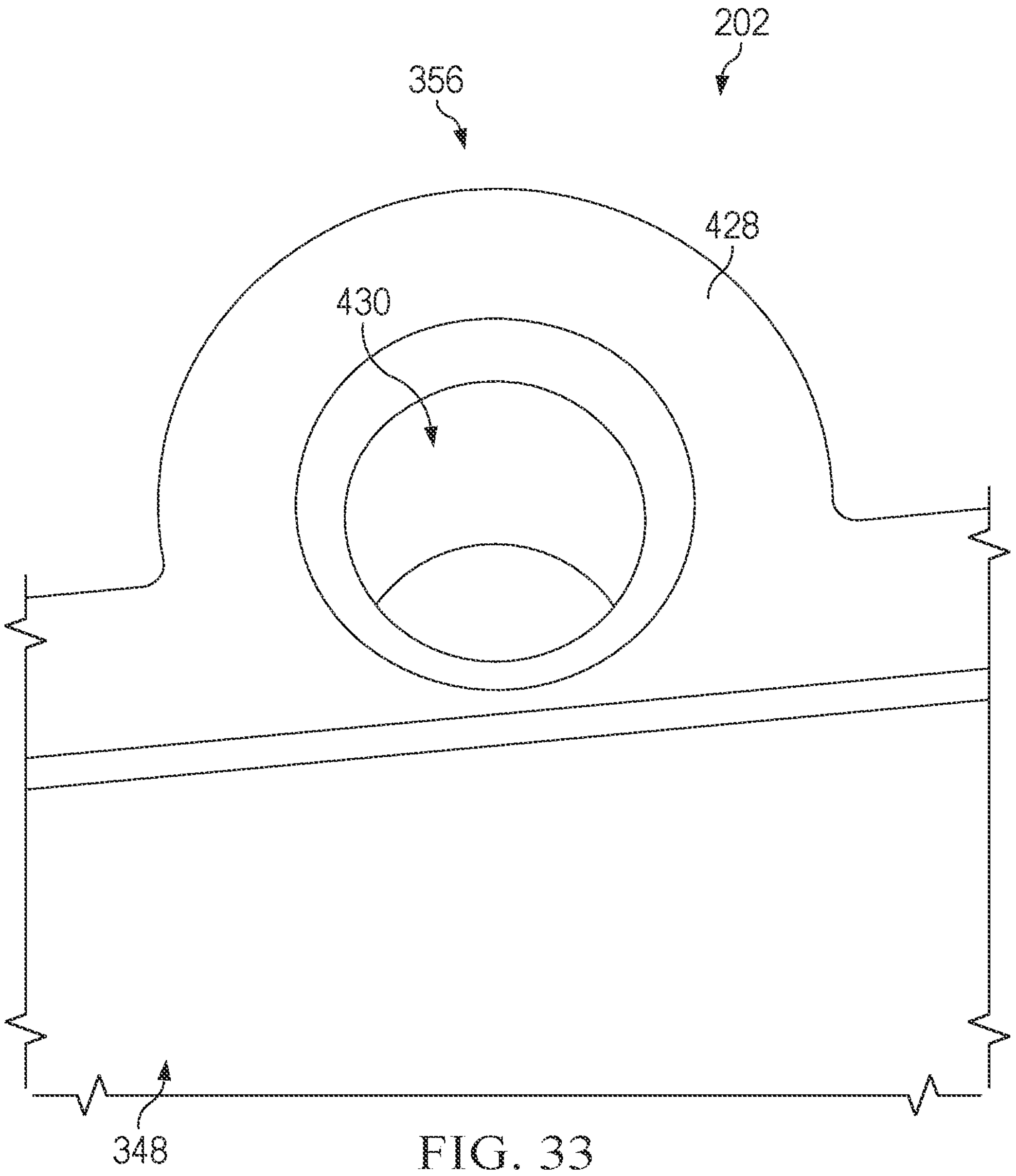
FIG. 33 illustrates an enlarged view of a portion of the shroud cover of FIG. 29 including a receiving member.

As best shown in FIG. 33, each receiving member 356 may be provided in the form of a protrusion 428 extending outwardly from the outer wall 348 of the shroud 202. A receptacle 430 may be formed in the protrusion 428. In some instances, the protrusion 428 may be substantially semicircular and the receptacle 430 may be substantially cylindrical in shape. In other instances, the receiving member 356 may be provided in any suitable form, provided that the receiving member 356 is positioned and configured to receive a pin member 396 of the shroud cover 204.

Figure 34:
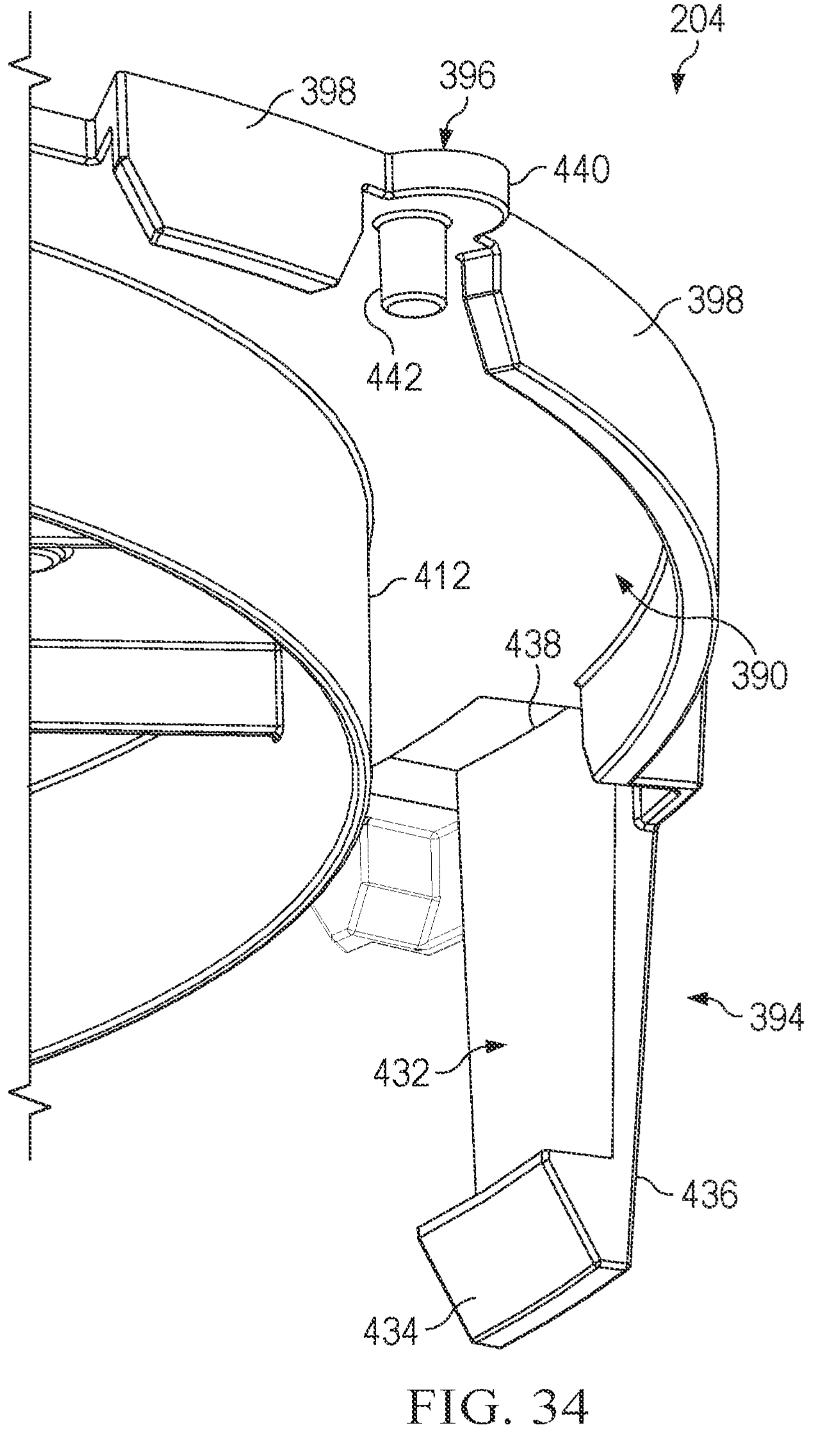
FIG. 34 illustrates an enlarged view of a portion of the shroud of FIG. 23 including a latch and a pin member.
Figure 35:
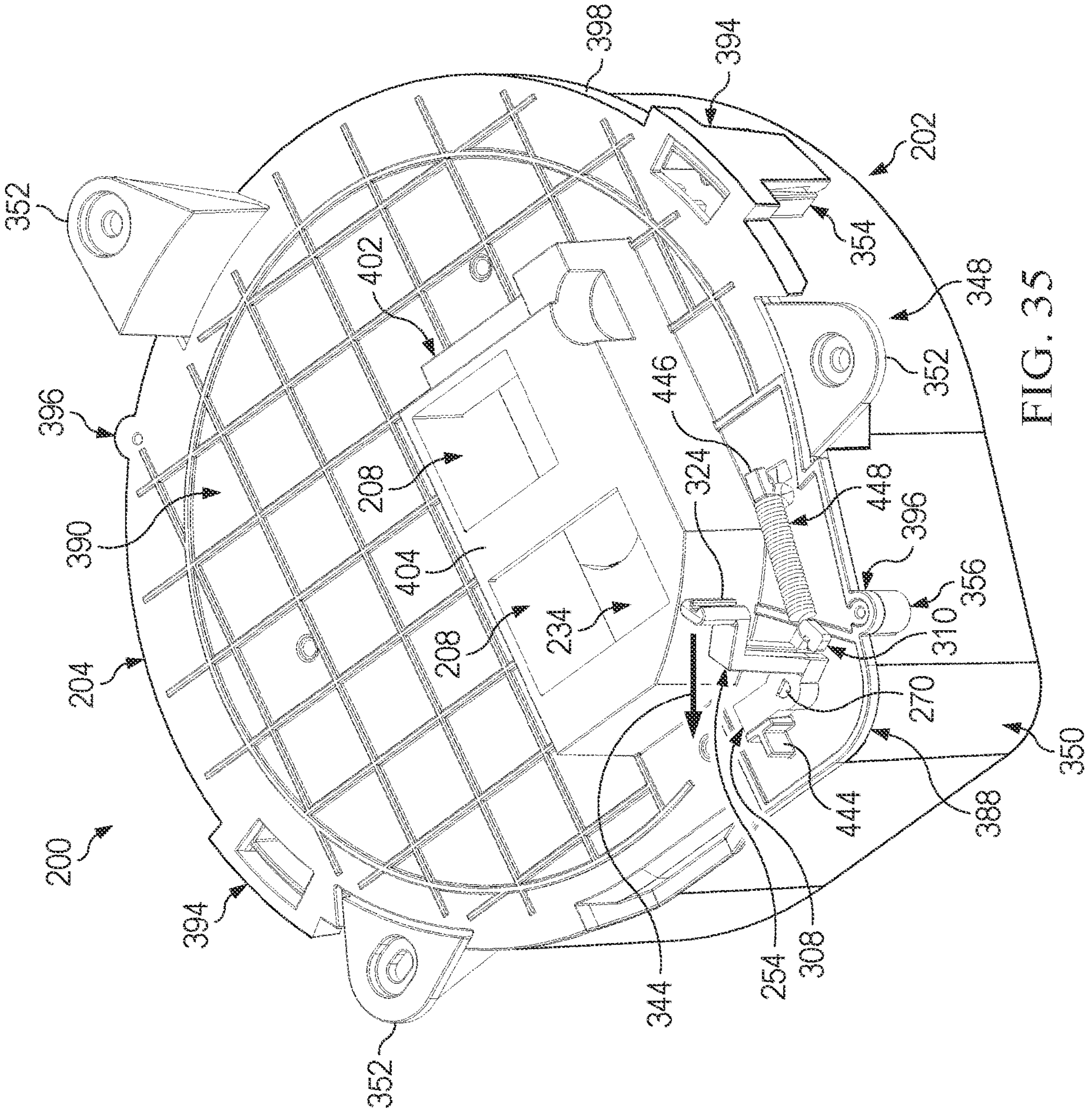
FIG. 35 illustrates a top isometric view of the maintenance carousel of FIG. 4.

As best shown in FIGS. 34 and 35, each latch 394 may include a panel 432 and a latch member 434 connected to the panel 432 at a distal end 436 thereof. A proximal end 438 of the panel 432 may be connected to either or both of body 390 and the rim 398 of the shroud cover 204 and extend downwardly therefrom. The latch member 434 may protrude inwardly (e.g., in the direction of the body 390) from the distal end 436 of the panel 432. The panel 432 of the latch 394 and the face 422 of the connection tab 354 may be provided in the form of mating surfaces. When the shroud cover 204 is coupled to the shroud 202, the latch 394 may be received by the connection tab 354 such that the panel may rest flush against the face 422. In this position, the latch 394 may be flanked on both sides by the retaining walls 424 of the connection tab 354. Thus, lateral motion of the latch 394 with respect to the connection tab 354 may be prevented. Likewise, the latch member 434 may extend beneath the connection tab 354 and may engage the underside 408 of the connection tab 354. Engagement between the latch member 434 and the connection tab 354 may prevent the shroud cover 204 from being unintentionally lifted away from the shroud 202.

Also shown in FIG. 34, each pin member 396 may include a protrusion 440 extending outwardly from the body 390 of the shroud cover 204. A pin 442 may be formed integrally with the protrusion 440 or the pin 442 may be coupled to the protrusion 440 and extend downwardly therefrom. The structure of the pin member 396 may complement the structure of the receiving member 356. In some instances, the protrusion 440 may be substantially semicircular in shape (e.g., mirroring the shape of the protrusion 428 of the receiving member 356) and the pin 442 may be provided in the form of a cylindrical peg configured to align with and be received by the receptacle 430 of the receiving member 356. In some instances, the pin 442 may be fitted within the receptacle 430 (e.g., by a press fit), thereby restricting both vertical and lateral movement of the shroud cover 204 with respect to the shroud 202. In other instances, the pin 442 may simply rest within the receptacle 430, thereby restricting only lateral movement of the shroud cover 204 with respect to the shroud 202.

As best shown in FIG. 35, the pin members 396 may align with and be received by the receiving members 356 and the latches 394 may align with and engage the connection tabs 354 when the maintenance carousel 200 is assembled. The protruding region 388 of the shroud cover may align with the protruding region 350 of the shroud 202 such that the aperture 414 may be disposed over the actuator assembly well 362, Thus, the aperture 414 may be positioned to allow at least a portion of the actuator assembly 206 to pass therethrough. The notched portion 270 of the post 246 may extend through the aperture 414 and the actuator 254 may be pressed onto the post 246 via the socket 328 such that the underbelly 338 of the base member 308 may rest against the body 390 of the shroud cover 204.

A stopper 444 and an anchor 446 may be positioned on the shroud cover 204 proximate to the aperture 414 and may be arranged to engage the actuator 254 when the maintenance carousel 200 is in use. In some instances, the stopper 444 may be provided in the form of a T-shaped protrusion extending upwardly from the body 390 of the shroud cover 204. The stopper 444 may be configured to abut at least a portion of the base member 308 when the actuator 254 is in an idle position (pictured in FIGS. 35 and 36).

Figure 36:
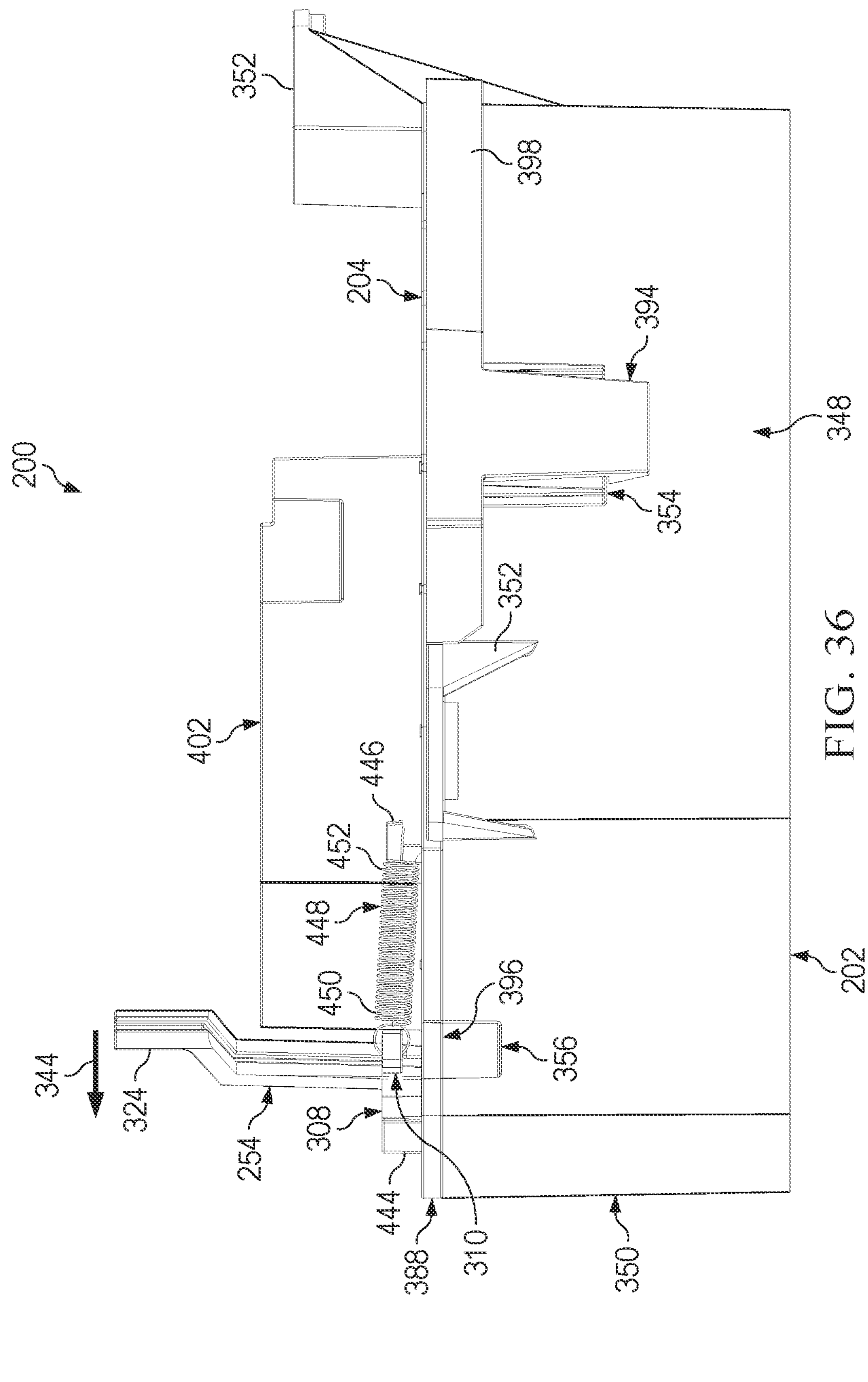
FIG. 36 illustrates a side elevational view of the maintenance carousel of FIG. 4.

Whereas the stopper 444 may be arranged to engage the base member 308 of the actuator 254, the anchor 446 may be arranged to engage the hook 310. The anchor 446 may be provided in the form of an angular member extending upwardly from the body 390 of the shroud cover 204 and extending away from the actuator 254. The anchor 446 may be positioned proximate to the protruding region 388. However, the anchor 446 may be arranged at a distance from the actuator 254 such that a spring 448 may extend between the actuator 254 and the anchor 446. As best shown in FIG. 36, a first end 450 of the spring 448 may be connected to or engage the hook 310 of the actuator 254 and a second end 452 of the spring 448 may be connected to or engage the anchor 446.

In this way, the spring 448 may apply a "return" force to the actuator 254. When the maintenance carousel 200 is in use, force may be applied to the actuator 254 causing the hook 310 to rotate away from the anchor 446 (e.g., in the direction indicated by the arrow 344). Thus, increased tension on the spring 448 may apply a return force to the actuator 254 opposing rotation in the direction of the arrow 344 and instead tending to cause the actuator 254 to return to the idle position. The stopper 444 may limit the ability of the spring 448 to cause rotation of the actuator 254 (e.g., by preventing the spring 448 from pulling the actuator 254 beyond the idle position).

Figure 37:
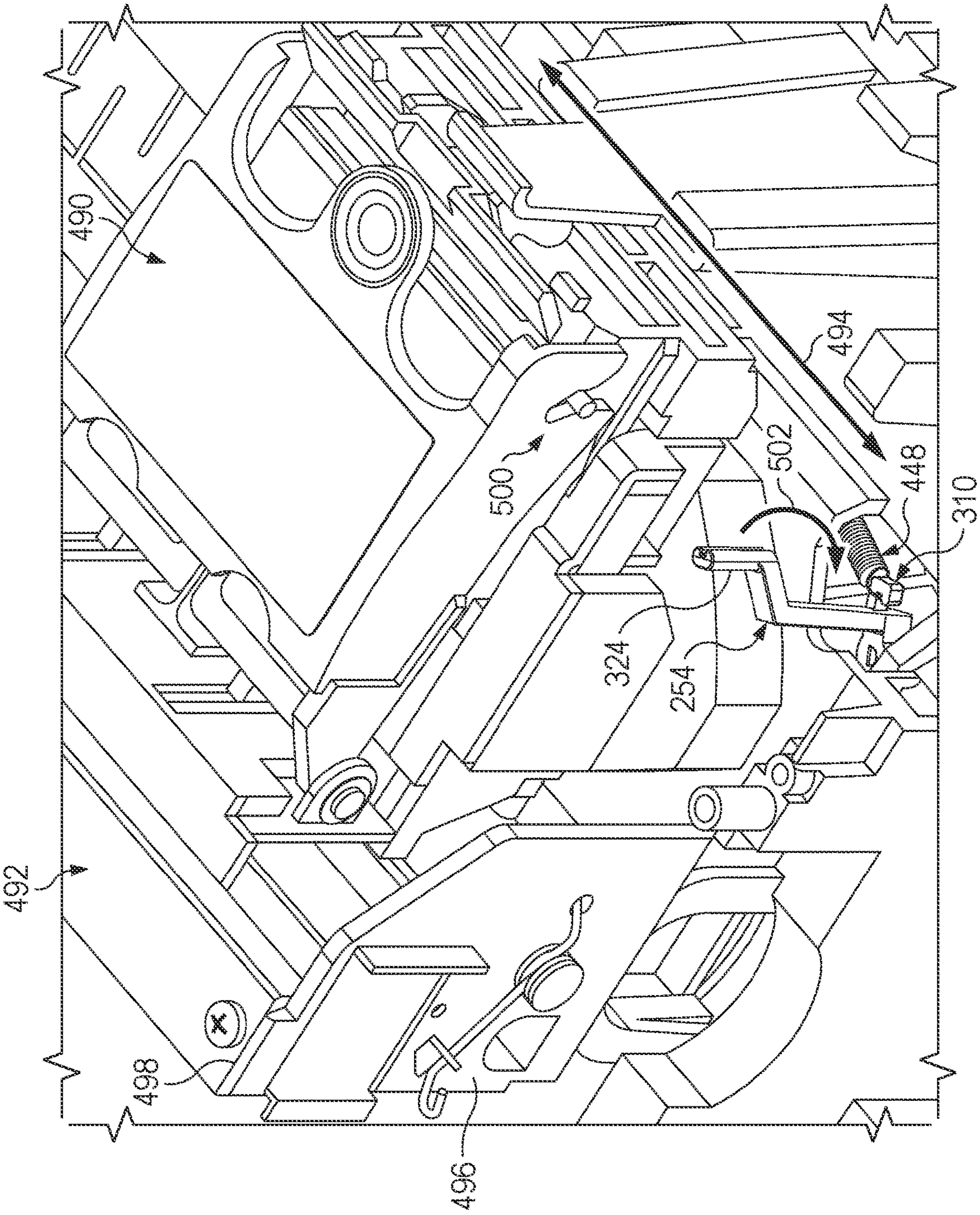
FIG. 37 illustrates an enlarged view of a portion of a second exemplary printer with the maintenance carousel of FIG. 4 installed therein.

As best shown in FIG. 37, the maintenance carousel 200 may be configured to allow a carriage 490 to engage the actuator 254 when a printer device is in use. The carriage 490 of FIG. 37 may correspond to the carriage 138 of the printer 100 (see FIG. 3) or the carriage 490 may correspond to any other component or part of a printing device configured to facilitate translational motion of one or more printheads across a printable medium. The carriage 490 may be slidably supported by a chassis 492 and may be configured to move across the chassis 492 along a path parallel to the arrow 494 of FIG. 37.

The maintenance position, as described above with reference to FIG. 30, of one or more printheads (not shown) supported by the carriage 490 may correspond to an outermost position of the carriage 490 along the chassis 492. Further translational movement of the carriage 490 may be prevented when the carriage 490 reaches or contacts a wall stop 496 positioned at a first end 498 of the chassis 492. When the carriage 490 reaches the wall stop 496, the one or more printheads supported by the carriage 490 may occupy the maintenance position (e.g., may be arranged to align with one or more openings 208, not shown in FIG. 37, and eject waste ink into the maintenance carousel 200).

At the same time, when the carriage 490 reaches the wall stop 496, a bumper 500 disposed on the carriage 490 may impact the actuator 254 and engage the actuator assembly 206. As shown in of FIG. 37, the bumper 500 is provided in the form of a portion or region of the carriage 490 positioned to impact or engage the actuator 254 as the chassis 492 approaches the first end 498. However, in other instances, the bumper 500 may be provided in any other suitable form (e.g., as a separate component coupled to the carriage 490) provided that the bumper 500 is configured to engage the actuator 254 when one or more printheads reach the maintenance position. The bumper 500 may impact the trigger 324 of the actuator 254 and cause the actuator 254 to rotate in the direction of the arrow 502 of FIG. 37 (e.g., a first direction of rotation).

Rotation of the actuator 254 in the first direction may cause the hook 310 to move away from the anchor 446 (see FIG. 35), thereby increasing the tension of the spring 448. The spring 448 may be arranged to cause the actuator 254 to rotate in a direction opposite the direction of the arrow 502 (e.g., a second direction of rotation). Thus, the spring 448 may apply a return force to the actuator 254. When the carriage 490 moves away from the actuator 254 along the chassis 492, the return force (e.g., applied by the spring 448 to the hook 310) may cause the actuator 254 to rotate back to its idle position. The return rotation may terminate when the stopper 444 contacts the base member 308 of the actuator 254 and thus opposes the return force of the spring 448. As described above with reference to FIG. 19, rotation of the actuator 254 may drive responsive rotation of the post 246 via the engagement between the notched portion 270 and the socket 328. In turn, rotation of the post 246 may drive rotation of the one way clutch 248 and the gear unit 294. However, the one way clutch 248 may be configured to permit rotation of the gear unit 294 in the first direction of rotation of the actuator 254 but prohibit rotation of the gear unit 294 in the second direction of rotation of the actuator 254 (e.g., during the return of the actuator 254 to the idle position).

While the maintenance carousel 200 is in use with a printer, it may be engaged by the printer (e.g., via the bumper 500) repeatedly each time it is desirable for one or more printheads to eject waste ink to maintain print quality. Each such engagement may initiate an indexing sequence involving (1) a first step during which rotation of the actuator 254 in the first direction is driven by a carriage or other component of a printer that moves laterally with respect to the printed media during printing (e.g., the bumper 500), (2) a second step during which one or more printheads (e.g., the printhead 140) ejects waste ink into the maintenance carousel 200 via one or more openings 208, and (3) a third step during which rotation of the actuator 254 in the second direction is driven by the spring 448 until the actuator 254 returns to its idle position. As shown in FIG. 37, the indexing sequence may be initiated when the carriage 490 approaches the first end 498 of the chassis 492 and the bumper 500 impacts the actuator 254. The indexing sequence may terminate when the base member 308 returns to and contacts the stopper 444 (see FIG. 35). Due to the unidirectional action of the one way clutch 248, the first step of the indexing sequence may result in the gear 250 driving rotation (e.g., indexing) of the tray 210, whereas the tray 210 may remain stationary during the return of the actuator 254 to the idle position during the third step.

In this way, the gear 250 may cause indexing (e.g., stepped rotational movement) of the tray 210 each time waste ink is deposited. Due to this indexing, the point of waste ink collection within the tray 210 (e.g., the point along the absorbent pad 234 where waste ink is deposited) may be varied. Indexing of the tray 210 may cause waste ink to accumulate in a circular pattern, thereby reducing the likelihood that waste ink will accumulate in substantially vertical formations (e.g., stalagmites) which can lead to malfunction or can shorten the life span of a printer. Additionally, in some instances, users may not be required to replace the absorbent pad 234 or any other component of the maintenance carousel 200, thereby leading to increased convenience and lower costs for consumers.

Indexing of the tray 210 may also be aided by the flex tabs 358, which may apply friction to the tray 210 via the ridge 384 as described above with reference to FIG. 26. The friction applied by the flex tabs 358 may oppose the rotation of the tray 210 in response to rotation of the gear 250. Without this friction, the predominant force opposing the rotation of the tray 210 may be a minimal amount of friction between the central pillar 364 of the shroud and the receiving post 226 of the tray 210. With little to no opposing force, the rotation of the tray 210 may be directly tied to the rotation of the gear 250, thereby eliminating or reducing the ability to index.

In some instances, the maintenance carousel 200 may be configured such that the tray 210 undergoes one full rotation for approximately every sixty print jobs. In other instances, the maintenance carousel 200 may be configured to provide any other desirable rate of rotation of the tray 210.

Turning to FIGS. 38-44, another embodiment of a maintenance carousel 600 is depicted and may be provided in substantially the same form as the maintenance carousel 200, except that the maintenance carousel 600 may include two electrostatic plates 601*a*, 601*b* configured to produce an electromagnetic field that may aid the maintenance carousel 600 in collecting waste ink. In describing the maintenance carousel 600, like names and like reference numerals are used to refer to like parts with respect to the maintenance carousel 200 (i.e., components of the maintenance carousel 600 and components of the maintenance carousel 200 labeled with similar or identical names and reference numerals having a difference of exactly 400 may be substantially similar in both form and function).

Figure 38:
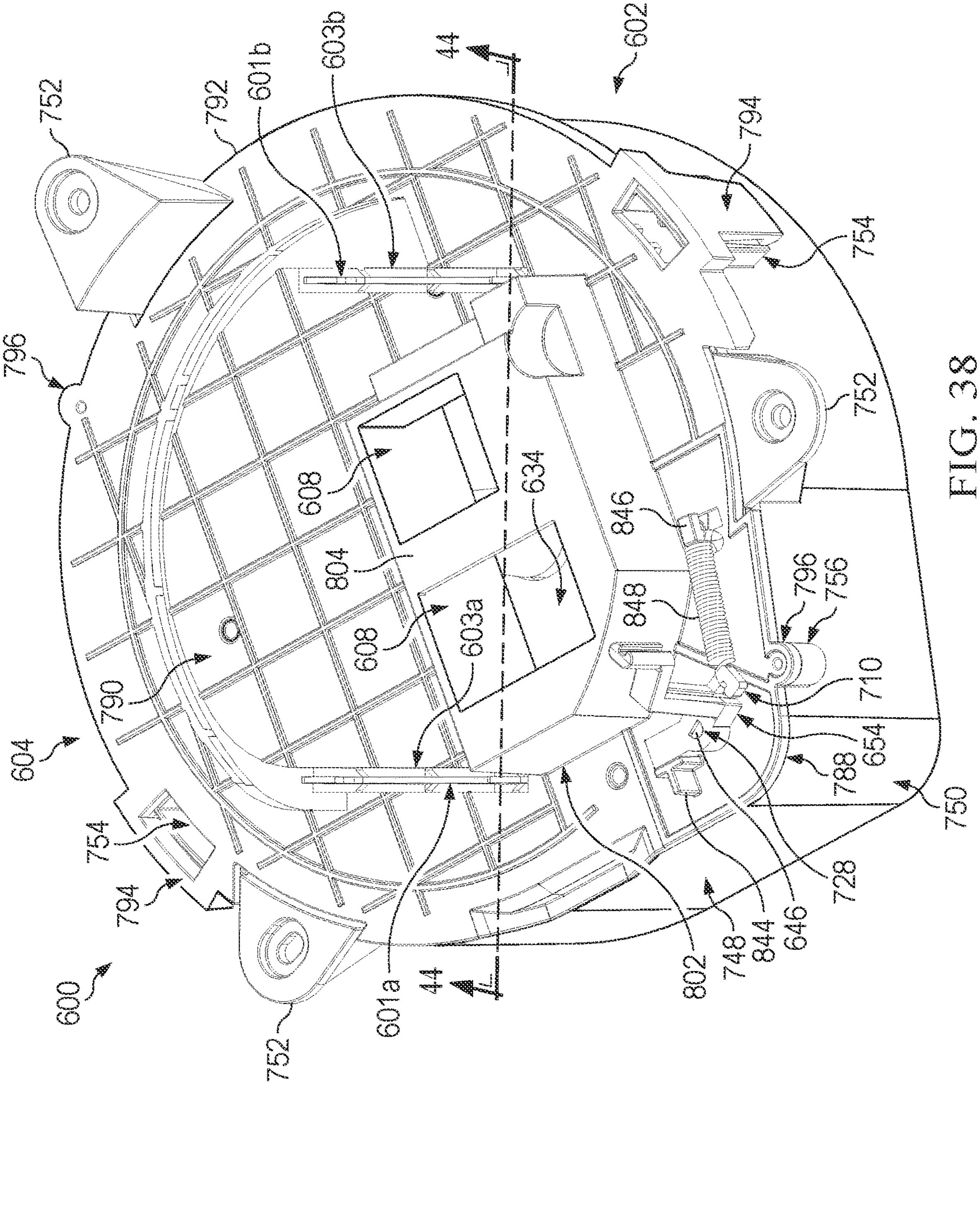
FIG. 38 illustrates a top isometric view of a second exemplary maintenance carousel for use with the printer of FIGS. 1-3 constructed according to the teachings of the present disclosure.

As best shown in FIG. 38, the maintenance carousel 600 may include a shroud 602 and a shroud cover 604 provided in a form substantially similar to that of the shroud 202 and the shroud cover 204 of the maintenance carousel 200. The shroud cover 604 may include one or more latches 794 and one or more pin members 796 disposed about a peripheral edge 792 thereof and extending downwardly therefrom. The shroud 602 may include one or more connection tabs 754 and one or more receiving members 756 disposed about an outer wall thereof and extending outwardly therefrom. The latches 794 and pin members 796 may be arranged to align with and be received by the connection tabs 754 and receiving members 756, respectively, and may facilitate coupling between the shroud 602 and the shroud cover 604 as described above with reference to FIGS. 32-34.

Likewise, a protruding region 788 of the shroud cover 604 may correspond to a protruding region 750 of the shroud 602 when the shroud 602 and shroud cover 604 are properly aligned and coupled together. The shroud 602 may also include one or more installation tabs 752 disposed along an outer wall 748 and extending outwardly therefrom. The installation tabs 752 may be configured to facilitate a connection or coupling between the maintenance carousel 600 and a printer (e.g., the printer 100 or any other suitable printing device).

An actuator 654 may be disposed on the shroud cover 604 proximate to the protruding region 788. The actuator 654 may be coupled to a post 646 which may extend upwardly through the shroud cover 604 and be received by a socket 728 of the actuator 654. A stopper 844 may be disposed on the shroud cover 604 and may abut the actuator 654 when the actuator 654 is in the idle position (shown in FIG. 38). An anchor 846 may protrude upwardly from the shroud cover 604 and may be positioned opposite the stopper 844 with respect to the actuator 654. A spring 848 extending between the anchor 846 and a hook 710 of the actuator 654 may apply a return force to the actuator 654 in the event that the actuator 654 rotates away from the anchor 846.

A housing 802 positioned proximate to the actuator assembly 606 and extending upwardly from a body 790 of the shroud cover 604 may have a ceiling 804 including one or more openings 608 extending therethrough. The openings 608 may allow waste ink to enter an enclosure formed by the shroud 602 and the shroud cover 604 when the maintenance carousel 600 is in use. As shown in FIG. 38, two rectilinear openings 608 are provided on the ceiling 804. However, in other instances, any number of openings 608 may be arranged in any suitable configuration, provided that the openings 608 are positioned to allow one or more printheads of a printer (e.g., the printhead 140 of the printer 100) to deposit waste ink into the maintenance carousel 600.

Figure 39:
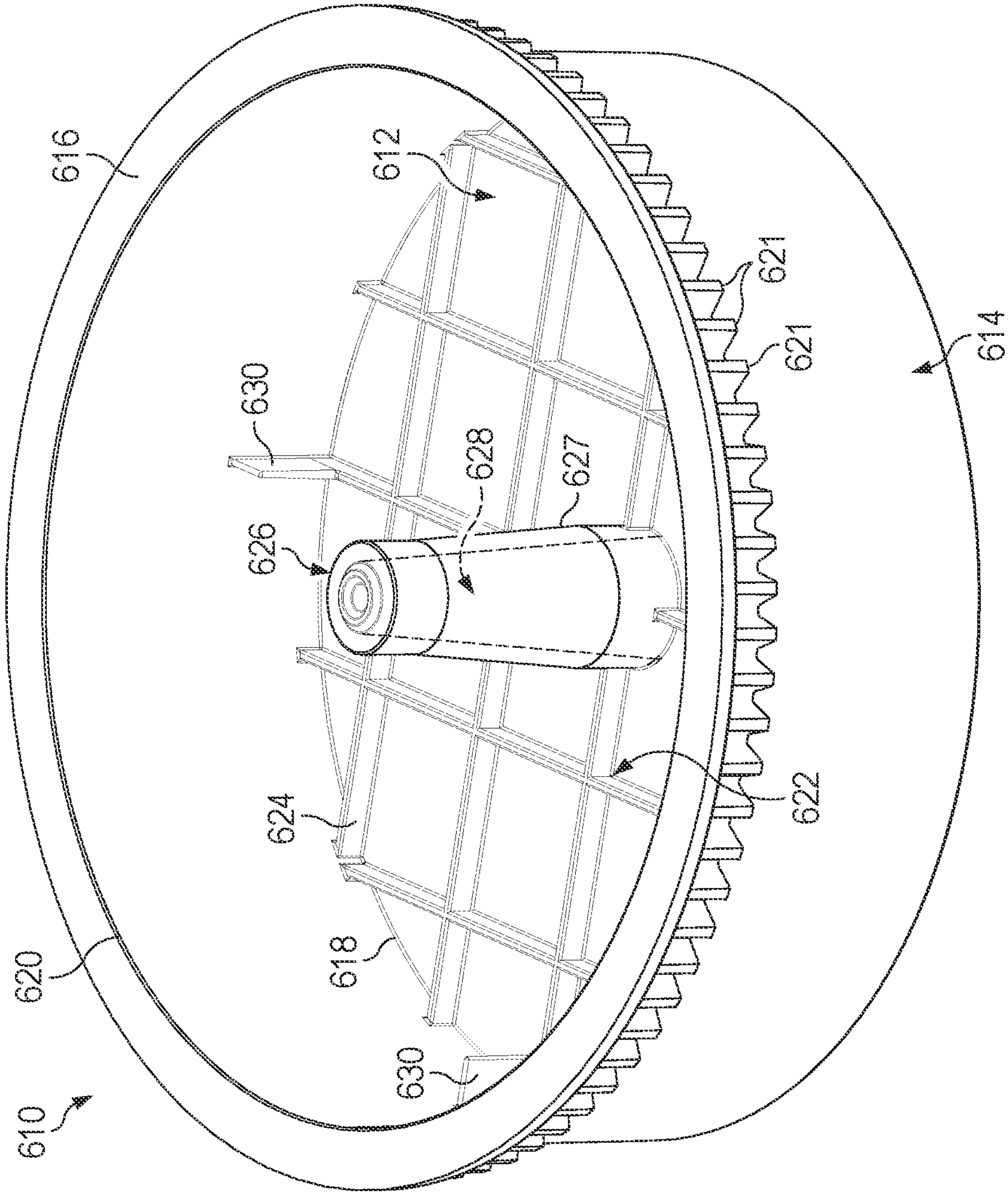
FIG. 39 illustrates a top isometric view of a tray of the maintenance carousel of FIG. 38.

Turning to FIG. 39, a tray 610 configured to collect waste ink may be disposed within the enclosure formed by the shroud 602 and shroud cover 604. The tray 610 may include a substantially circular base 612, a substantially annular lip 616, and a substantially cylindrical sidewall 614 extending therebetween. The base 612 may be circumscribed by a lower perimeter 618 of the sidewall 614 and the lip 616 may extend outwardly from an upper perimeter 620 of the sidewall 614. A receiving post 626 with a cavity 628 defined by a sidewall 627 of the receiving post 626 extending therethrough may be disposed on the base 612 in a central location with respect to the sidewall 614. In some instances, a tray support structure 622 including a plurality of wall members 624 may be disposed on the base 612 and extend upwardly therefrom. The tray 610 may include one or more fins 630 disposed about the lower perimeter 618 of the sidewall 614 and extending inwardly (e.g., toward the receiving post 626) therefrom. A third plurality of teeth 621 may circumscribe the upper perimeter 620 of the sidewall 614 and extend outwardly therefrom. The third plurality of teeth 621 may be disposed below and/or adjacent to the lip 616 and be evenly radially spaced apart from one another about the upper perimeter 620.

Figure 40:
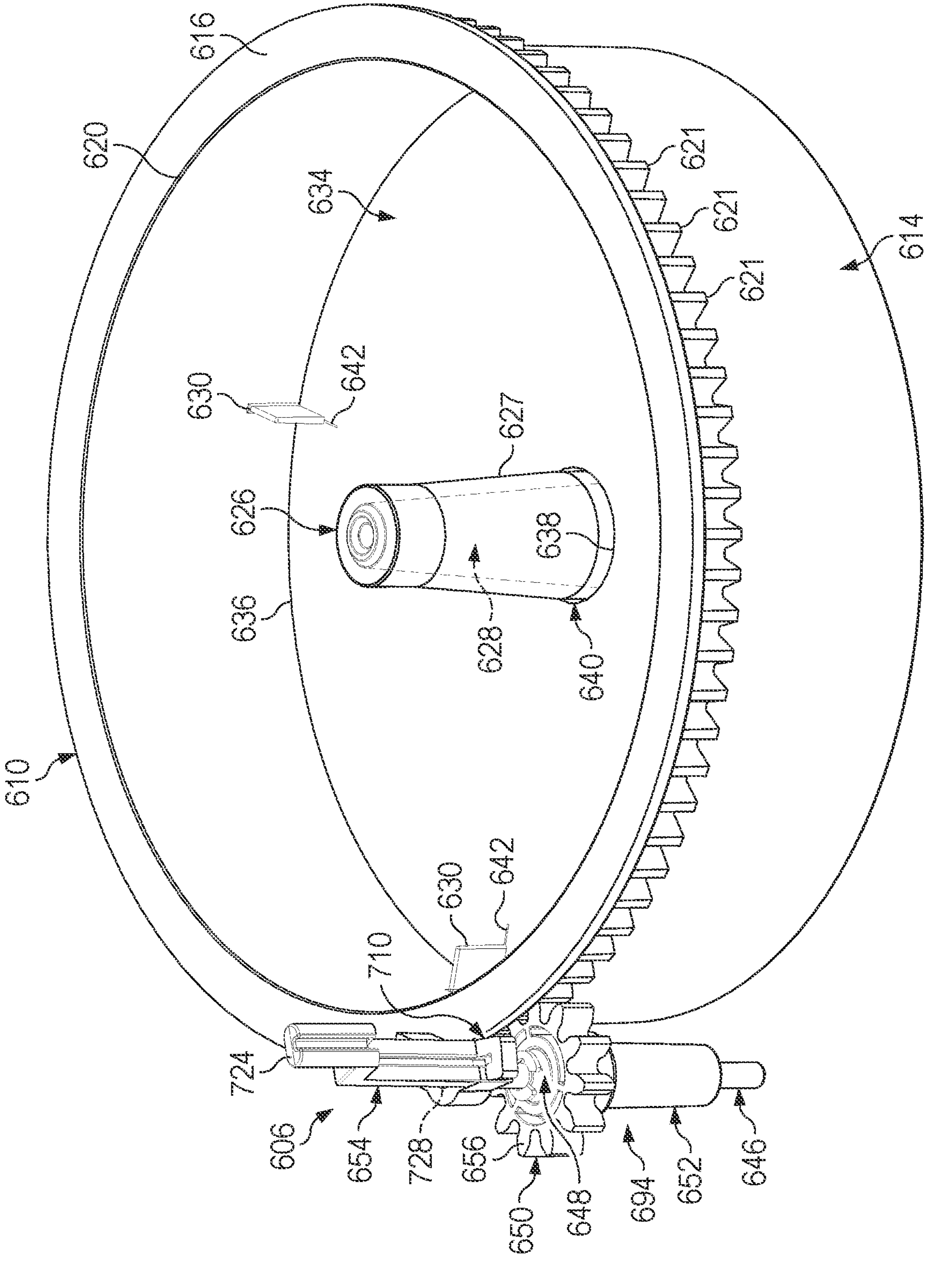
FIG. 40 illustrates a top isometric view of the tray of FIG. 39 with an absorbent pad disposed therein and an actuator assembly of the maintenance carousel of FIG. 38 positioned adjacent thereto.

Turning to FIG. 40, an absorbent pad 634 may be disposed within the tray 610. The absorbent pad 634 may be substantially annular in shape and may be defined by an outer diameter 636 and an inner diameter 638. The outer diameter 636 may correspond to and be imparted with substantially the same dimensions as the lower perimeter 618 of the sidewall 614. The inner diameter 638 may define a central opening 640 corresponding to and configured to receive the receiving post 626 when the absorbent pad 634 is positioned within tray 610. In some instances, the absorbent pad 634 may rest atop the tray support structure 622. One or more slots 642 corresponding to the one or more fins 630 of the tray 610 may be disposed about the outer perimeter 636 of the absorbent pad 634 and extend entirely therethrough. The slots 642 may be evenly radially spaced apart from one another along the outer diameter 636 and each slot 642 may be configured to align with and receive one fin 630 when the absorbent pad 634 is positioned within the tray 610. Thus, engagement between the fins 630 and the slots 642 may prevent or oppose rotation of the absorbent pad 634 with respect to the tray 610.

An actuator assembly 606, provided in substantially the same form as the actuator assembly 206, may include a post 646, a gear unit 694 including a gear 650 positioned along the post 646, a one way clutch 648 disposed between the gear 650 and the post 646, and an actuator 654 positioned atop the post 646. The post 646, one way clutch 648, and gear unit 694 may be configured to rotate together as a single unit in response to rotation of the actuator 654. The actuator 654 may be fixedly coupled to or fitted with the post 646 via the socket 728 and may extend upwardly therefrom. A trigger 724 may be positioned atop the actuator 654 and may be configured to translate a linear force imparted on the trigger 724 into a rotational force imparted on the actuator 654 and translated to the remaining components of the actuator assembly 606. The gear 650 may include a fourth plurality of teeth 656. The actuator assembly 606 may be positioned adjacent to the tray 610 such that the fourth plurality of teeth 656 may align with and engage the third plurality of teeth 621. Thus, the actuator assembly 606 may perform indexing of the tray 610 in a manner substantially similar to that described above with reference to FIG. 37.

Figure 41:
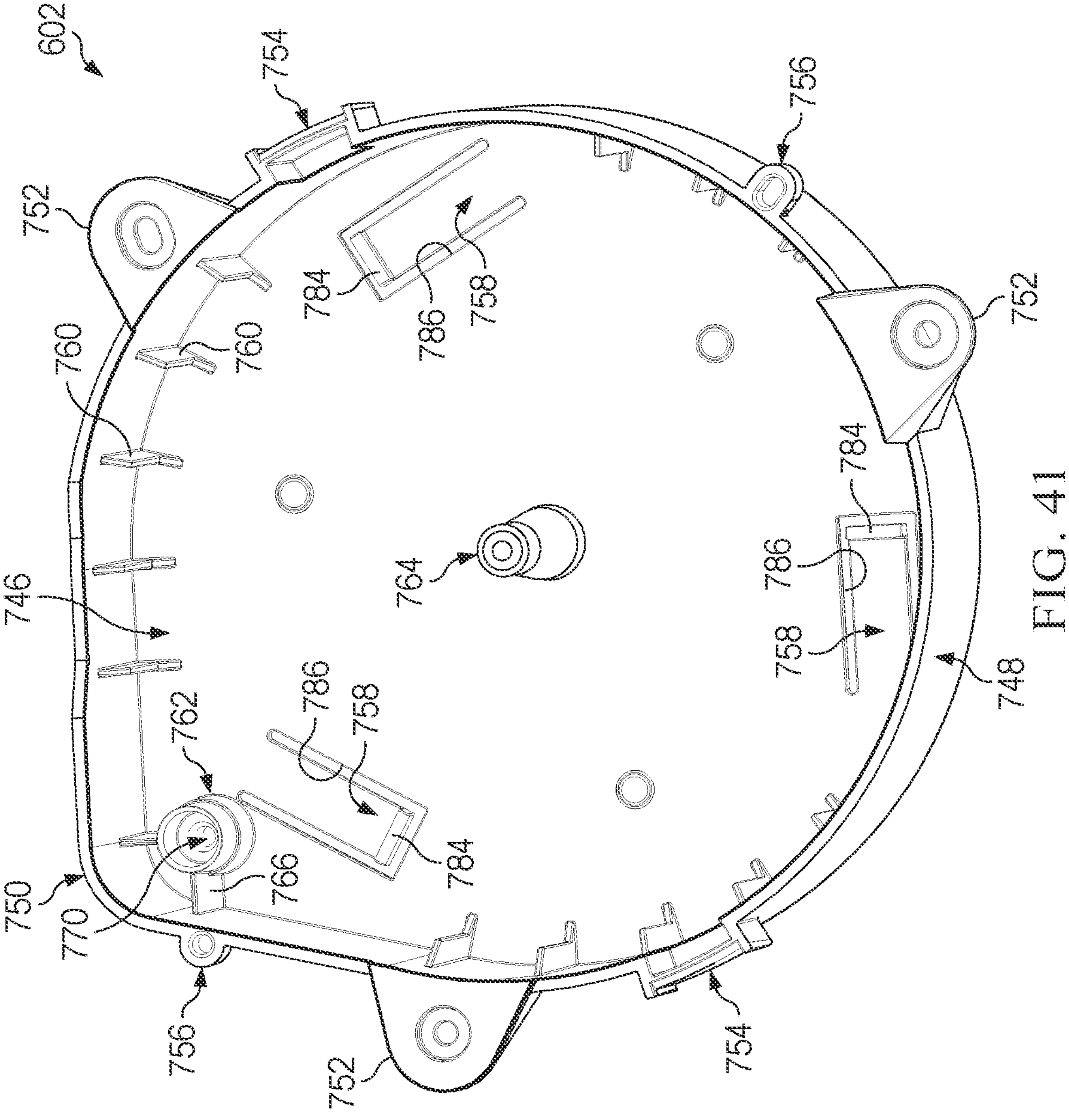
FIG. 41 illustrates an isometric view of a shroud of the maintenance carousel of FIG. 38.

Turning to FIG. 41, the shroud 602 may include an actuator assembly well 762 and a central pillar 764 disposed on a platform 746 of the shroud 602 and extending upwardly therefrom. The actuator assembly well 762 may be positioned in the protruding region 750 proximate to the outer wall 748. In some instances, one or more connector walls 766 may extend between the outer wall 748 and the actuator assembly well 762, thereby coupling the actuator assembly well 762 and the outer wall 748 and imparting additional structural stability to the actuator assembly well 762. A passageway 770 configured to receive at least a portion of the post 646 and at least a portion of the gear unit 694 may extend vertically through the actuator assembly well 762 such that the actuator assembly 606 may be mounted within and supported by the actuator assembly well 762 when the maintenance carousel 600 is fully assembled. The central pillar 764 may be positioned to align with and be received by the receiving post 626 of the tray 610 such that the tray 610 may be supported by the shroud 602 for rotation about the central pillar 764.

The shroud 602 may include one or more flex tabs 758 formed in the platform 746. Each flex tab may include a ridge 784 positioned at an end thereof and may be at least partially surrounded by a moat 786 which may allow the flex tab 758 to flex upwardly or downwardly with respect to the platform 746. In this way, the flex tabs 758 may be configured to apply friction to the tray 610, as described above with reference to FIG. 26, when indexing is performed by the actuator assembly 606. Additionally, one or more elongate fins 760 configured to prevent or reduce unintended movement of the tray 610 within the shroud 602 may be disposed along the outer wall 748 and extend inwardly therefrom (e.g., toward the central pillar 764).

Figure 42:
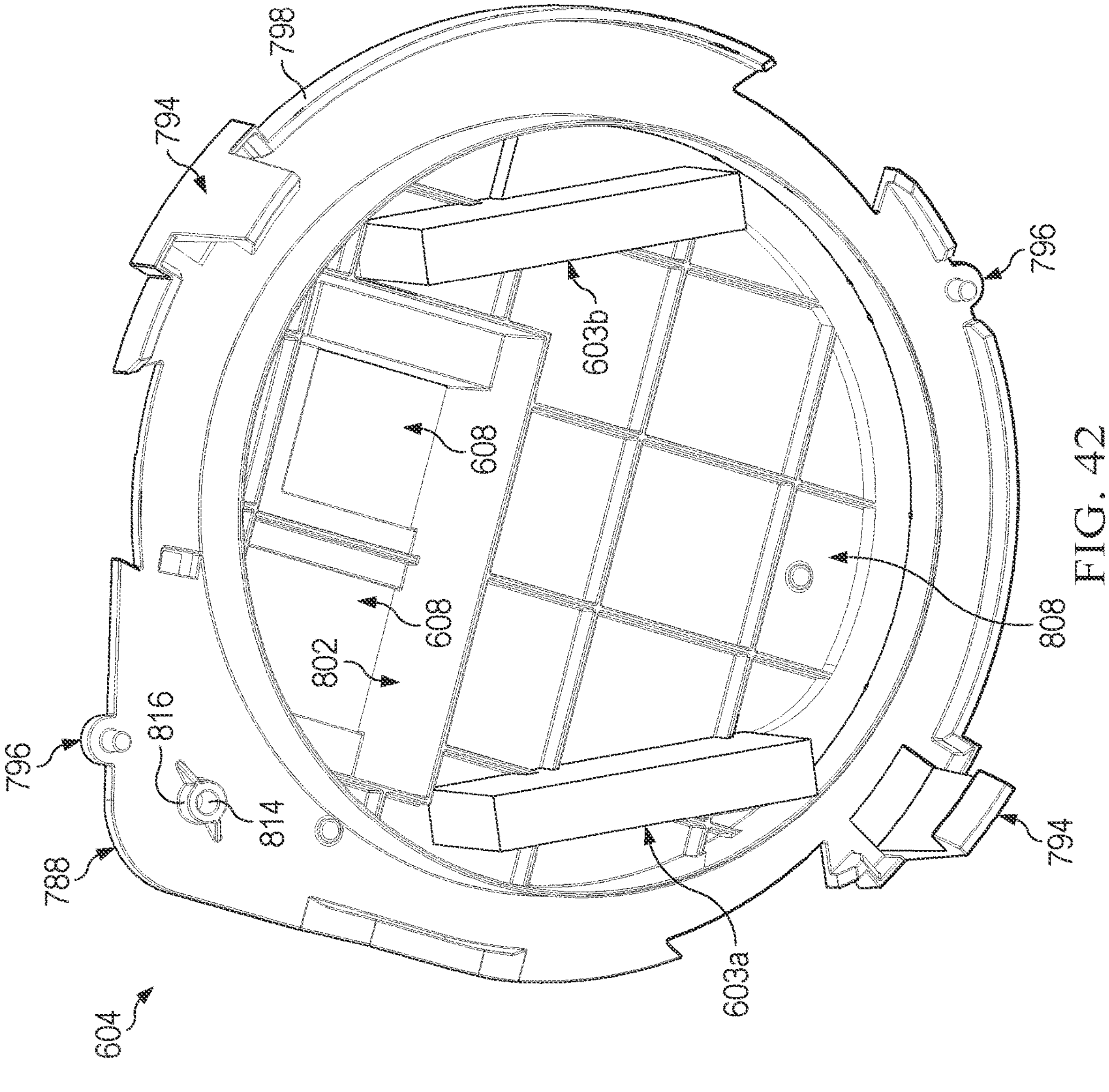
FIG. 42 illustrates a bottom isometric view of a shroud cover of the maintenance carousel of FIG. 38.

One difference between the maintenance carousel 200 and the maintenance carousel 600 is that the shroud cover 604 of the maintenance carousel 600 may include two plate housings 603*a*, 603*b* configured to receive the two electrostatic plates 601*a*, 601*b*, respectively. As best shown in FIG. 42, the plate housings 603*a*, 603*b* are each defined by a rectilinear sidewall protruding downwardly from an underside 808 of the shroud cover 604. The plate housings 603*a*, 603*b* may be oriented in a substantially parallel manner with respect to each other.

As can also be seen in FIG. 42, a substantially cylindrical collar 816 defining an aperture 814 extending therethrough may be disposed on the underside 808 of the shroud cover 604 proximate to the protruding region 788. The aperture 814 may be arranged to align with the actuator assembly well 762 and to receive at least a portion of the post 646 of the actuator assembly 606. Thus, at least a portion of the post 646 may extend above the shroud cover 604 via the aperture 814 to support the actuator 654 when the maintenance carousel 600 is assembled (see FIG. 38).

Figure 43:
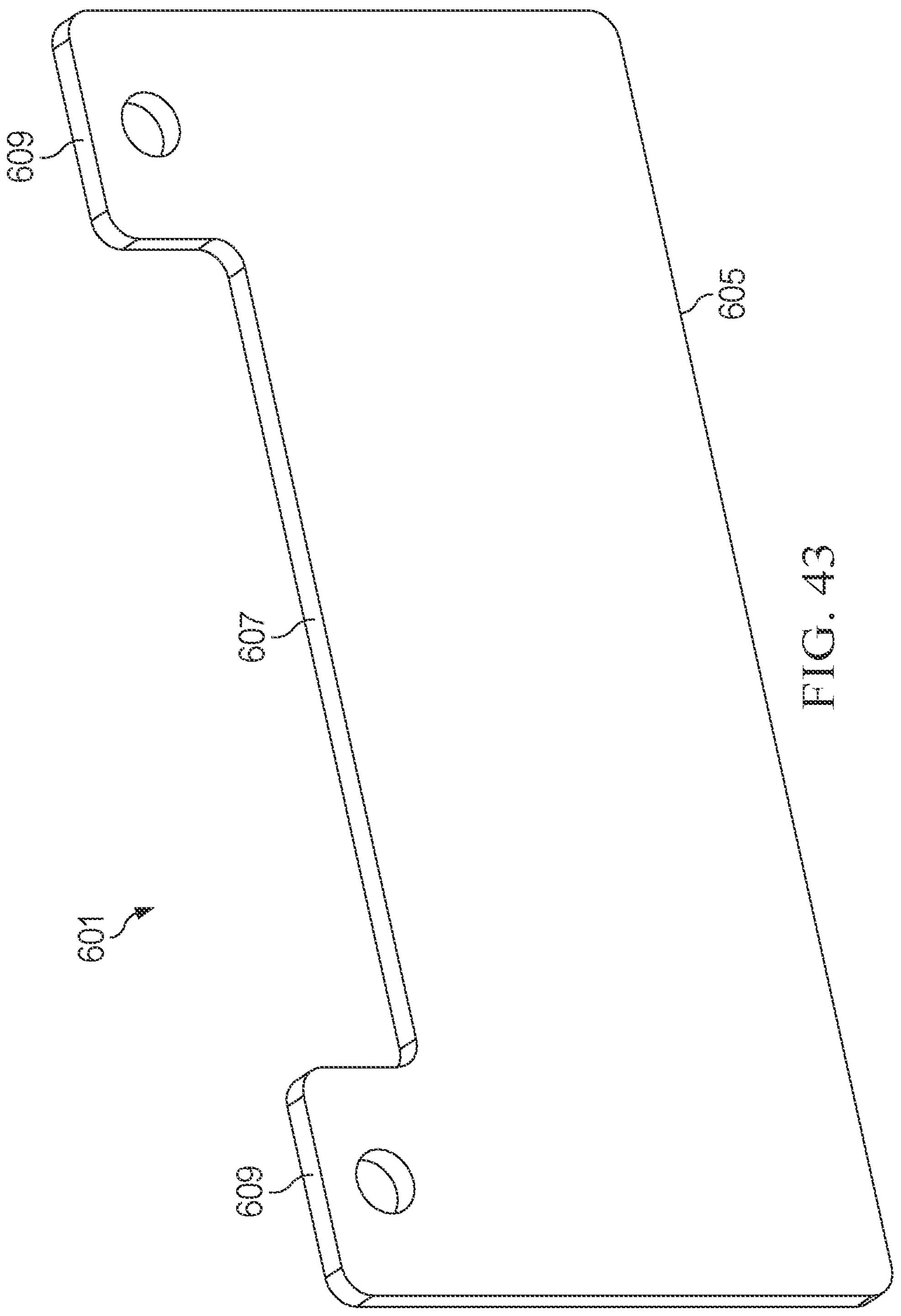
FIG. 43 illustrates an isometric view of an electrostatic plate of the maintenance carousel of FIG. 38.

As best shown in FIG. 43, the electrostatic plates 601*a*, 601*b* may be substantially identical. However, in other instances, the electrostatic plates 601*a*, 601*b* may be provided as unique parts imparted with any suitable shape or structure. Each electrostatic plate 601 may be provided in the form of a metal or other conductive material (e.g., conductive polymers, silicon, or any other suitable material) and may be provided in the form of a substantially rectilinear panel defined by a bottom end 605 and a top end 607 opposing the bottom end 605. One or more contacts 609 may extend upwardly from opposing sides of the top end 607. When an electrostatic plate 601 is disposed at least partially, or entirely within a plate housing 603, the bottom end 605 of the electrostatic plate 601 may be inserted into the plate housing 603 first such that the bottom end 605 is disposed adjacent to the absorbent pad 634 (see FIG. 44).

Figure 44:
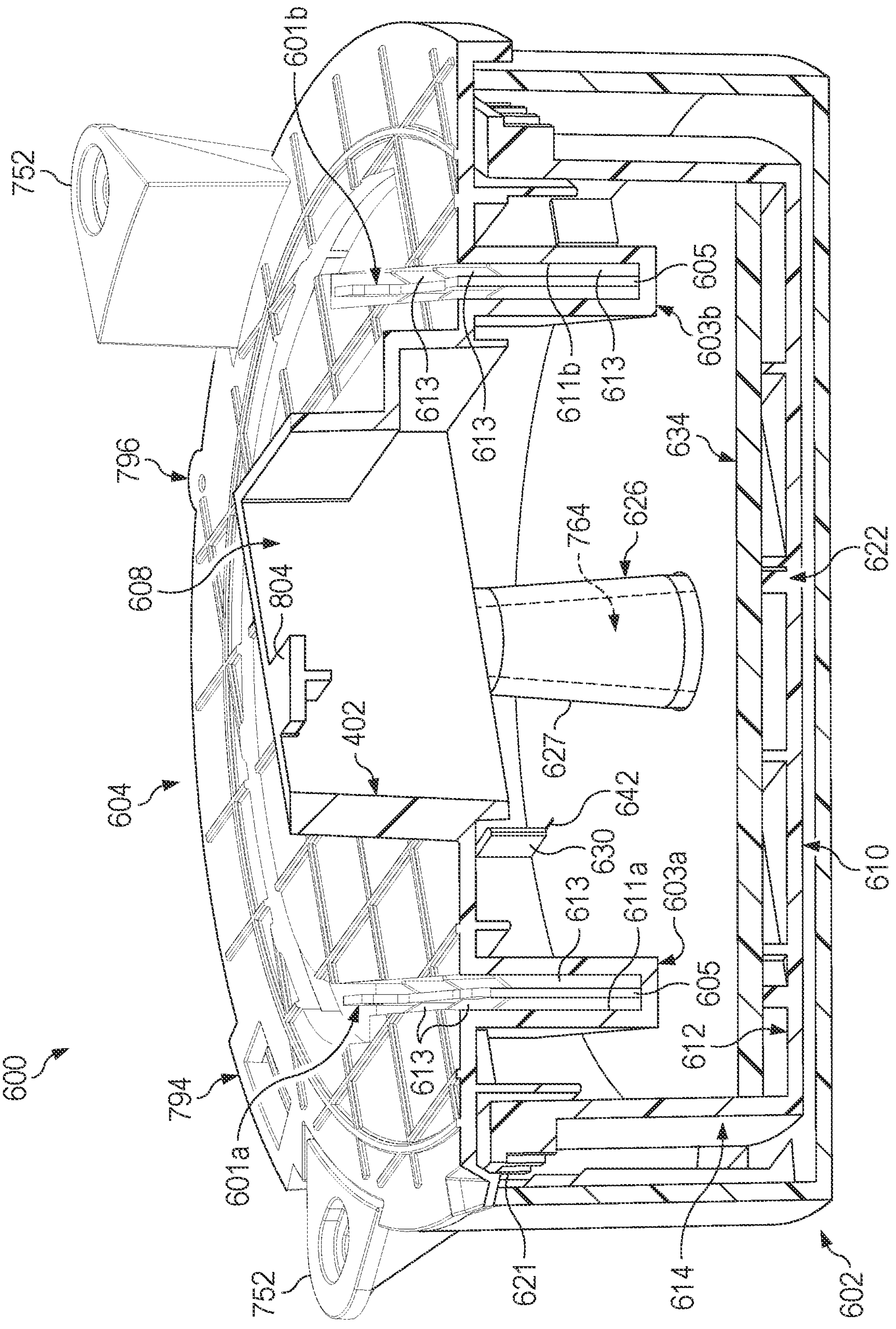
FIG. 44 illustrates a cross sectional view of the maintenance carousel of FIG. 38 taken along the line 44-44 of FIG. 38.

As best shown in FIG. 44, the electrostatic plates 601*a*, 601*b* disposed within the plate housings 603*a*, 603*b* may extend downwardly into the enclosure formed by the shroud 602 and the shroud cover 604. The plate housings 603*a*, 603*b* may include interior walls 611*a*, 611*b* defining a chamber within which the electrostatic plates 601*a*, 601*b* may rest. The plate housings 603*a*, 603*b* may further include one or more retention members 613 coupled to the interior walls 611*a*, 611*b* and extending inwardly therefrom. The retention members 613 may be configured to buttress the electrostatic plates 601*a*, 601*b* and reduce or eliminate movement of the electrostatic plates 601*a*, 601*b* within the plate housings 603*a*, 603*b*.

Each of the electrostatic plates 601*a*, 601*b* may be electrically charged. In some instances, the electrostatic plates 601*a*, 601*b* may be in communication with a transformer (not shown), which may apply a voltage to the electrostatic plates 601*a*, 601*b* (e.g., via the contacts 609). In this way, one of the electrostatic plates 601*a*, 601*b* may be imparted with a positive charge and the other of the electrostatic plates 601*a*, 601*b* may be imparted with a negative charge. Thus, the electrostatic plates 601*a*, 601*b* may generate an electromagnetic field within and/or around the maintenance carousel 600. Either of the electrostatic plates 601*a*, 601*b* may be selected for a positive charge and either of the electrostatic plates 601*a*, 601*b* may be selected for a negative charge. However, the electrostatic plates 601*a*, 601*b* should be imparted with opposing charges in order to generate the electromagnetic field.

In some instances, the electrostatic plates 601*a*, 601*b* and plate housings 603*a*, 603*b* may be imparted with a substantially vertical orientation (e.g., substantially perpendicular with respect to the base 612 of the tray 610). In other instances, the electrostatic plates 601*a*, 601*b* and plate housings 603*a*, 603*b* may be imparted with a substantially horizontal orientation (e.g., substantially parallel to the base 612 of the tray 610). The orientation and/or position of the electrostatic plates 601*a*, 601*b* may be chosen depending on the desired direction and/or strength of the electromagnetic field.

In some instances, electromagnetically charged waste ink may be ejected by a printhead (e.g., the printhead 140) in the form of small droplets and/or aerosolized particles that may have a tendency to become airborne or accumulate in areas outside of the maintenance carousel 600. The electromagnetic field may attract these smaller droplets and/or aerosolized particles of waste ink to the electrostatic plates 601*a*, 601*b* when the maintenance carousel 600 is in use. Thus, the electrostatic plates 601*a*, 601*b* and the magnetic field generated therefrom may increase the efficacy of the maintenance carousel 600 and/or improve the life span of a printer. For example, the electromagnetic field may reduce the likelihood of droplets or particles of waste ink accumulating critical components of the printer where they may cause damage or lead to malfunction. If waste ink were to accumulate directly on the electrostatic plates 601*a*, 601*b*, it could interfere with the function of the maintenance carousel 600 (e.g., by causing a short circuit). Thus, in addition to positioning and orienting the electrostatic plates 601*a*, 601*b* appropriately (e.g., a sufficient distance away from the openings 608), the plate housings 603*a*, 603*b* may shield the electrostatic plates 601*a*, 601*b* from direct waste ink accumulation.

The maintenance carousel 600 may be positioned within and operably engaged by a printer (e.g., the printer 100 or any other suitable printing device) in a manner substantially similar to that of the maintenance carousel 200 as described above, in particular with reference to FIG. 37. Thus, the actuator assembly 606 may drive indexing of the tray 610, thereby causing ink build up on the absorbent pad 634 to be imparted with a generally circular profile.

Turning to FIGS. 45-54, another embodiment of a maintenance carousel 1000 is depicted and may be provided in substantially the same form as the maintenance carousel 200, except that the maintenance carousel 1000 may further include a fan assembly 1001 configured to produce an airflow through the maintenance carousel 1000 and into a tunnel region 1003 thereof. In describing the maintenance carousel 1000, like names and like reference numerals are used to refer to like parts with respect to the maintenance carousel 200 (i.e., components of the maintenance carousel 1000 and components of the maintenance carousel 200 labeled with similar or identical names and reference numerals having a difference of exactly 800 may be substantially similar in both form and function).

Figure 45:
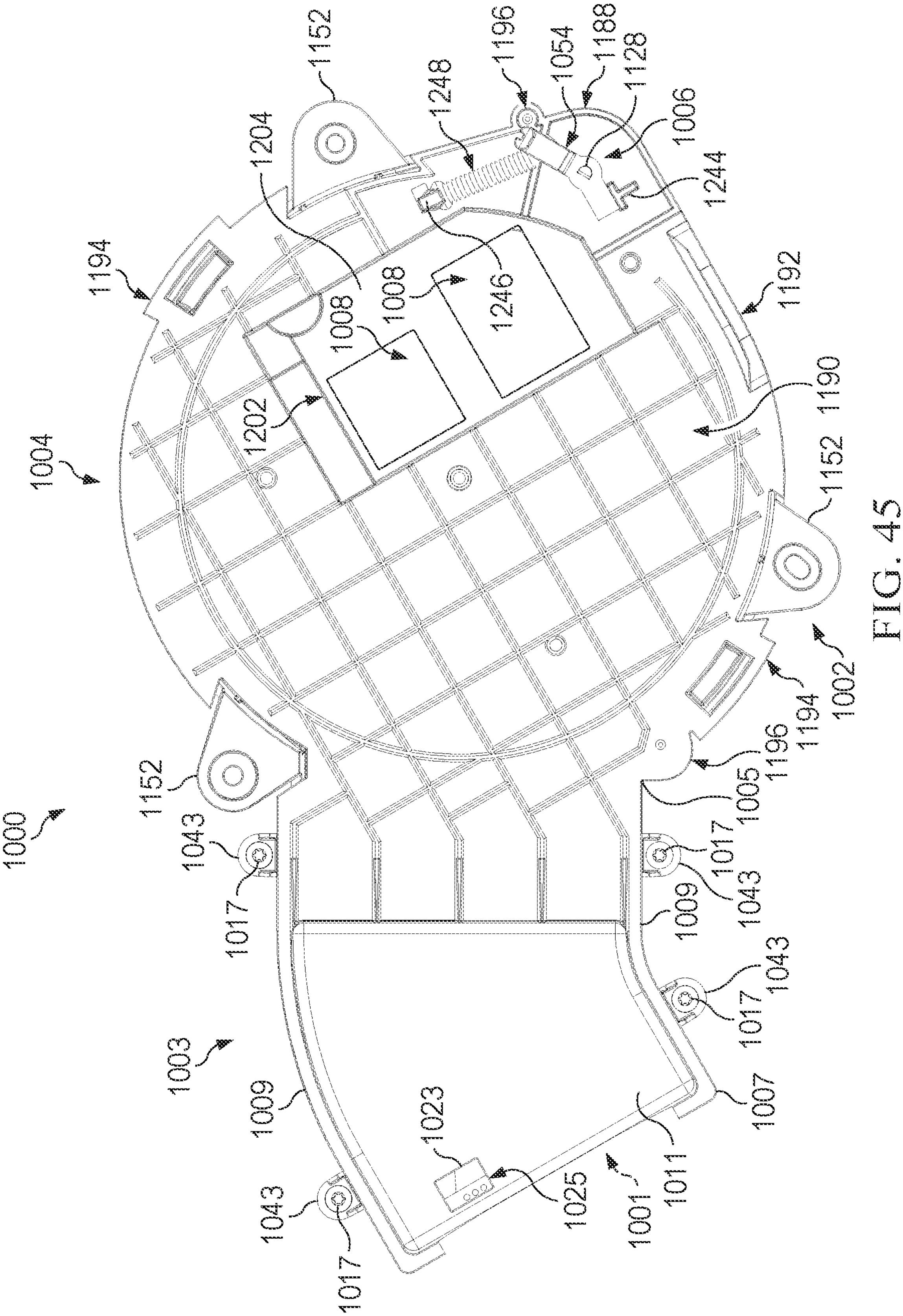
FIG. 45 illustrates a top plan view of a third exemplary maintenance carousel for use with the printer of FIGS. 1-3 constructed according to the teachings of the present disclosure.
Figure 46:
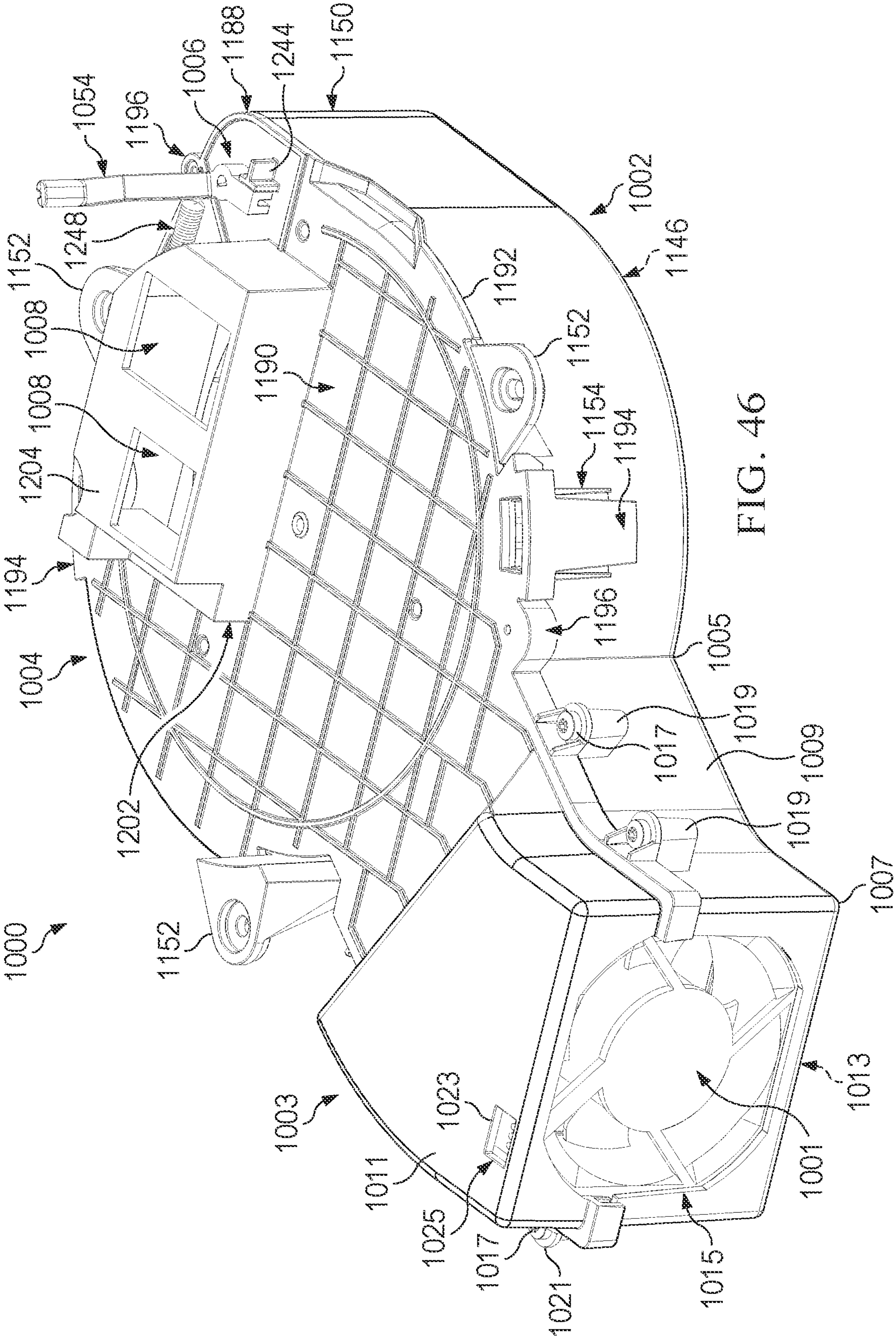
FIG. 46 illustrates a front and top isometric view of the maintenance carousel of FIG. 45.

As shown in FIGS. 45 and 46, the maintenance carousel 1000 may include a shroud 1002 and a shroud cover 1004 which may be provided in a form substantially similar to that of the shroud 202 and the shroud cover 204 of the maintenance carousel 200. However, the shroud 1002 and shroud cover 1004 may include the tunnel region 1003, which may be configured to retain the fan assembly 1001 and/or other internal components of the maintenance carousel 1000. As best shown in FIG. 46, the shroud 1002 may include a platform 1146 and an outer wall 1148 circumscribing the platform 1146 and extending upwardly therefrom. The shroud cover 1004 may include a peripheral edge 1192 defining a body 1190 which may be imparted with substantially the same shape as the platform 1146 of the shroud. Thus, the shroud cover 1004 may be coupled to the shroud 1002 such that a protruding region 1188 of the shroud cover 1004 aligns with a protruding region 1150 of the shroud 1002 and an actuator assembly 1006 may be supported proximate thereto.

An actuator 1054 may be disposed on the shroud cover 1004 proximate to the protruding region 1188. The actuator 1054 may be coupled to a post 1046 (see FIG. 49) which may extend upwardly through the shroud cover 1004 and be received by a socket 1128 of the actuator 654. A stopper 1244 may be disposed on the shroud cover 1004 and may abut the actuator 1054 when the actuator 1054 is in the idle position (shown in FIGS. 45 and 46). An anchor 1246 may protrude upwardly from the shroud cover 1004 and may be positioned opposite the stopper 1244 with respect to the actuator 1054. A spring 1248 extending between the anchor 1246 and a hook 1110 of the actuator 1054 may apply a return force to the actuator 1054 in the event that the actuator 1054 rotates away from the anchor 1246.

The tunnel region 1003 may be positioned opposite the actuator assembly 1006 with respect to the body 1190 and platform 1146 and may include at least a portion of each of the shroud 1002 and shroud cover 1004. The tunnel region 1003 may be provided in the form of a substantially linear, bent, or curved passageway extending outwardly from the outer wall 1148 and the body 1190 and in fluid communication with the remainder of the enclosure formed by the shroud 1002 and shroud cover 1004. The tunnel region 1003 may begin at a proximal end 1005 connected to the outer wall 1148 and the body 1190 and may terminate at a distal end 1007 opposing the proximal end 1005. The tunnel region 1003 is provided in the form of two tunnel walls 1009, a ceiling 1011, and a base 1013 extending from the proximal end 1005 to the distal end 1007 and defining an airflow passage therebetween. The fan assembly 1001 may be disposed at or near the distal end 1007 of the tunnel region 1003 and may be configured to draw air (e.g., to create an airflow) into the maintenance carousel 1000 and/or through the tunnel region 1003. In some instances, the fan assembly 1001 may be provided in the form of a digital current (DC) brushless axial fan. However, in other instances, the fan assembly 1001 may be provided in the form of any suitable device configured to produce airflow through the maintenance carousel 1000. Air driven by the fan assembly 1001 may exit the maintenance carousel 1000 via an outflow region 1015 disposed at the distal end 1007 of the tunnel region 1003.

A housing 1202 positioned proximate to the actuator assembly 1006 and extending upwardly from a body 1190 of the shroud cover 1004 may have a ceiling 1204 including one or more openings 1008 extending therethrough. The openings 1008 may allow waste ink to enter the enclosure formed by the shroud 1002 and the shroud cover 1004 when the maintenance carousel 1000 is in use. As shown in FIGS. 45 and 46, two rectilinear openings 1008 are provided on the ceiling 1204. However, in other instances, any number of openings 1008 may be arranged in any suitable configuration, provided that the openings 1008 are positioned to allow one or more printheads of a printer (e.g., the printhead 140 of the printer 100) to deposit waste ink into the maintenance carousel 1000. The openings 1008 may also provide one or more vents through which the fan assembly 1001 may draw air into the maintenance carousel 1000.

The shroud cover 1004 may include one or more latches 1194 and one or more pin members 1196 disposed about the peripheral edge 1192. The latches 1194 and pin members 1196 may be arranged to align with and be received by one or more connection tabs 1154 and one or more receiving members 1156, respectively, disposed about the outer wall 1148 of the shroud 1002. Thus, the latches 1194, pin members 1196, connection tabs 1154, and receiving members 1156 may facilitate coupling between the shroud 1002 and the shroud cover 1004 as described above with reference to FIGS. 32-34. The shroud 1002 may also include one or more installation tabs 1152 disposed along the outer wall 1148 and extending outwardly therefrom. The installation tabs 1152 may be configured to facilitate a connection or coupling between the maintenance carousel 1000 and a printer (e.g., the printer 100 or any other suitable printing device).

Additionally, one or more fasteners 1017 positioned along the tunnel region 1003 may facilitate coupling between the shroud cover 1004 and the shroud 1002. The shroud 1002 may have one or more threaded members 1019 extending outwardly from one or both of the tunnel walls 1009 and the shroud cover 1004 may have one or more connection members 1043 extending outwardly from the ceiling 1011 of the tunnel region 1003. The connection members 1043 may be arranged to align with and/or abut the threaded members 1019 such that a fastener 1017 may extend through the connection member 1043 and into the threaded member 1019, thereby coupling the shroud cover 1004 to the shroud 1002.

As best shown in FIG. 46, an opening 1023 arranged to expose or allow access to a contact region 1025 of the fan assembly 1001 may be positioned on the ceiling 1011 of the tunnel region 1003. The opening 1023 may allow the fan assembly 1001 to be operably engaged by a printer (e.g., the printer 100) when the maintenance carousel 1000 is in use. One or more components of the printer (e.g., a motor) may be electrically coupled to the fan assembly 1001 via the contact region 1025 to provide power thereto and/or drive motion thereof.

Figure 47:
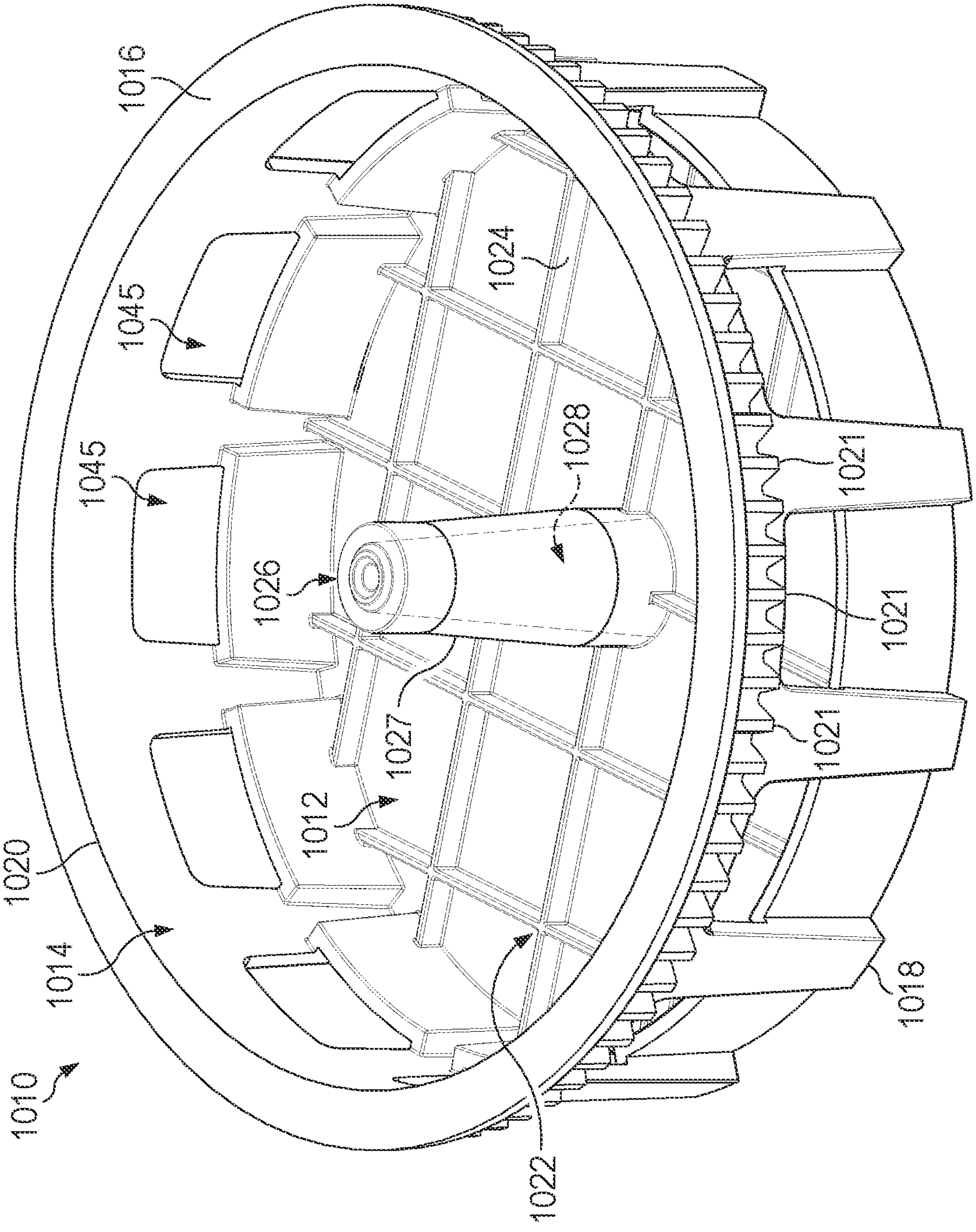
FIG. 47 illustrates a front and top isometric view of a tray of the maintenance carousel of FIG. 45.

Turning to FIG. 47, a tray 1010 configured to collect waste ink may be disposed within the enclosure formed by the shroud 1002 and shroud cover 1004. The tray 1010 may include a substantially circular base 1012, a substantially annular lip 1016, and a substantially cylindrical sidewall 1014 extending therebetween. The base 1012 may be circumscribed by a lower perimeter 618 of the sidewall 1014 and the lip 1016 may extend outwardly from an upper perimeter 1020 of the sidewall 1014. A receiving post 1026 with a cavity 1028 extending therethrough may be disposed on the base 1012 in a central location with respect to the sidewall 1014. In some instances, a tray support structure 1022 including a plurality of wall members 1024 may be disposed on the base 1012 and extend upwardly therefrom. A fifth plurality of teeth 1021 may circumscribe the upper perimeter 1020 of the sidewall 1014 and extend outwardly therefrom. The third plurality of teeth 1021 may be disposed below and adjacent to the lip 1016 and be evenly radially spaced apart from one another about the upper perimeter 1020.

Unlike the trays 210, 610, the tray 1010 may include a plurality of airflow windows 1045 formed in the sidewall 1014. The windows 1045 may be configured to permit air to flow from the openings 1008 to the tunnel region 1003 when the maintenance carousel 1000 is in use. As shown in FIG. 47, the tray 1010 may include twelve windows 1045 disposed evenly radially apart from one another along the sidewall 1014. However, in other instances, the tray 1010 may include any number of windows 1045 configured in any suitable arrangement so long as the windows 1045 are configured to permit air to flow through the tunnel region 1003 as the tray 1010 rotates within the maintenance carousel 1000.

Figure 48:
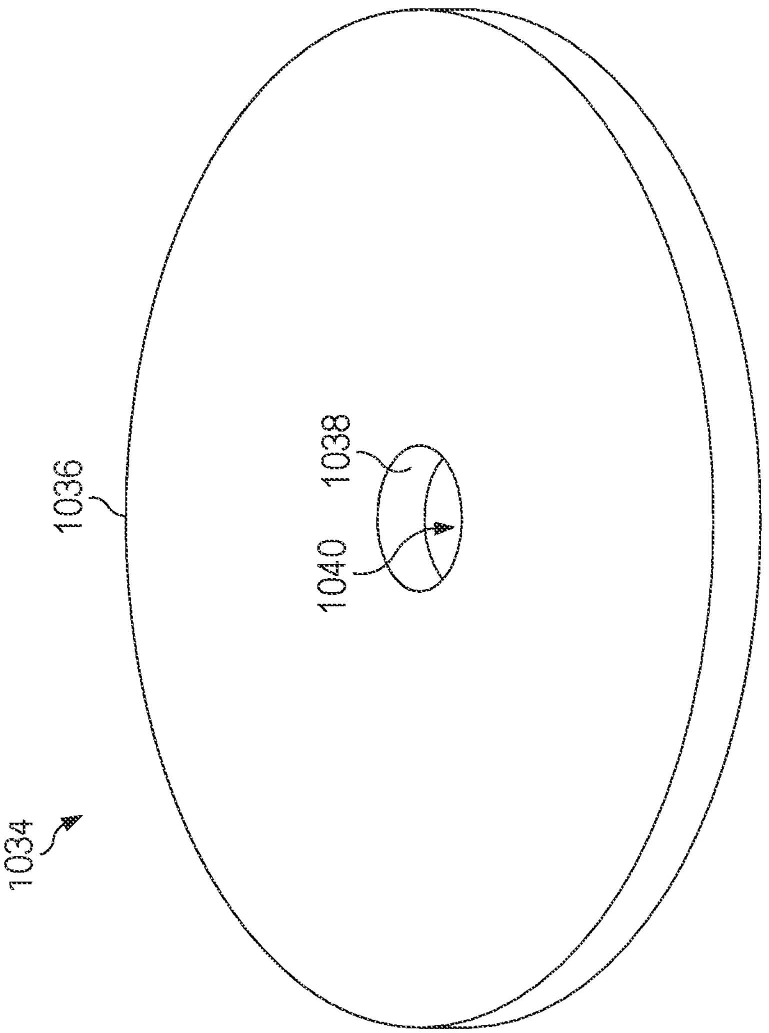
FIG. 48 illustrates a front and top isometric view of an absorbent pad of the maintenance carousel of FIG. 45.
Figure 49:
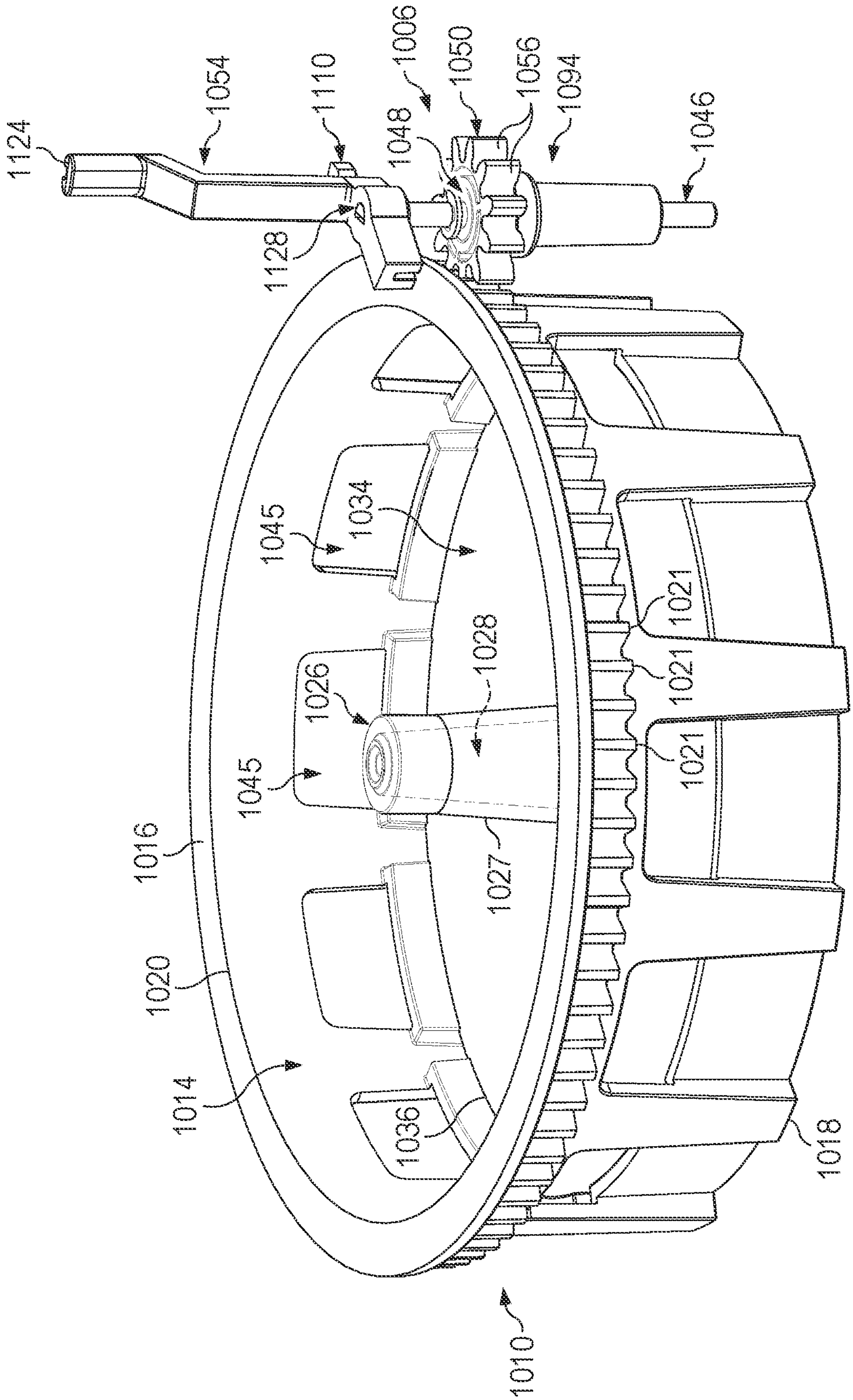
FIG. 49 illustrates a front and top isometric view of the tray of FIG. 47 with the absorbent pad of FIG. 48 disposed therein and an actuator assembly of the maintenance carousel of FIG. 45 positioned adjacent thereto.

Turning to FIGS. 48 and 49, an absorbent pad 1034 may be disposed within the tray 1010. The absorbent pad 1034 may be substantially annular in shape and may be defined by an outer diameter 1036 and an inner diameter 1038. The outer diameter 1036 may correspond to and be imparted with substantially the same dimensions as the lower perimeter 1018 of the sidewall 1014. The inner diameter 1038 may define a central opening 1040 corresponding to and configured to receive the receiving post 1026 when the absorbent pad 1034 is positioned within the tray 1010. In some instances, the absorbent pad 1034 may rest atop the tray support structure 1022.

An actuator assembly 1006, provided in substantially the same form as the actuator assembly 206, may include a post 1046, a gear unit 1094 including a gear 1050 positioned along the post 1046, a one way clutch 1048 disposed between the gear 1050 and the post 1046, and an actuator 1054 positioned atop the post 1046. The post 1046, one way clutch 1048, and gear unit 1094 may be configured to rotate together as a single unit in response to rotation of the actuator 1054. The actuator 1054 may be fixedly coupled to the post 1046 via the socket 1128 and may extend upwardly therefrom. A trigger 1124 may be positioned atop the actuator 1054 and may be configured to translate a linear force imparted on the trigger 1124 into a rotational force imparted on the actuator 1054 and translated to the remaining components of the actuator assembly 1006. The gear 1050 may include a sixth plurality of teeth 1056. The actuator assembly 1006 may be positioned adjacent to the tray 1010 such that the sixth plurality of teeth 1056 may align with and engage the fifth plurality of teeth 1021. Thus, the actuator assembly 1006 may perform indexing of the tray 1010 in a manner substantially similar to that described above with reference to FIG. 37.

Figure 50:
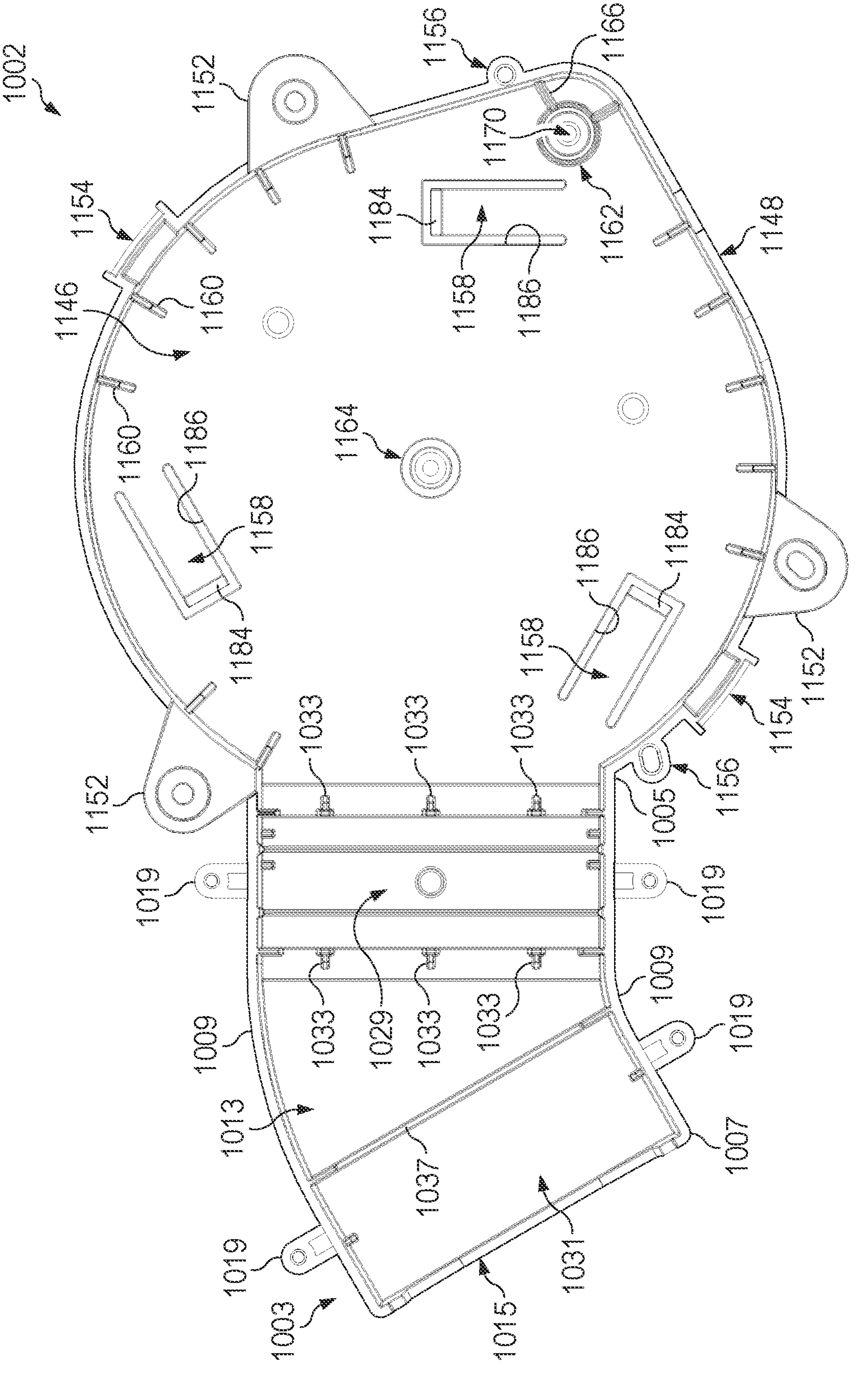
FIG. 50 illustrates a bottom plan view of a shroud of the maintenance carousel of FIG. 45.
Figure 51:
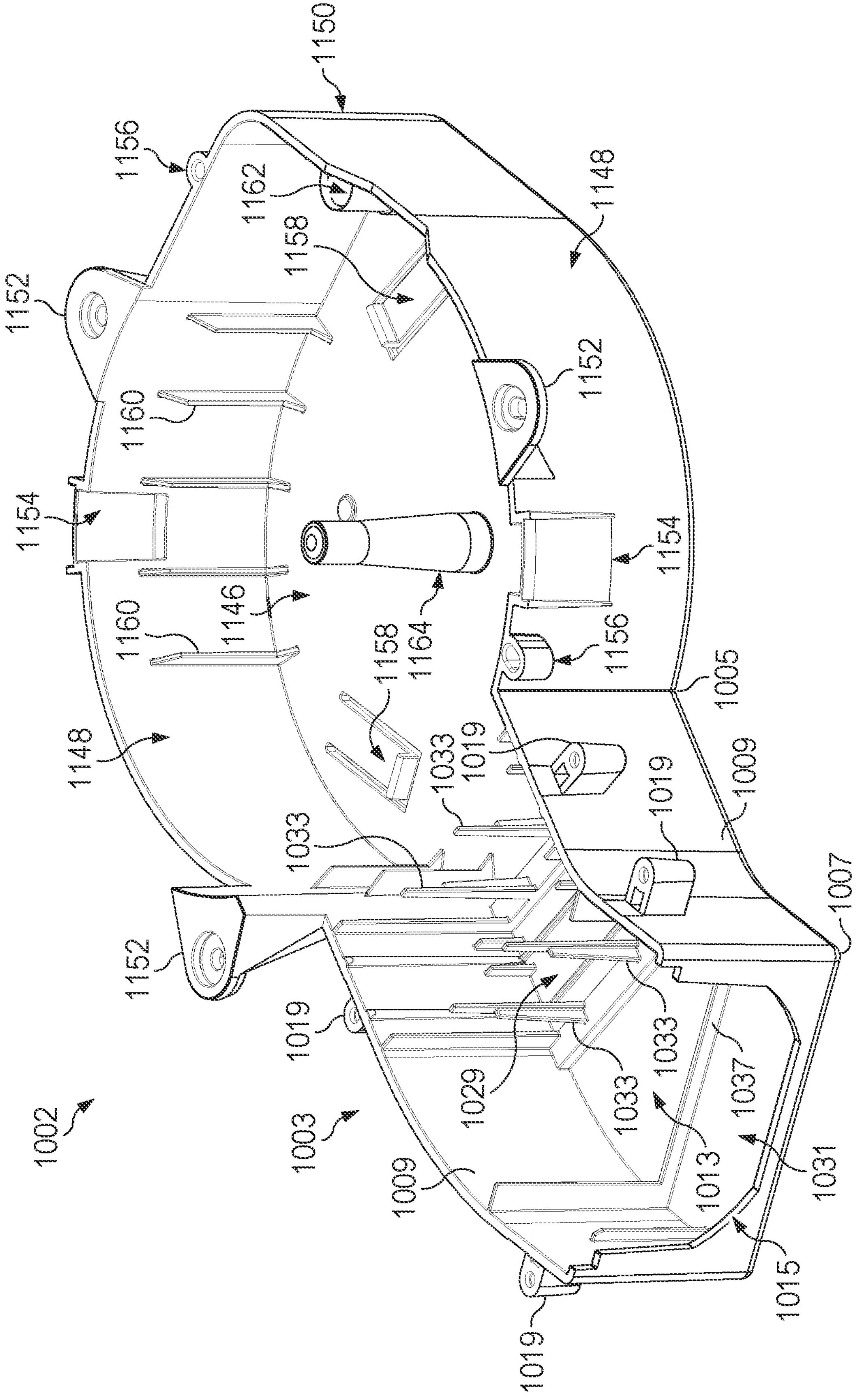
FIG. 51 illustrates a front and top isometric view of the shroud of FIG. 50.

Turning to FIGS. 50 and 51, the shroud 1002 may include an actuator assembly well 1162 and a central pillar 1164 disposed on a platform 1146 of the shroud 1002 and extending upwardly therefrom. The actuator assembly well 1162 may be positioned in the protruding region 1150 proximate to the outer wall 1148. In some instances, one or more connector walls 1166 may extend between the outer wall 1148 and the actuator assembly well 1162, thereby coupling the actuator assembly well 1162 and the outer wall 1148 and imparting additional structural stability to the actuator assembly well 1162. A passageway 1170 configured to receive at least a portion of the post 1046 and at least a portion of the gear unit 1094 may extend vertically through the actuator assembly well 1162 such that the actuator assembly 1006 may be mounted within and supported by the actuator assembly well 1162 when the maintenance carousel 1000 is fully assembled. The central pillar 1164 may be positioned to align with and be received by the receiving post 1026 of the tray 1010 such that the tray 1010 may be supported by the shroud 1002 for rotation about the central pillar 1164.

The shroud 1002 may include one or more flex tabs 1158 formed in the platform 1146. Each flex tab may include a ridge 1184 positioned at an end thereof and may be at least partially surrounded by a moat 1186 which may allow the flex tab 1158 to flex upwardly or downwardly with respect to the platform 1146. In this way, the flex tabs 1158 may apply friction to the tray 1010, as described above with reference to FIG. 26, when indexing is performed by the actuator assembly 1006. Additionally, one or more elongate fins 1160 configured to prevent or reduce unintended movement of the tray 1010 within the shroud 1002 may be disposed along the outer wall 1148 and extend inwardly therefrom (e.g., toward the central pillar 1164).

As best shown in FIGS. 50 and 51, the tunnel region 1003 of the shroud 1002 may be defined by a first region 1029 proximate to the proximal end 1005 and a second region 1031 proximate to the distal end 1007. A plurality of studs 1033 disposed between the tunnel walls 1009 proximate to the proximal end 1005 may be positioned within the first region 1029. The studs 1033 may be formed integrally with the platform 1146 or they may be coupled to the platform 1146 and extend upwardly therefrom. The studs 1033 may be configured to retain one or more filters 1035 disposed in the first region 1029 (see FIG. 52) in the pathway created by the tunnel region 1003 without creating a significant impediment to airflow therethrough.

A divider 1037 may extend between the tunnel walls 1009 proximate to the distal end 1007 and may extend upwardly from the platform 1146 and/or inwardly from the tunnel walls 1009. The second region 1031 may be disposed between the divider 1037 and the distal end 1007 of the tunnel region 1003 and may be configured to receive the fan assembly 1001 (see FIG. 52). Thus, the divider 1037 may be configured to prevent or oppose movement of the fan assembly 1001 when the maintenance carousel 1000 is in use.

Figure 52:
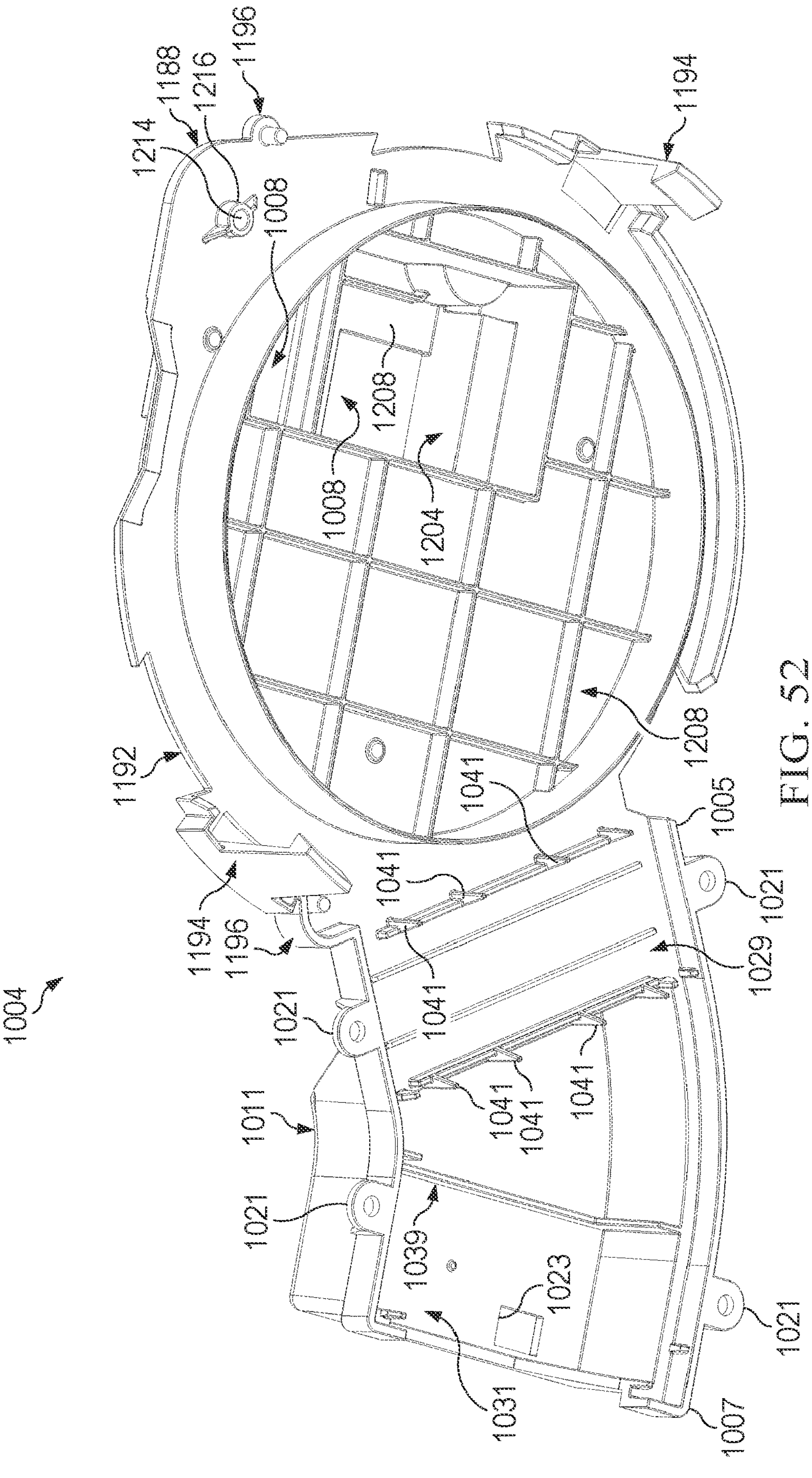
FIG. 52 illustrates a bottom isometric view of a shroud cover of the maintenance carousel of FIG. 45.

Turning to FIG. 52, a substantially cylindrical collar 1216 defining an aperture 1214 extending therethrough may be disposed on an underside 1208 of the shroud cover 1004 proximate to the protruding region 1188. The aperture 1214 may be arranged to align with the actuator assembly well 1162 and to receive at least a portion of the post 1046 of the actuator assembly 1006. Thus, at least a portion of the post 1046 may extend above the shroud cover 1004 via the aperture 1214 to support the actuator 1054 when the maintenance carousel 1000 is assembled (see FIG. 46).

Like the shroud 1002, the tunnel region 1003 of the shroud cover 1004 may be defined by the first region 1029 configured to receive one or more filters 1035 and the second region 1031 configured to receive the fan assembly 1001. A divider 1039 provided in substantially the same form as and arranged to align with the divider 1037 of the shroud 1002 may be disposed on and extend downwardly from the ceiling 1011. Thus, the divider 1039 of the shroud cover 1004, together with the divider 1037 of the shroud 1002, may help secure the fan assembly 1001 within the second region 1031 when the maintenance carousel 1000 is in use. Similarly, a plurality of pins 1041 configured to align with the plurality of studs 1033 of the shroud 1002 may be disposed on and extend downwardly from the ceiling 1011. Thus, the pins 1041, together with the studs 1033, may help secure one or more filters 1035 (or other component) within the first region 1029.

Figure 53:
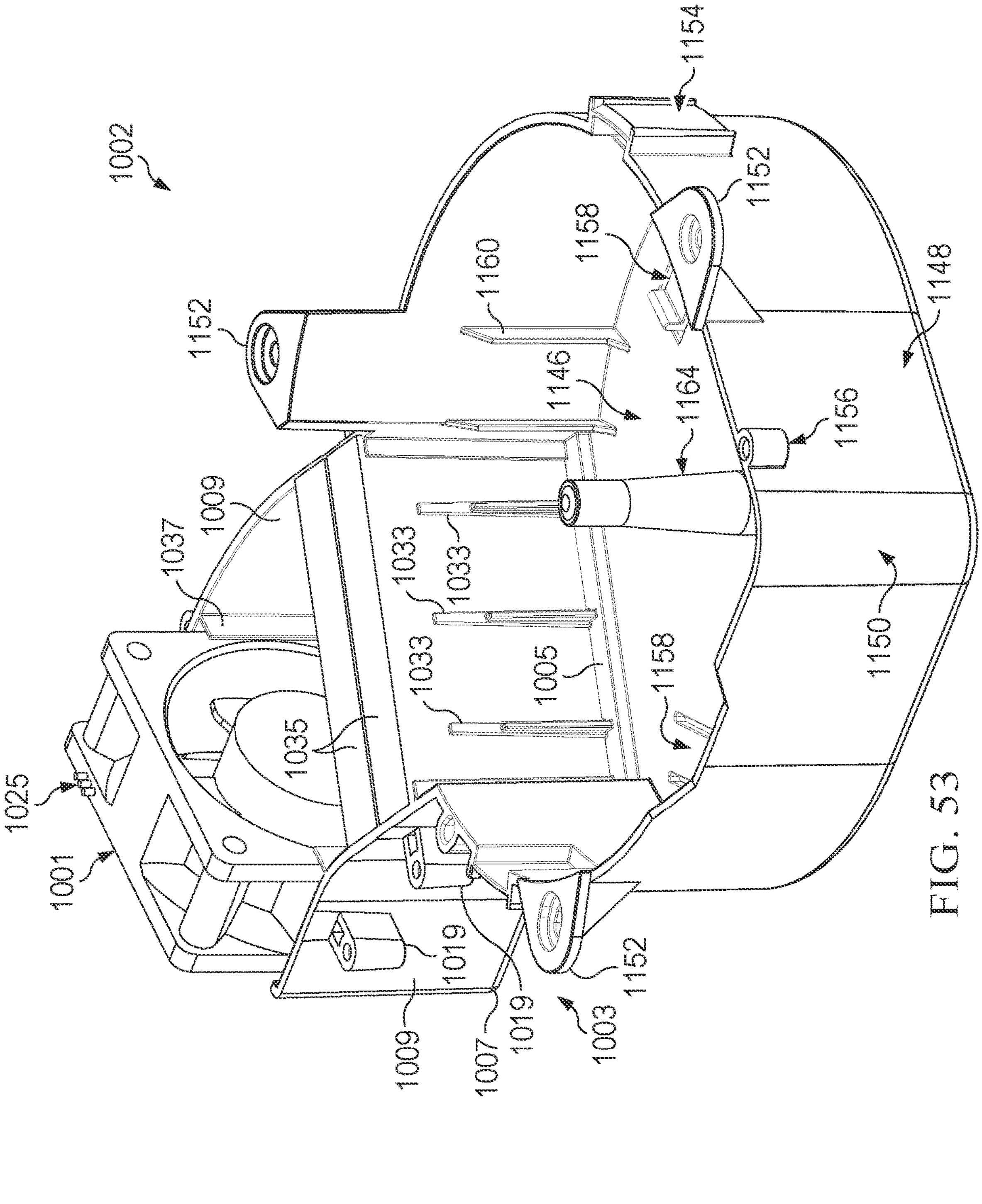
FIG. 53 illustrates an isometric view of the shroud of FIG. 50 with a fan assembly and filters of the maintenance carousel of FIG. 45 disposed therein.

As best shown in FIG. 53, the fan assembly 1001 may be disposed within the shroud 1002 and retained between the divider 1037 and the distal end 1007 of the tunnel region 1003. Additionally, one or more filters 1035 may be disposed proximate to the proximal end 1005 (e.g., between the platform 1146 and the fan assembly 1001) and retained by the studs 1033. The one or more filters 1035 may be configured to clean or otherwise remove contaminates or other particulate matter from the air that enters the tunnel region 1003 as the fan assembly 1001 draws air through the maintenance carousel 1000.

In some instances, the filters 1035 may be provided in the form of a piece of reticulated polyurethane foam constructed to be positioned between the tunnel walls 1009 and the studs 1033. Alternatively, in some instances, the filters 1035 may be provided in the form of a nonwoven polyester (e.g., plastic) web or mesh. In other instances, however, the filters 1035 may be provided in the form of any suitable air filter (e.g., meltblown filters formed from polypropylene, polyester, polytetrafluoroethylene (PTFE), or any other suitable material). As shown in FIG. 52, two filters 1035 are disposed between the studs 1033 and positioned adjacent to one another. However, in other instances, a single filter 1035, or any suitable number of filters 1035, may be provided. In instances where more than one filter 1035 is provided, each filter 1035 may be provided in the same form or at least one of the filters 1035 may be provided in a different form as compared to at least one other filter 1035.

The maintenance carousel 1000 may be positioned within and operably engaged by a printer (e.g., the printer 100 or any other suitable printing device) in a manner substantially similar to that of the maintenance carousel 200 as described above, in particular with reference to FIG. 37. Thus, the actuator assembly 1006 may drive indexing of the tray 1010, thereby causing ink build up on the absorbent pad 1034 to be imparted with a generally circular profile.

Figure 54:
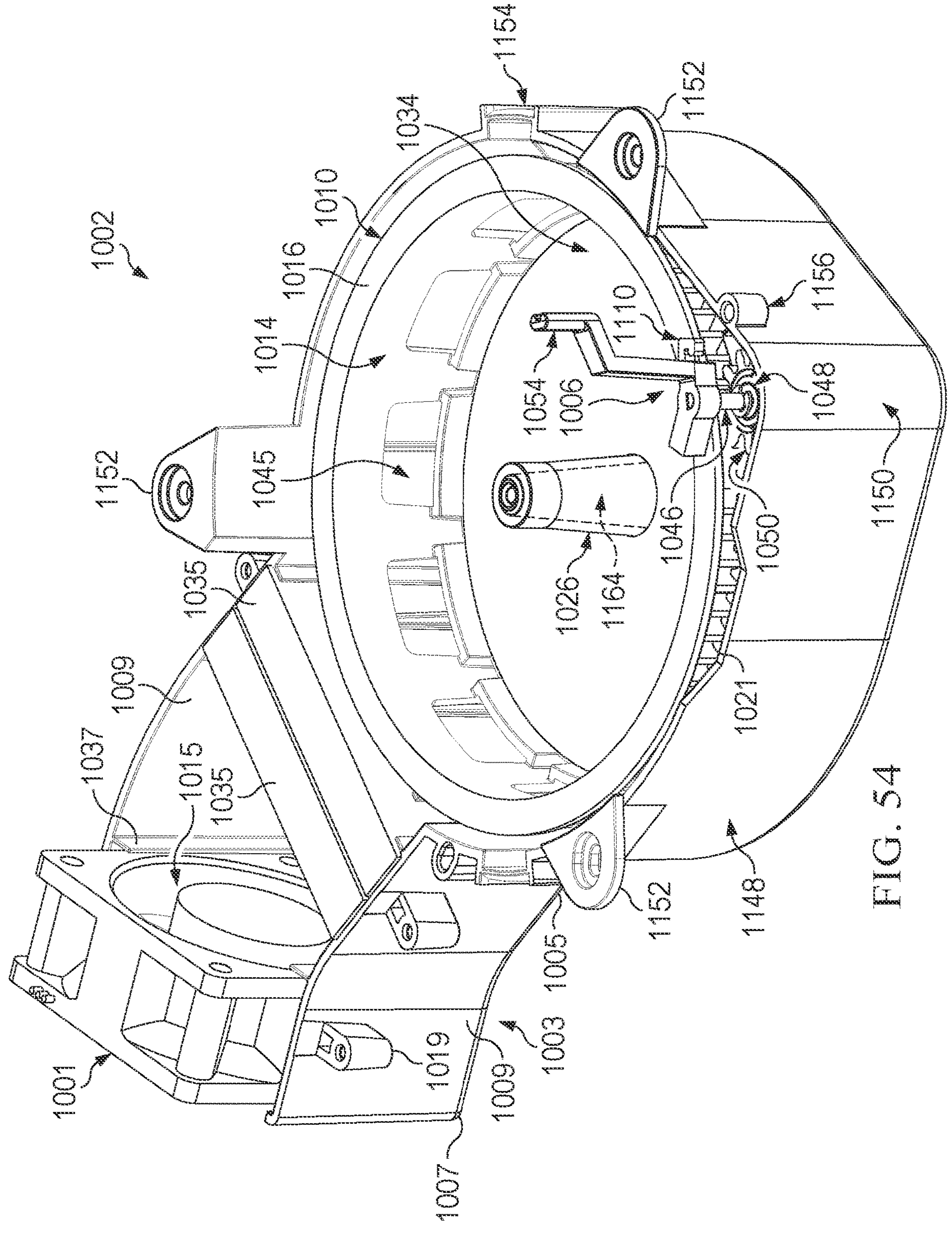
FIG. 54 illustrates an isometric view of the maintenance carousel of FIG. 45 with the shroud cover of FIG. 52 removed.

As best shown in FIG. 54, the windows 1045 may be arranged about the sidewall 1014 of the tray 1010 such that at least one window 1045 aligns with or substantially aligns with the tunnel region 1003 regardless of the rotational position of the tray 1010 relative to the shroud 1002. In this way, the one or more windows 1045 aligned with the tunnel region 1003 may provide a passage through which the fan assembly 1001 may draw air that enters the maintenance carousel 1000 (e.g., through the openings 1008, not shown in FIG. 54). At least a portion of the air may pass through the filters 1035 before filtered air is expelled out of the maintenance carousel 1000 via the outflow region 1015.

Waste ink may be ejected into the maintenance carousel 1000 (e.g., by the printhead 140) in the form of droplets of various sizes, aerosolized particles, or a mixture thereof. Heavier droplets of waste ink may naturally fall to the absorbent pad 1034, whereas smaller droplets and/or aerosolized particles may have a tendency to accumulate in other areas. In some cases, ink can accumulate outside of the maintenance carousel 1000 and cause damage to critical components of the printer. The consistent airflow through the maintenance carousel 1000 generated by the fan assembly 1001 may direct these smaller droplets and/or aerosolized particles toward the tray 1010 and/or the filters 1035 where they may be collected. The plurality of windows 1045 is provided such that the sidewall 1014 does not impede the airflow through the filters 1035 as the actuator assembly 1006 indexes the tray 1010.

It will be appreciated by those skilled in the art that while the above disclosure has been described above in connection with particular embodiments and examples, the above disclosure is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference as if each such patent or publication were individually incorporated by reference herein. Various features and advantages of the above disclosure are set forth in the following claims.

The invention claimed is:

1. A maintenance carousel for collecting waste ink in a printer, comprising:

an enclosure provided in the form of a shroud and a shroud cover coupled to the shroud, the shroud cover having an opening through which the waste ink may be deposited;

a tray supported for rotation within the shroud;

an actuator assembly in communication with the tray, the actuator assembly further comprising:

a one way clutch configured to permit rotation only in a first direction;

an actuator arranged to cause rotation of the one way clutch; and a gear unit configured to rotate in unison with the one way clutch, the gear unit designed to engage the tray.

2. The maintenance carousel of claim 1, wherein the printer is configured to engage the actuator assembly and drive rotation of the tray by impacting the actuator each time one or more printheads of the printer deposits waste ink into the maintenance carousel.

3. The maintenance carousel of claim 2, further comprising a spring extending between an anchor positioned on the shroud cover and a hooked portion of the actuator.

4. The maintenance carousel of claim 3, wherein the spring applies a return force to the actuator in response to the printer engaging the actuator.

5. The maintenance carousel of claim 4, wherein the shroud includes a stopper positioned to limit the rotation of the actuator in response to the return force.

6. The maintenance carousel of claim 5, wherein the direction of rotation of the actuator in response to being engaged by the printer corresponds to the first direction of rotation, and the one way clutch prevents the actuator assembly from driving rotation of the tray when the actuator rotates in response to the return force.

7. The maintenance carousel of claim 1, wherein the actuator assembly is configured to drive rotation of the tray, and wherein the shroud includes one or more flex tabs arranged to apply friction to the tray when the actuator assembly drives rotation of the tray.

8. The maintenance carousel of claim 1, wherein an absorbent pad is positioned within the tray and configured to absorb the waste ink dispensed from the printer, the absorbent pad being provided in the form of felt.

9. The maintenance carousel of claim 1, wherein the actuator assembly causes indexing of the tray.

10. The maintenance carousel of claim 1, wherein waste ink accumulates within the tray in a circular pattern.

11. A maintenance carousel for collecting waste ink in a printer, comprising:

a shroud;

a shroud cover associated with the shroud, the shroud cover including one or more electrostatic plate housings;

one or more electrostatic plates disposed at least partially within the one or more housings, wherein the one or more electrostatic plates are configured to generate an electromagnetic field;

a tray supported for rotation within the shroud; and an actuator assembly configured to drive rotation of the tray, the actuator assembly including an actuator and a clutch.

12. The maintenance carousel of claim 11, wherein the one or more electrostatic plates are provided in the form of two electrostatic metallic plates having a rectilinear panel with one or more contacts.

13. The maintenance carousel of claim 12, wherein the two electrostatic plates are in communication with a transformer, the transformer configured to apply a voltage to the electrostatic plates.

14. The maintenance carousel of claim 11, wherein the electromagnetic field attracts droplets or aerosolized particles of waste ink toward the electrostatic plates.

15. A maintenance carousel for collecting waste ink in a printer, comprising:

an enclosure including one or more openings, the one or more openings designed to receive the waste ink from the printer, a tray disposed within the enclosure;

an actuator assembly in communication with the tray, the actuator assembly including an actuator, a clutch, and a gear unit configured to rotate with the clutch; and a fan assembly in communication with the enclosure and the tray, the fan assembly configured to generate an airflow through the maintenance carousel, wherein the printer is configured to engage the actuator assembly and drive rotation of the tray by impacting the actuator each time one or more printheads of the printer deposits waste ink into the maintenance carousel.

16. The maintenance carousel of claim 15, wherein at least one window is formed in the tray, and the window permits air to flow from the tray to an exterior of the enclosure.

17. The maintenance carousel of claim 15, wherein the fan assembly is configured to draw air into the maintenance carousel via the one or more openings and eject air from the maintenance carousel via an output region associated with a fan tunnel.

18. The maintenance carousel of claim 17, wherein one or more filters are positioned in the fan tunnel between the fan assembly and the tray.

19. The maintenance carousel of claim 18, wherein the fan tunnel includes one or more dividers configured to hold the fan assembly in place and one or more studs configured to hold the one or more filters in place.

20. The maintenance carousel of claim 18, wherein the one or more filters are provided in the form of a reticulated polyurethane foam.

* * * * *